US009143807B2

(12) United States Patent
Keen et al.

(10) Patent No.: US 9,143,807 B2
(45) Date of Patent: *Sep. 22, 2015

(54) REGISTRATION OF A PERSONAL ELECTRONIC DEVICE (PED) WITH AN AIRCRAFT IFE SYSTEM USING PED GENERATED REGISTRATION TOKEN IMAGES AND ASSOCIATED METHODS

(75) Inventors: R. Michael Keen, Malabar, FL (US); Jeffrey A. Frisco, Palm Bay, FL (US)

(73) Assignee: LIVETV, LLC, Melbourne, FL (US)

( * ) Notice: Subject to any disclaimer, the term of this patent is extended or adjusted under 35 U.S.C. 154(b) by 533 days.

This patent is subject to a terminal disclaimer.

(21) Appl. No.: 12/820,467

(22) Filed: Jun. 22, 2010

(65) Prior Publication Data
US 2011/0314490 A1 Dec. 22, 2011

(51) Int. Cl.
| H04N 7/18 | (2006.01) |
|---|---|
| H04N 21/214 | (2011.01) |
| H04N 21/41 | (2011.01) |
| H04N 21/422 | (2011.01) |
| H04N 21/4784 | (2011.01) |
| H04N 21/81 | (2011.01) |

(52) U.S. Cl.
CPC ............ *H04N 21/2146* (2013.01); *H04N 7/18* (2013.01); *H04N 21/4126* (2013.01); *H04N 21/422* (2013.01); *H04N 21/4784* (2013.01); *H04N 21/812* (2013.01)

(58) Field of Classification Search
CPC ............ H04N 21/214; H04N 21/2146; B64D 11/0015
USPC ............................................... 725/23, 76–78
See application file for complete search history.

(56) References Cited

U.S. PATENT DOCUMENTS

| 6,034,688 | A  | * | 3/2000 | Greenwood et al. | 715/784 |
|---|---|---|---|---|---|
| 6,057,872 | A  | * | 5/2000 | Candelore | 725/23 |
| 6,813,777 | B1 | * | 11/2004 | Weinberger et al. | 725/76 |
| 7,114,171 | B2 | * | 9/2006 | Brady et al. | 725/77 |
| 7,213,055 | B1 | | 5/2007 | Kathol | 709/217 |
| 7,308,254 | B1 | * | 12/2007 | Rissanen | 455/414.1 |
| 7,343,157 | B1 | | 3/2008 | Mitchell | 455/431 |

(Continued)

OTHER PUBLICATIONS

"Panasonic Receives New Order from All Nippon Airways for eX2 In-Flight Entertainment System" Online Business Wire, Nov. 10, 2009.

(Continued)

*Primary Examiner* — An Son P Huynh
(74) *Attorney, Agent, or Firm* — Allen, Dyer, Doppelt, Milbrath & Gilchrist, P.A.

(57) ABSTRACT

An aircraft communications system includes at least one personal electronic device (PED) carried by an aircraft passenger, and an aircraft in-flight entertainment (IFE) system. The PED includes a PED display, a PED wireless transceiver, and a PED controller for generating a respective registration token image on the PED display. The aircraft IFE system includes an IFE video entertainment source, IFE passenger seat displays, a respective IFE optical sensor associated with each of the IFE passenger seat displays, an IFE wireless transceiver, and an IFE controller. The IFE controller is for selectively displaying video from the IFE entertainment source on the IFE passenger seat displays, and for communicating with the PED wireless transceiver via the IFE wireless transceiver based upon a respective IFE optical sensor sensing the registration token image on the PED display.

34 Claims, 41 Drawing Sheets

(56) References Cited

U.S. PATENT DOCUMENTS

| | | | |
|---|---|---|---|
| 7,587,734 B2* | 9/2009 | Logan et al. | 725/76 |
| 7,979,057 B2* | 7/2011 | Ortiz et al. | 455/414.1 |
| 8,576,064 B1* | 11/2013 | Mitchell | 340/539.11 |
| 8,712,839 B2* | 4/2014 | Steinert et al. | 705/14.1 |
| 2002/0042753 A1* | 4/2002 | Ortiz et al. | 705/26 |
| 2002/0059614 A1* | 5/2002 | Lipsanen et al. | 725/75 |
| 2002/0091569 A1* | 7/2002 | Kitaura et al. | 705/14 |
| 2003/0100978 A1* | 5/2003 | Wright et al. | 701/35 |
| 2004/0158492 A1* | 8/2004 | Lopez et al. | 705/14 |
| 2004/0251309 A1* | 12/2004 | Cove | 235/493 |
| 2005/0028208 A1* | 2/2005 | Ellis et al. | 725/58 |
| 2005/0044564 A1 | 2/2005 | Stopniewicz et al. | 725/37 |
| 2005/0181723 A1* | 8/2005 | Miller et al. | 455/12.1 |
| 2005/0216938 A1* | 9/2005 | Brady et al. | 725/76 |
| 2005/0273823 A1* | 12/2005 | Brady et al. | 725/76 |
| 2006/0085308 A1* | 4/2006 | Metzger | 705/34 |
| 2006/0107295 A1* | 5/2006 | Margis et al. | 725/81 |
| 2006/0179457 A1 | 8/2006 | Brady et al. | 725/76 |
| 2006/0234700 A1* | 10/2006 | Funderburk et al. | 455/431 |
| 2007/0044126 A1* | 2/2007 | Mitchell | 725/81 |
| 2007/0157281 A1* | 7/2007 | Ellis et al. | 725/134 |
| 2008/0114647 A1* | 5/2008 | Singer et al. | 705/14 |
| 2008/0124054 A1* | 5/2008 | Bonar | 386/124 |
| 2008/0142599 A1* | 6/2008 | Benillouche et al. | 235/462.41 |
| 2008/0183576 A1* | 7/2008 | Kim et al. | 705/14 |
| 2008/0240062 A1* | 10/2008 | Lynch et al. | 370/338 |
| 2008/0244635 A1* | 10/2008 | Pollard et al. | 725/23 |
| 2008/0267504 A1* | 10/2008 | Schloter et al. | 382/181 |
| 2009/0077595 A1 | 3/2009 | Sizelove et al. | 725/76 |
| 2009/0083805 A1 | 3/2009 | Sizelove et al. | 725/76 |
| 2009/0094635 A1 | 4/2009 | Aslin et al. | 725/32 |
| 2009/0096857 A1 | 4/2009 | Frisco et al. | 348/14.02 |
| 2009/0100476 A1* | 4/2009 | Frisco et al. | 725/68 |
| 2009/0119721 A1 | 5/2009 | Perlman et al. | 725/76 |
| 2009/0129571 A1* | 5/2009 | Altberg et al. | 379/93.25 |
| 2009/0150211 A1* | 6/2009 | Bayne | 705/14 |
| 2009/0228908 A1 | 9/2009 | Margis et al. | 725/6 |
| 2009/0266884 A1* | 10/2009 | Killian et al. | 235/380 |
| 2010/0070376 A1* | 3/2010 | Proud et al. | 705/21 |
| 2013/0167168 A1* | 6/2013 | Ellis et al. | 725/12 |

OTHER PUBLICATIONS

Kirby, M. "*Panasonic's super remote control is good Karma*" Sep. 15, 2009: www.flightglobal.com/blogs/runway-rirl/2009/09/panasonics-super-remote-control.

Kirby, M "*Could Bombardier break ground on new IFE&C paradeigm*" Sep. 17, 2009: www.flightglobal.com/blods/runway-rirl/2009/09/could-bombardier-break-ground.

* cited by examiner

REGISTRATION OF A PERSONAL ELECTRONIC DEVICE (PED) WITH AN AIRCRAFT IFE SYSTEM USING PED GENERATED REGISTRATION TOKEN IMAGES AND ASSOCIATED METHODS

FIELD OF THE INVENTION

The present invention relates to the field of communications systems, and more particularly, to an aircraft in-flight entertainment (IFE) system and personal electronic devices (PEDs) carried by aircraft passengers cooperating with the IFE system.

BACKGROUND OF THE INVENTION

Commercial aircraft carry millions of passengers each year, and typically include in-flight entertainment (IFS) systems for passenger enjoyment during such flights. Entertainment systems may include individual seatback displays, where movies or other stored video programming are selectable by the passengers. In addition to prerecorded video entertainment, live television broadcasts may be provided via satellite receivers.

Such aircraft IFE systems, however, suffer from several disadvantages. Some passengers find that the aircraft IFE systems are complicated to operate. Selection of the viewing content, for example, can prove difficult due to the awkward placement and operation of the user controls. Moreover, the user controls have limited functionality.

In addition, some passengers find that the viewing content is difficult to enjoy. Passenger displays typically are located overhead and/or on opposing seatbacks. In addition, some or all of the passengers traveling aboard the aircraft can be inhibited from enjoying the viewing content if the IFE video entertainment source fails.

One approach to address these disadvantages is to have the aircraft IFE system communicate with personal electronic devices (PEDs) carried by the aircraft passengers to support the aircraft IFE system. For example, the PED may be used as a remote control to control the video provided by the aircraft entertainment source. In addition, viewing content from a PED can be provided to the aircraft IFE system for viewing on a seat-back display. In this configuration, the PED operates as a video entertainment source as well as a remote control.

U.S. published patent application no. 2009/0077595 discloses a PED in communications with an aircraft IFE system via an access point. Communications may be via a wired or wireless connection. After the PED is coupled to the aircraft IFE system, viewing content from the PED can be integrated "on the fly" into the aircraft IFE system via an interactive audio/video presentation system. The interactive audio/video presentation system is part of the aircraft IFE system, and provides the user with an ability to switch between viewing content provided by the aircraft IFE system and viewing content from the PEE). The PED exchanges control signals or commands, such as user control signals or user control instructions, with the aircraft IFE system so that the ETD also functions as a remote control. In addition to viewing content provided from a PED to the aircraft IFE system for viewing on a passenger display, viewing content from the aircraft IFE system can be provided to the PED for viewing.

In order for a PED to wirelessly interface with an aircraft IFE system, a registration typically needs to be performed. In the above-referenced U.S. published patent application no. 2009/0077595, the PED registers via an access point using a wireless registration scheme.

Similarly, in U.S. Pat. No. 7,343,157, a PED is used to access a picocell, which in turn connects to a media server by dialing the appropriate numbers. In U.S. published patent application no. 2005/0044564, the PED includes a communications port that is configured to wirelessly communicate with a communications port of the aircraft IFE system.

However, these references provide a top-level discussion of how the registration schemes are implemented between the aircraft IFE system and the PEDs. A need still exists for improving how PEDs carried by aircraft passengers are integrated with an aircraft IFE system. In addition, passenger demand for viewing content is continually evolving, as well as how that content is displayed and controlled.

SUMMARY OF THE INVENTION

In view of the foregoing background, it is therefore an object of the present invention to provide a straightforward registration scheme for integrating a personal electronic device (PED) with an aircraft in-flight entertainment (IFS) system.

This and other objects, features, and advantages in accordance with the present invention are provided by a communications system for an aircraft comprising at least one PED carried by an aircraft passenger, an aircraft IFE system.

The PED may comprise a PED display, a PED wireless transceiver, and a PED controller. The PED controller may be for generating a respective registration token image on the PED display, and for communicating via the PED wireless transceiver.

The aircraft IFE system may comprise an IFE video entertainment source, IFE passenger seat displays, a respective IFE optical sensor associated with each IFE passenger seat display, an IFE wireless transceiver, and an IFE controller. The IFE controller may selectively display video from the IFE entertainment source on the IFE passenger seat displays, and communicate with the PED wireless transceiver via the IFE wireless transceiver based upon a respective IFE optical sensor sensing the registration token image on the PED display.

Each respective registration token image advantageously allows the IFE controller to register with the PED controller in a straightforward manner upon communicating therewith. The PED that provided the registration token image is assigned to and associated with the IFE passenger seat display associated with the IFE optical sensor that sensed the PED's registration token image. Once registered, the PED is integrated with the IFE system.

The IFE optical sensor may comprise a camera, and the registration token image may be configured as a bar code, for example. Each registration token image may have a unique number or identification associated therewith.

An integrated PED may be operated as a remote control for remotely controlling the video displayed on an IFE passenger seat display. To operate as a remote control, the PED includes a PED input device coupled to the PED controller. The PED wirelessly communicates to the IFE wireless transceiver via the PED wireless transceiver.

In addition to a PED operating as a remote control, other functions/features may readily be available once the PED is registered with the IFE controller. The PED may be operated as an entertainment source for displaying video on the IFE passenger seat display. This advantageously allows the passenger to have a greater selection of choices for viewing video during the flight.

Yet another function/feature that may readily be available once the PED is registered with the IFE controller is for the PED to display video from the IFE video entertainment source. This advantageously allows the passenger to comfortably view the video from the IFE video entertainment source on their PED. The video from the IFE entertainment source is wirelessly transmitted to the PED wireless transceiver.

Another aspect is directed to a method for operating an aircraft communications system comprising an aircraft IFE system and at least one PED carried by an aircraft passenger as described above. The method may comprise operating the PED controller for generating a respective registration token image on the PED display. The PED may then be positioned by the passenger adjacent their assigned IFE passenger seat display. The method may further comprise operating the IFE controller for selectively displaying video from the IFE entertainment source on the IFE passenger seat displays. The IFE controller may also be operated so that the IFE optical sensor senses the displayed registration token image. The PED wireless transceiver may communicate via the IFE wireless transceiver based upon the sensed registration token image for registering the PED with the IFE system.

The passenger may then select an available option. One option is to operate the PED as a remote control for selectively controlling displayed video on the IFE passenger seat display that displayed the registration token image used in the registration. A second option is to operate a PED video entertainment source to selectively display video on the IFE passenger seat display. A third option is to operate a PED display for selectively displaying video thereon from the IFE video entertainment source. The passenger also has the option of operating the PED as a remote control for selectively controlling the displayed video.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and single, double and triple prime notations are used to indicate similar elements in alternative embodiments.

Figure 1:
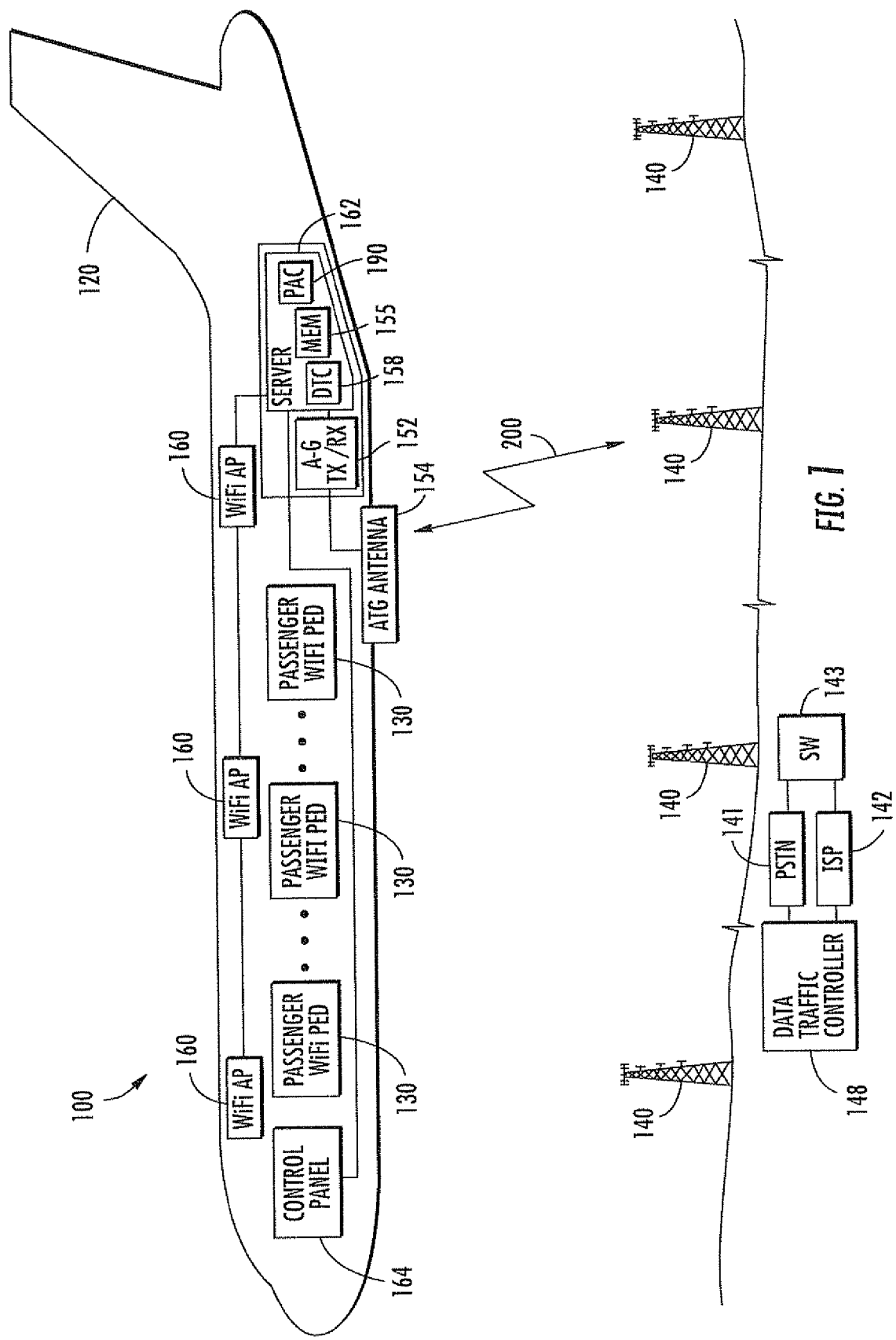
FIG. 1 is a schematic diagram of an air-to-ground communications network in accordance with the present invention.

Referring initially to FIG. 1, an air-to-ground communications network 100 will be discussed in which passengers within an aircraft 120 are able to communicate over an air-to-ground interface 200 using their own personal electronic devices (PEDs) 130. PEDs 130 include personal mobile smart phones or telephones (cellular and PCS), personal digital assistants, wireless email devices, wireless equipped laptop computers having Wi-Fi/WiMax capability, air cards, or Wi-Fi equipped MP3 players, for example.

As will be discussed in greater detail below, the air-to-ground communications network 100 may be considered as a data-based network as compared to a terrestrial voice-based network that also supports data. A data-based network supports emails and text messaging without having to specifically take into account the additional requirements (including latency) associated with traditional two-way, full duplex live conversational voice. However, the air-to-ground communications network 100 supports voice capability, as VoIP, and can send multimedia in the form of streaming video, multimedia web surfing, still pictures, music, etc. As a result, hard handoffs may be used between the ground-based base stations 140 as the aircraft 120 is in flight. Soft handoffs are often used for voice-based networks, which negatively impacts the amount of frequency spectrum needed for a handoff.

The air-to-ground network 100 is not constrained to use air interfaces deployed for terrestrial networks. An air interface that is not used for terrestrial networks may be used.

The air-to-ground interface 200 is used to communicate with the ground-based base stations 140. Each base station 140 illustratively interfaces with the public switched telephone network (PSTN) 141 and an Internet service provider (ISP) 142 through a switch 143 for providing email and text messaging services. The PSTN 141 and the ISP 142 are illustrated for only one of the base stations 40. Alternatively, an Internet connection 42 could only be provided and not a PSTN connection 41.

In the United States, for example, there are approximately 100 base-stations 140 positioned to directly support the air-to-ground communications network 100 disclosed herein. This is particularly advantageous since the frequency band of the air-to-ground interface 200 is different than the frequency bands associated with cellular mobile telecommunication systems. In the illustrated example of the air-to-ground communications network 100, the allocated frequency spectrum of the air-to-ground interface 200 is based on a paired spacing of 851 MHz and 896 MHz, with 0.5 MHz available at each frequency.

In contrast, one portion of the radio spectrum currently used for terrestrial wireless communications companies is in the 824-849 MHz and 869-894 MHz bands. PCS is a wireless communications network that operates at a radio frequency of 1.9 GHz. Internationally, other frequencies and bands have been allocated for licensed wireless communications, but they do not operate using the paired spacing of 851 MHz and 896 MHz.

In the illustrated embodiment, equipment has been installed on the aircraft 120 so that the aircraft appears as a hotspot or intranet to the PEDs 130. Nodes or access points 160 are spaced throughout the cabin area of the aircraft 120 providing 802.11 services (i.e., Wi-Fi) or 802.16 services (i.e., WiMax), for example. In addition, access to the network 100 could be through an on-board picocell in which the PEDs 130 communicate therewith using cellular or PCS functions. A picocell is analogous to a Wi-Fi or WiMax access point 160.

The access points 160 are illustratively connected to an on-board server 162 and an air-to-ground transceiver 152. The server 162 includes a data memory cache 155 and a data traffic controller 158. An air-to-ground antenna 154 is coupled to the air-to-ground transceiver 152. An optional control panel 164 is illustratively coupled to the server 162. The data memory cache 155 is for storing common data accessible by the PEDs 130 during flight of the aircraft 120, as well as caching web pages for web browsing by a PED 130. The data memory cache 155 also stores information during hard handoffs between base stations 140 as part of a store-and-forward capability. In addition to the cache memory 155 scheme, the server 162 includes a memory supporting a pass-through scheme, as readily appreciated by those skilled in the art.

The aircraft-based data traffic controller 158 is for selectively allocating data communications channel capacity between the PEDs 130 and the ground-based base stations 140. Selectively allocating data communications channel capacity may also be alternatively or additionally performed on the ground using a ground-based data traffic controller 148 coupled to the PSTN 141 and the ISP 142. The respective controllers 148, 158 control the IP traffic that will be allowed over the air-to-ground network 200.

The respective controllers 148, 158 thus operate as filters, which may be static or dynamic. Their operation depends on whether the network 100 is lightly loaded or heavily loaded. For example, an email (from the aircraft 120) with a very large attachment would be limited or restricted by the aircraft-based data traffic controller 158, whereas an Internet request resulting in a large number of web pages being sent to a PED 130 (from a ground-based base station 140) would be limited by the ground-based data traffic controller 148.

By selectively allocating the data communications channel capacity, a greater or maximum number of passengers on the aircraft 120 can communicate over the air-to-ground interface 200 using their own PEDs 130. For a given PED 130, the aircraft-based data traffic controller 158 may thus limit data communications from exceeding a predetermined portion of the data communications channel capacity.

Allocation of the data communications channel capacity may be based on a number of different factors or metrics. For example, the respective data traffic controllers 148, 158 may allocate the data communications channel capacity based on a priority of service. For example, credit card information used for on-board purchases/shopping could have a higher priority over e-mail. The data communications may comprise flight operational data and non-flight operational data. Certain types of traffic may have priority over other types of traffic. Personnel having PEDs 130 include passengers, as well as other individuals supporting operation of the aircraft. Personnel with PEDs 130 supporting operation of the aircraft would be associated with flight operational, data, and this may be assigned a higher priority.

PEDs 130 that are cellular or PCS devices and are also Wi-Fi compatible are known as dual-mode devices. One of the modes is cellular communications, with the other mode being Wi-Fi communications. Many laptop, personal computers, and PDAs are Wi-Fi/WiMax compatible, which are also classified herein as PEDs. After a connection is made to the on-board server 162 via Wi-Fi or WiMax, each PED 130 can transmit and receive emails and text messages over the air-to-ground interface 200.

The dual-mode PEDs 130 carried by the passengers thus support multiple air interfaces, i.e., a terrestrial network and Wi-Fi or WiMax. Example terrestrial networks include any one of the following: 1) PCS, 2) the GSM family including EDGE, GPRS, HSDPA, HSDPA, and 3) the CDMA family including IS-95, CDMA2000, 1xRTT, EVDO. The terrestrial network may also operate based on other network interfaces standards, as will be readily appreciated by those skilled in the art. To reduce the cost of the dual-mode PEDs 130, a software radio may be used wherein the radio is configured to the air interface standard that is available. If more than one air interface standard is available, different metrics may be evaluated to determine a preferred air interface.

Figure 2:
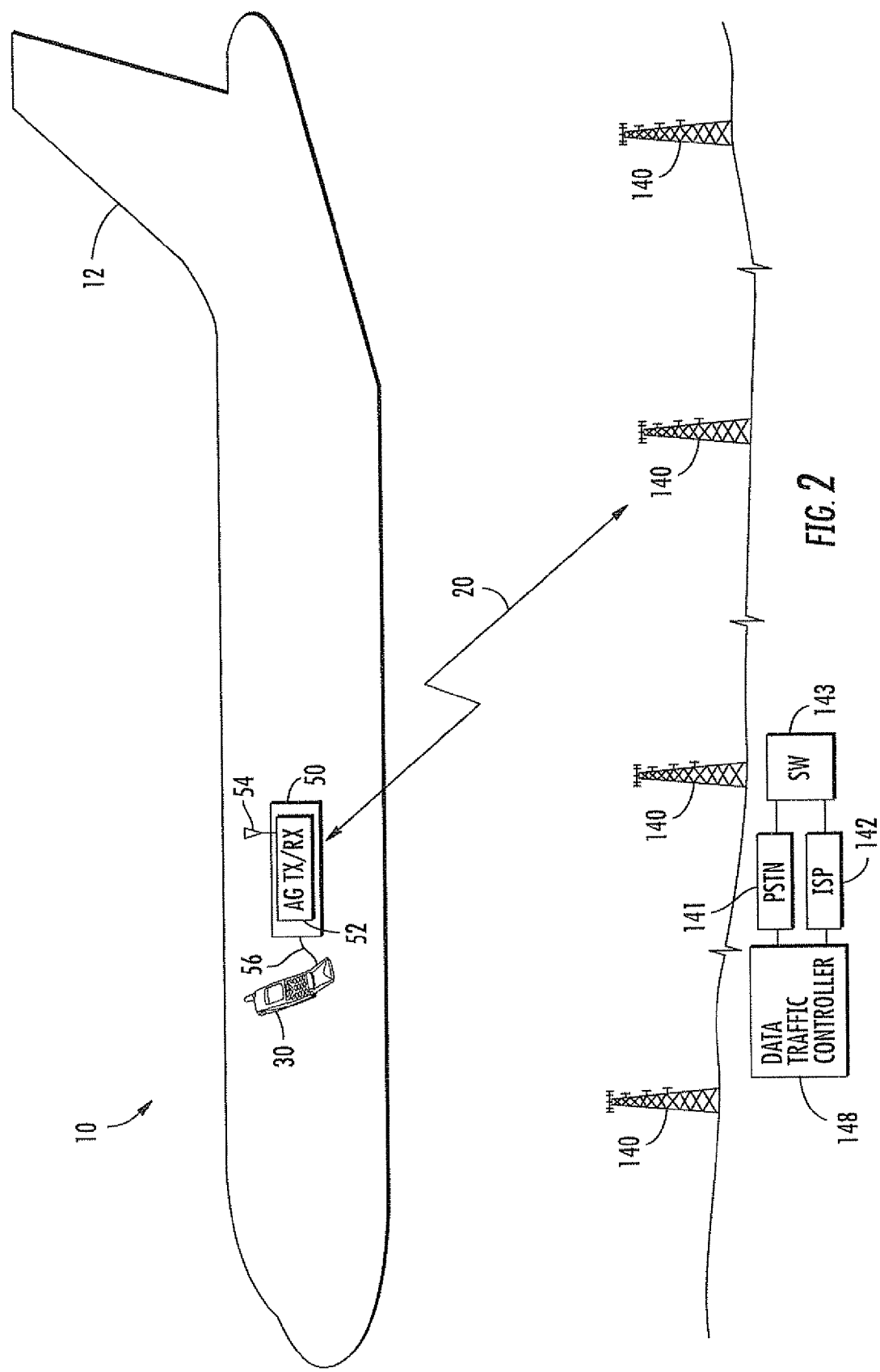
FIG. 2 is a schematic diagram of another embodiment of the air-to-ground communications network with passenger carried equipment on the aircraft in accordance with the present invention.
Figure 3:
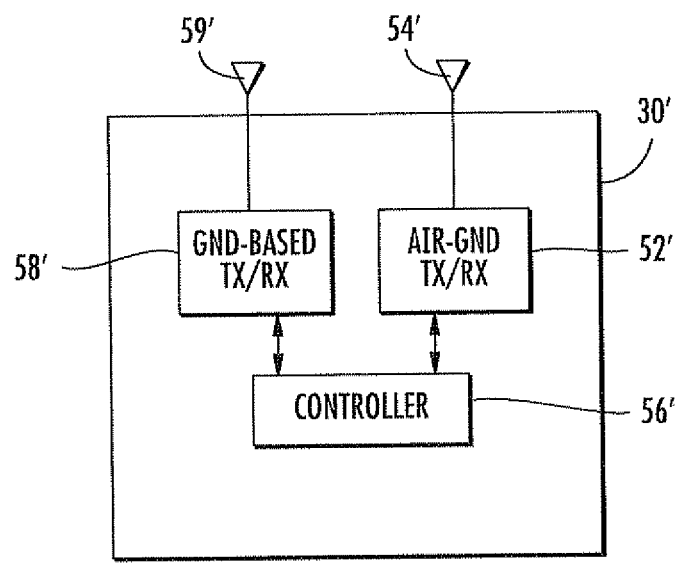
FIG. 3 is a schematic diagram of another embodiment of the PED shown in FIG. 2 with the translator device integrated therein.

Referring now to FIGS. 2 and 3, as an alternative to aircraft installed equipment, a respective translator device 50 may be used to interface between each PED 30 and a ground-based base station 40 over the air-to-ground interface 20. The translator device 50 comprises an air-to-ground transceiver 52 with an air-to-ground antenna 54 coupled thereto.

In the illustrated embodiment, no additional equipment may need to be installed in the aircraft 12 since the translator devices 50 would be brought on-board by the passengers. Each translator device 50 may interface with the PED 30 via a wired or wireless connection. The wireless connection may be a Wi-Fi connection (802.11) or a WiMax connection (802.16), for example. The wired connection may be a USB interface 55.

Alternatively, the translator device may be integrated directly into the PED 30', as illustrated in FIG. 3. The PED 30' would further include a controller 56' for selecting between the ground-based transceiver 58' or the air-to-ground transceiver 52' associated with the translator. A separate antenna 59' is coupled to the ground-based transceiver 58'. Instead of separate antennas 54' and 59', a shared antenna may be used. The controller 56' may perform the selection automatically based on one or more monitored metrics, or the selection may be based on input from the user.

Referring again to FIG. 1, another aspect of the illustrated embodiment is directed to a method for operating a communications system 100 for an aircraft 120 carrying at least some personnel having PEDs 130 for wireless data communications outside the aircraft with a ground-based communications network. The communications system 100 includes an access point 160 in the aircraft 120 for providing a WLAN for data communications with the PEDs 130, and an air-to-ground transceiver 152 in the aircraft 120 cooperating with the access point 160 for data communications with the ground-based communications network. The method may comprise selectively allocating data communications channel capacity between the PEDs 130 and the ground-based communications network using at least one data traffic controller. The at least one data traffic controller may be an aircraft-based data traffic controller 158 and/or a ground-based data traffic controller 148.

Figure 4:
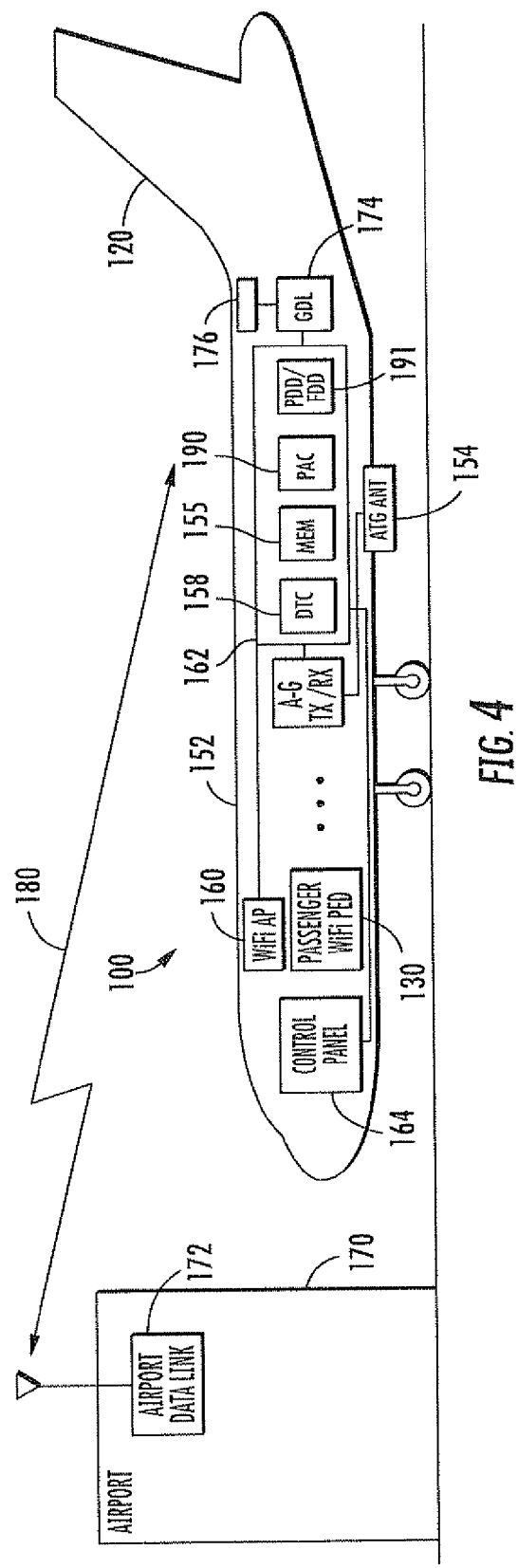
FIG. 4 is a schematic diagram of the air-to-ground communications network in which predetermined web pages are transmitted over an airport data link for storage on the aircraft in accordance with the present invention.

Referring now to FIG. 4, another aspect will be discussed with respect to the data memory cache 155 cooperating with the access point 160 for storing common data accessible by the PEDs 130 during flight of the aircraft 120. The common data may be in the form of web pages in which passengers can browse via their PED 130.

One of the functions of the data memory cache 155 is for caching predetermined web pages to be browsed. Instead of the aircraft 120 receiving the web pages while in-flight, the web pages are received while the aircraft is on the ground such as via a wireless airport data link 172. The wireless airport data link 172 may also be used to provide video and/or audio that can be selected by the passengers. Nonetheless, the web pages may be alternatively or additionally updated or refreshed while in flight. While in flight, an air-to-ground link and/or a satellite link may be used. As an alternative to the data memory cache 155, streaming video or audio could be real time or stored as provided from a satellite, including via a preexisting satellite based IFE system on the aircraft 120.

The stored web pages may be directed to a particular topic or theme, such as services and products. The services may also be directed to advertisements, for example. A purchase acceptance controller 190 cooperates with the WLAN to accept a purchase from the PEDs 130 responsive to the common data related to the services and products.

For example, the web content may be directed to an electronic retail supplier so that any one of the passengers onboard the aircraft 120 can shop for a variety of different items using their PED 130. Once a passenger selects an item for purchase, the transaction can be completed in real time while being airborne via the purchase acceptance controller 190 communicating over the air-to-ground link 200. This form of on-board shopping may also be referred to as air-commerce. Alternatively, the transaction could be initiated on-board the aircraft 120 via the purchase acceptance controller 190 but the actual purchase could be forwarded via the ground data link 174 once the aircraft 120 is on the ground.

The data memory cache 155 may be configured to push the common data related to the services and products to the PEDs 130. Also, the data memory cache 155 may permit the PEDs 130 to pull the common data related to the services and products therefrom.

Figure 5:
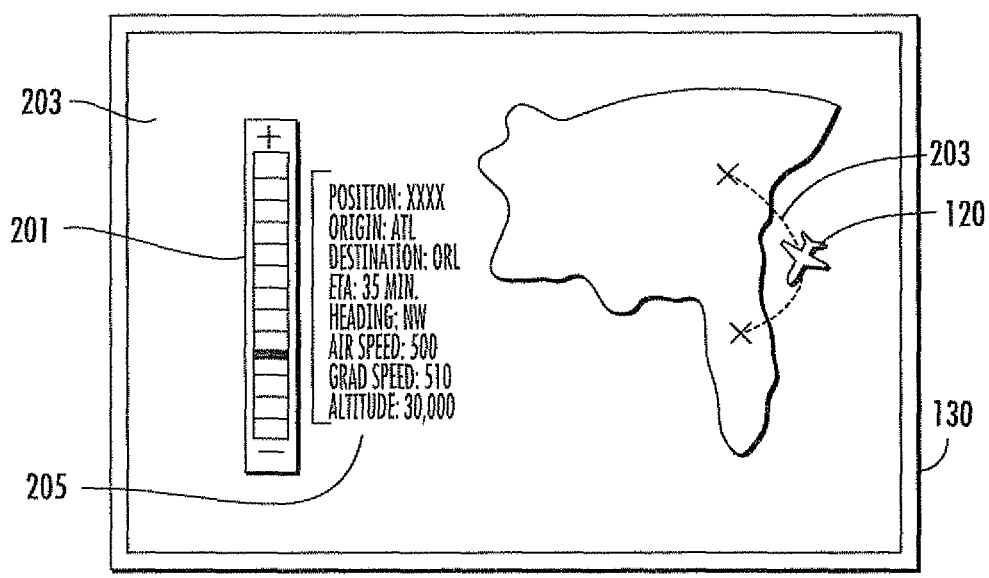
FIG. 5 is a screen shot from a PED of an interactive map corresponding to the flight path of the aircraft in accordance with the present invention.
Figure 6:
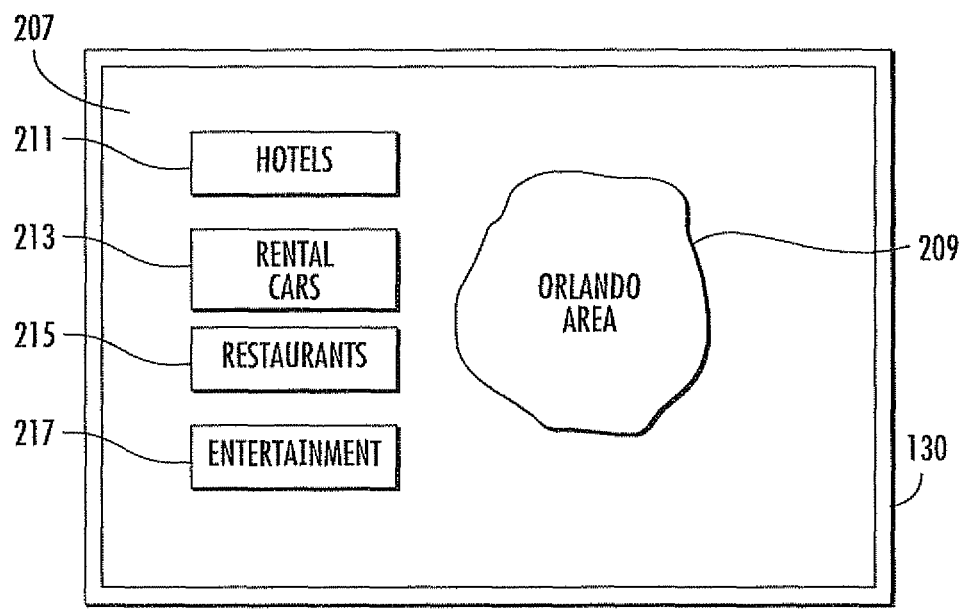
FIG. 6 is a screen shot from a PED of an interactive map corresponding to the destination of the aircraft in which different information categories are displayed in accordance with the present invention.

In addition to products and services, the common data is directed to interactive maps, as will now be discussed in reference to FIGS. 5 and 6. When an interactive map is displayed on a PED 130, the passenger is able to scroll or zoom in and out using a scroll or zoom bar 201, as illustrated by the screen shot 203 from their PED 130. The interactive maps preferably correspond to the flight path 203 of the aircraft 120, and are updated or refreshed via the ground data link 174 when the aircraft 120 is parked on the ground at the airport 170. However, the interactive maps may be related to other geographical areas, and are not limited to the flight path 203 of the aircraft.

While in flight, the current location of the aircraft 120 can be displayed. Flight information 205 may also be displayed. The current location of the aircraft 120 may be provided by a position determining device/flight path determining 191, such as a GPS system carried by the aircraft. Alternatively, the position of the aircraft 120 can be determined on the ground and passed to the aircraft over the air-to-ground link 200. The final destination of the aircraft 120 can also be displayed prior to arrival at the destination. In addition, destination information such as the arriving gate number, connecting gate numbers, baggage claim information, hotels, rental car agencies, restaurants, etc. could also be displayed.

Data associated with the destination 209 may also be made available to the passengers. As illustrated by the screen shot 207 from a PED 130, data categories titled Hotels 211, Rental Cars 213, Restaurants 215 and Entertainment 217 are available for viewing by the passenger.

If the passenger does not already have a hotel reservation, then a desired or preferred hotel associated with the destination of the aircraft 120 can be selected from the Hotels category 211. The communications system 100 advantageously allows the passenger to make a hotel reservation while in flight. Likewise, a rental car reservation can also be made while in flight if a car is needed. Other points of interest or services (such as restaurants and entertainment) associated with the destination of the aircraft 120 can also be made available to the passengers, including reservations, coupons and other available discounts, for example.

Referring back to FIG. 4, when the aircraft 120 is parked on the ground at the airport 170, a wireless airport data link 172 is used to transmit the web content pages to the data memory cache 155 via a ground data link receiver 174 carried by the aircraft 120. A ground data link antenna 176 is coupled to the ground data link receiver 174. The ground data link interface 180 may be compatible with 802.11 or 802.16, for example. The ground data link interface 180 may be Wi-Fi or WiMax for the aircraft 120. Other interface standards may be used as will be readily appreciated by those skilled in the art. These interfaces also include cellular and PCS compatibility, for example.

When the aircraft 120 lands at a different airport, the web pages can be updated or refreshed over the ground data link interface 180. In addition, email and text messaging by the PEDs 130 may be continued after the aircraft is on the ground. Since the air-to-ground interface 200 may not be available when the aircraft 120 is on the ground, the ground data link interface 180 would then be used.

Once the web pages are stored in the data memory cache 155, a passenger using their Wi-Fi or WiMax enabled PED 130 can access and browse the web pages for on-board shopping while the aircraft 120 is airborne. The data memory cache 155 is sufficiently sized for storing a large amount of information, as will be readily appreciated by those skilled in the art.

The on-board shopping just described is for items that are not carried on the aircraft 120. On-board shopping may also be provided to the passengers for a limited number of products. For example, when watching a movie or listening to music, passengers have the option of receiving standard headphones or they can purchase a different set of headphones, such as high quality noise suppression headphones. These transactions can also be completed via the passenger's PED 130 using the web-based pages stored in the data memory cache 155. In addition, movies and music can be purchased for downloading onto a passenger's PED 130.

Another aspect of the illustrated embodiment is directed to a method for operating a communications system 100 for an aircraft 120 carrying at least some personnel having personal electronic devices (PEDs) for wireless data communications outside the aircraft with a ground-based communications network. The communications system 100 may include an access point 160 in the aircraft 120 for providing a wireless local area network (WLAN) for data communications with the PEDs 130, and an air-to-ground transceiver 152 in the aircraft 120 cooperating with the access point 160 for data communications with the ground-based communications network. The method may comprise storing common data accessible by the PEDs 130 during flight of the aircraft 120 using an aircraft data memory cache 155 in the aircraft and cooperating with the access point 160.

Figure 7:
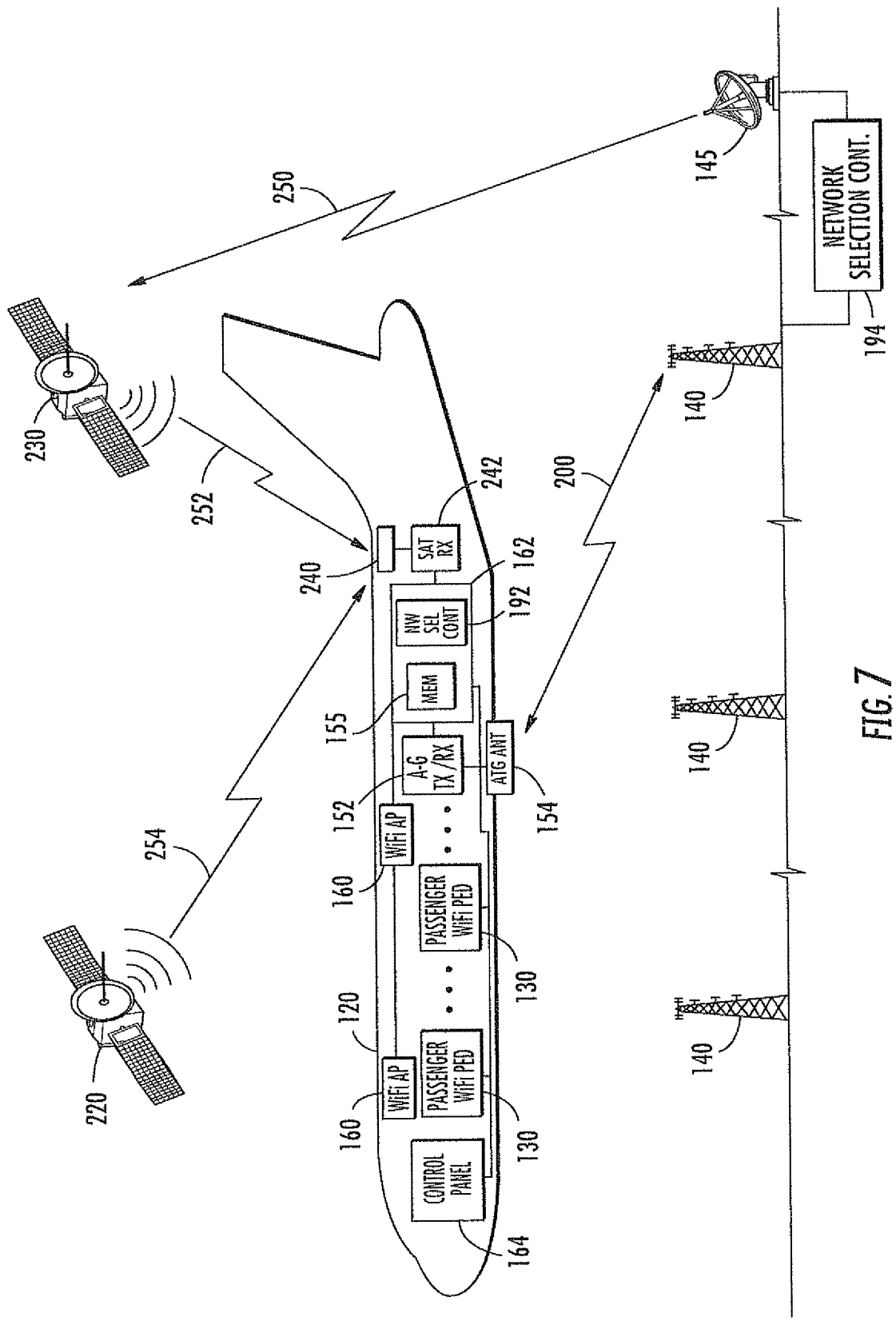
FIG. 7 is a schematic diagram of the air-to-ground communications network in which network selection controllers are used for selecting between satellite or air-to-ground communications in accordance with the present invention.

The PEDs 130 are not limited to receiving and transmitting information over the air-to-ground interface 200. Referring now to FIG. 7, signals may be transmitted from satellites 220, 230 to one or more satellite antennas 240 coupled to a satellite receiver 242 carried by the aircraft 120. If there are multiple satellite antennas, then a network selection controller 192 may be used to select the appropriate satellite antenna. This is in addition to transmitting and receiving signals over the air-to-ground interface 200 via the ground-based network and the air-to-ground transceiver 152 carried by the aircraft 120.

In the illustrated embodiment, an aircraft-based network selection controller 192 is associated with the air-to-ground transceiver 152 and the access points 160. The aircraft-based network selection controller 192 determines whether data communications should be sent to the PEDs 130 through the air-to-ground transceiver 152 or the satellite receiver 242. This is accomplished by appending data to return via a satellite.

In addition or in lieu of the aircraft-based network selection controller 192, a ground-based network selection controller 194 is coupled between a ground-based satellite transmitter 145 and the ground-based base stations 140. The ground-based network selection controller 194 also determines whether to send data communications to the PEDs 130 through the air-to-ground transceiver 152 or through the satellite receiver 242.

Satellite 220 provides television and digital radio signals for an in-flight entertainment (IFE) system on the aircraft 120 over satellite link 254. Even though only one satellite is represented, the television and digital radio signals may be provided by separate satellites, such as DirectTV™ satellites and XM™ radio satellites. In addition, satellites may be used to provide email and text messaging, multimedia messaging, credit card transactions, web surfing, etc. The illustrated satellite antenna 240 supports communications with all satellites. Alternatively, there may be a separate satellite antenna for the DirectTV™ satellites, the XM™ radio satellites, and the email-text messaging satellites.

An example IFE system is disclosed in U.S. Pat. No. 7,177,638. This patent is assigned to the current assignee of the present invention, and is incorporated herein by reference in its entirety. The television and digital radio signals are sent through the on-board server 162 to seat electronic boxes (SEBs) spaced throughout the aircraft for selective viewing on video display units (VDUs). Passenger control units (PCUs) are used to control the VDUs. The digital radio signals are also distributed to the SEBs for reception via passenger headphones.

Of particular interest is that additional information can be obtained from the satellite 220 which can then be made available to the PEDs 130. For example, the satellite 220 may provide information including sports scores, stock ticker, news headlines, destination weather and destination traffic. The satellite signals received by the satellite receiver 242 are provided to the on-board server 162 for repackaging this particular information for presentation to the PEDs 130 via the access points 160, as will be readily appreciated by those skilled in the art.

When available, satellites with or without leased transponders may also provide additional information to be repackaged by the on-board server 162. The other satellite 230 may be a fixed satellite service (FSS) for providing Internet access to the PEDs 130, for example. For example, satellite television and satellite radio signals may be provided to the passengers on their PEDs 130 via Wi-Fi.

In this configuration, a message for web pages requested by the passenger (via their PED 130) is provided over the air-to-ground interface 200. The message on the ground would then be routed to an appropriate ground-based network selection controller 194, which would then transmit the request to the FSS satellite 230. The satellite link between the appropriate ground-based transmitter 145 and the satellite 230 is represented by reference 250. The FSS satellite 230 then transmits the requested web pages to the aircraft 120 over satellite link 252 upon receiving the request from the ground.

Since the satellites may be somewhat close together in a geospatial arc, transmitting the return link over the air-to-ground link 200 instead of over the satellite links 252, 254 avoids causing interference from the aircraft 120 to neighboring satellites. Nonetheless, the request could be transmitted directly from the aircraft 120 to the satellite 230 using a steerable or directional satellite antenna.

The request provided by the PED 130 is often referred to as the return link. The information from the satellites 220, 230 to the aircraft 120 is often referred to as the forward link. The air-to-ground interface 200 is a narrow band interface, which is acceptable for making a request since such a request is typically narrower band than the forward link. In contrast, satellite links 252 and 254 are wide band interfaces, which are ideal form providing the requested web pages that are typically wide band data.

Each of the network selection controllers 192, 194 may be used to determine whether to send data communications to the PEDs 130 through the air-to-ground transceiver 152 or the satellite receiver 242 based on a needed channel capacity of the data communications to be sent or congestion on a link. Data communications with a higher needed channel capacity is typically sent with a high bandwidth using the satellite receiver 242, and data communications with a lower needed channel capacity is typically sent with a low bandwidth using the air-to-ground transceiver 152. Alternatively, the high and low broadband data communications links may be reversed. Alternatively, the network controllers could determine that the aircraft 120 is out of the coverage area for the air-to-ground network or the air-to-ground network is at capacity in the location for that aircraft. In this case, the network selection controllers could route the traffic over the satellite network. Alternatively, the network selection controllers could route some traffic types over one network and other traffic types over the other network, as readily appreciated by those skilled in the art.

One of the network selection controllers 192, 194 may determine to send data communications to the PEDs 130 through the air-to-ground transceiver 152 or through the satellite receiver 242 based on received signal strength of the data communications, or a position of the aircraft. The current location of the aircraft 120 may be provided by a position determining device/flight path determining 191, such as a GPS system carried by the aircraft. Alternatively, the position of the aircraft 120 can be determined on the ground and passed to the aircraft over the air-to-ground link 200. If the aircraft 120 is to fly over the ocean, then data should be received through the satellite receiver 242. By monitoring signal strength of the received signals or the position of the aircraft, a determination can be made on when the ground-based base stations 140 are no longer available, and communications should be received via the satellite receiver 242.

The network selection controllers 192, 194 thus determine whether to send static and dynamic web pages through the satellite-based communications network 145, 230 to the PEDs 130. Dynamic web pages include streaming video, for example. Each network selection controller 192, 194 may determine to send requests for at least one of the static and dynamic web pages from the PEDs 130 through the access points 160 and the air-to-ground transceiver 152.

As noted above, predetermined web pages are stored in the data memory cache 155 when the aircraft 120 is parked on the ground (i.e., electronic retailer shopping and on-board shopping, as well as advertisements). Since the satellite links 252, 254 are wide band, the requested web information may also be downloaded for storage or refreshed in the data memory cache 155 while the aircraft is in flight.

Another aspect of the illustrated embodiment is directed to a method for operating a communications system 100 for an aircraft 120 carrying at least some personnel having personal electronic devices (PEDs) 130 for wireless data communications outside the aircraft. The communications system 100 includes a ground-based communications network, a satellite-based communications network, and at least one access point 160 in the aircraft 120 for providing a WLAN for data communications with the PEDs 130. An air-to-ground transceiver 154 in the aircraft 120 may cooperate with the at least one access point 160 for data communications with the ground-based communications network, and a satellite receiver 242 in the aircraft may cooperate with the at least one access point for data communications with the satellite-based communications network to the PEDs. The method includes determining whether to send data communications to the PEDs 130 through the air-to-ground transceiver 152 or the satellite receiver 242.

Figure 8:
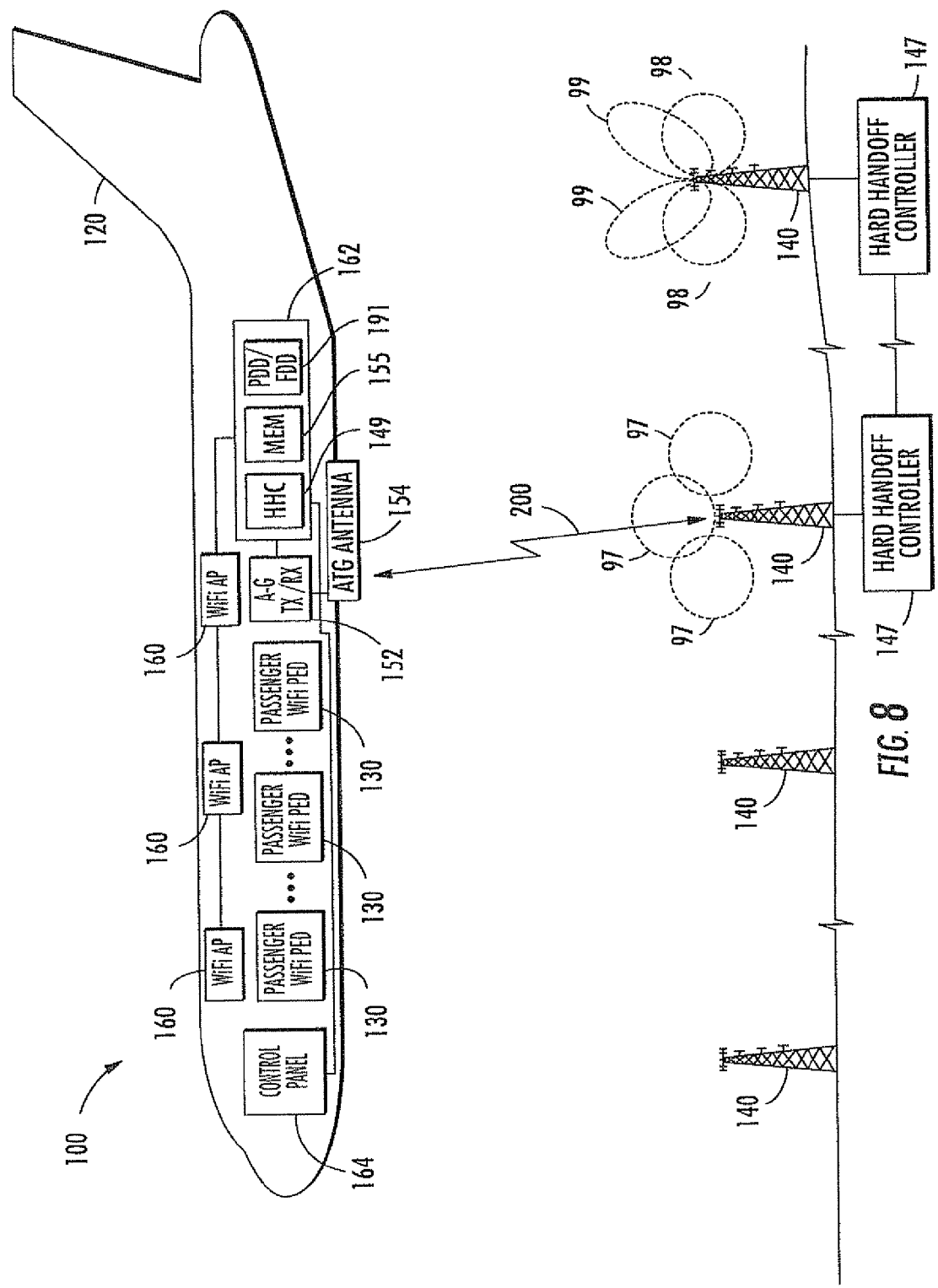
FIG. 8 is a schematic diagram of the air-to-ground communications network in which hard handoff controllers are used for handing off the aircraft between base stations in accordance with the present invention.

Referring now to FIG. 8, another aspect is directed to handoff of the aircraft 120 from one ground-based base station 140 to an adjacent ground-based base station, or between azimuth or elevation sectors on one base station. Since the air-to-ground network 100 may be optimized for data instead of voice, delays or latencies can be tolerated without the end user having the perception that the call is being dropped, as is the case with voice. Consequently, soft handoffs are needed for voice-based networks.

In contrast, data can be stored on the ground or on the aircraft while the aircraft 120 is between cell coverage areas for a hard handoff. Once the aircraft 120 is within coverage of the next cell, the data can then be forwarded.

Hard handoffs can thus be used to make the connection from one base station 140 to an adjacent base station in support of the air-to-ground communications network 100. Messages being communicated between a PED 130 and the ground can be stored in a buffer or memory 157. The buffer 157 may be part of the data memory cache 155, or alternatively, the buffer may be a separate memory as illustrated. Each base station 140 has a hard handoff controller 147 associated therewith. Moreover, with the aircraft 120 typically flying at speeds over 500 mph, the delay is relatively short.

To support a soft handoff, as would be necessary with voice, twice the spectrum resources would be needed. With a hard handoff, the spectrum is preserved at the expense of having sufficient memory for storing data in the buffer 157 (or on the ground) during a handoff while the aircraft 120 is between base stations 140.

The base stations 140 define respective adjacent coverage areas and comprise respective hard handoff controllers 147 for implementing a hard handoff of a data communications channel with the air-to-ground transceiver 152 as the aircraft 120 moves from one coverage area to an adjacent coverage area.

An aircraft hard handoff controller 149 may cooperate with the hard handoff controllers 147 on the ground. The aircraft hard handoff controller 149 cooperates with ground-based hard handoff controllers 147 by monitoring metrics. The metrics include a received signal strength of the data communications channel, or available capacity at the base station 140, for example.

In another embodiment for implementing an aircraft hard handoff, the aircraft hard handoff controller 149 implements the hard handoff of a data communications channel with the air-to-ground transceiver 152 as the aircraft 120 moves from one coverage area to an adjacent coverage area. This implementation may be based on metrics collected in the aircraft. These metrics include a Doppler shift of the data communications channel, a signal-to-noise ratio of the data communications channel, or a received signal strength of the data communications channel. This implementation may also be based on position of the aircraft 120, as readily appreciated by those skilled in the art.

The buffer 157 may be separate from the aircraft hard handoff controller 149 or may be integrated as part of the hard handoff controller. The first and second hard handoff controllers 147 may implement the hard handoff based on the following metrics: a Doppler shift of the data communications channel, a signal-to-noise ratio of the data communications channel, or a received signal strength of the data communications channel, as will be readily appreciated by those skilled in the art.

In other embodiments, a position/flight determining device 191 on the aircraft 120 cooperates with the ground-based hard handoff controllers 147 for implementing the hard handoff based upon a position of the aircraft. The position/flight path determining device 191 may be a GPS or other navigational device.

The base stations 140 may be configured with selectable antenna beams for performing the hard handoff, as will now be discussed. In one embodiment, one or more of the base stations 140 include selectable antenna beams 97, with each antenna beam having a same pattern and gain but in a different sector as compared to the other antenna beams. The different sector may also be defined in azimuth and/or elevation. Each antenna beam 97 may be optimized in terms of gain and beam width. The minimally overlapping antenna beams 97 thus provide complete coverage in the different sectors.

In another embodiment, one or more of the base stations 140 include selectable antenna beams 98 and 99, with at least two antenna beams being in a same sector but with a different pattern and gain. Antenna beam 99 is high gain with a narrow beam width for communicating with the aircraft 120 at an extended distance from the base station 140. When the aircraft 120 is closer in range to the base station 140, antenna beam 98 is selected, which is low gain with a wide beam width.

As noted above, there are a number of different metrics to monitor to determine when airborne users (i.e., PEDs 130) within an aircraft 120 are to be handed off to a next base station 140. In terms of Doppler, the Doppler shift on the MAC addresses of the signals received by each base station 140 are examined. The Doppler metric is to be factored into the handoff algorithm at each base station 140.

When using GPS coordinates, each base station 140 receives GPS coordinates of the aircraft 120, and based upon movement of the aircraft, the base stations coordinate handoff of the aircraft accordingly from base station to base station.

Along the same lines, sectorized antennas at the base station 140 may be used for communicating with the aircraft 120. The antennas at each base station 140 may provide a high gain/narrow beamwidth coverage sector and a low gain/broad beamwidth coverage sector. The high gain/narrow beamwidth coverage sector may be used when link conditions with the aircraft 120 are poor. Sites could be sectorized in azimuth, elevation or both. These sectors could be static or dynamic.

If the link conditions with the aircraft 120 are good, then the low gain/broad beamwidth coverage beam is used. In one embodiment, the coverage sectors are selected based upon the link conditions with the aircraft 120. Alternatively, the coverage sectors are fixed at the base station 140. For example, the high gain/narrow beamwidth coverage sector may be used for aircraft 120 that are farther away from the base station 140, whereas the low gain/broad beamwidth coverage sector may be used for aircraft flying near the base station.

Lastly, a ground selection algorithm may be used to select a ground-based base station 140 based on the flight path and the base stations in proximity to the flight path. If the aircraft 120 is about to exit a cell, transmitted email and text messages for a PED 130 are stored until the aircraft is in the next coverage area. This advantageously allows a longer continuous connection, which makes use of the limited spectrum resources more efficiently. The ground selection algorithm could use ground-based location information or GPS data on the location of the aircraft 120 and known ground site locations to optimize connection times. The resulting system may thus be considered a store-and-forward architecture.

Another aspect of the illustrated embodiment is directed to a method for operating a communications system 100 for an aircraft 120 carrying at least some personnel having personal electronic devices (PEDs) 130 for wireless data communications outside the aircraft with a ground-based communications network. The communications system 100 includes a plurality of spaced apart base stations 140, and at least one access point 160 in the aircraft 120 for providing a wireless local area network (WLAN) for data communications with the PEDs 130. An air-to-ground transceiver 152 in the aircraft 120 may cooperate with the at least one access point 160 for data communications with the ground-based communications network. The method may include operating first and second base stations 140 to define respective first and second adjacent coverage areas, with the first and second base stations comprising respective first and second hard handoff controllers 147. The respective first and second hard handoff controllers 147 are operated for implementing a hard handoff of a data communications channel with the air-to-ground transceiver 152 as the aircraft 120 moves from the first coverage area to the second adjacent coverage area. Alternatively, the handoff decision can be implemented by an aircraft hard handoff controller 149 in the aircraft 120. This implementation may be based on metrics collected in the aircraft 120.

Figure 9:
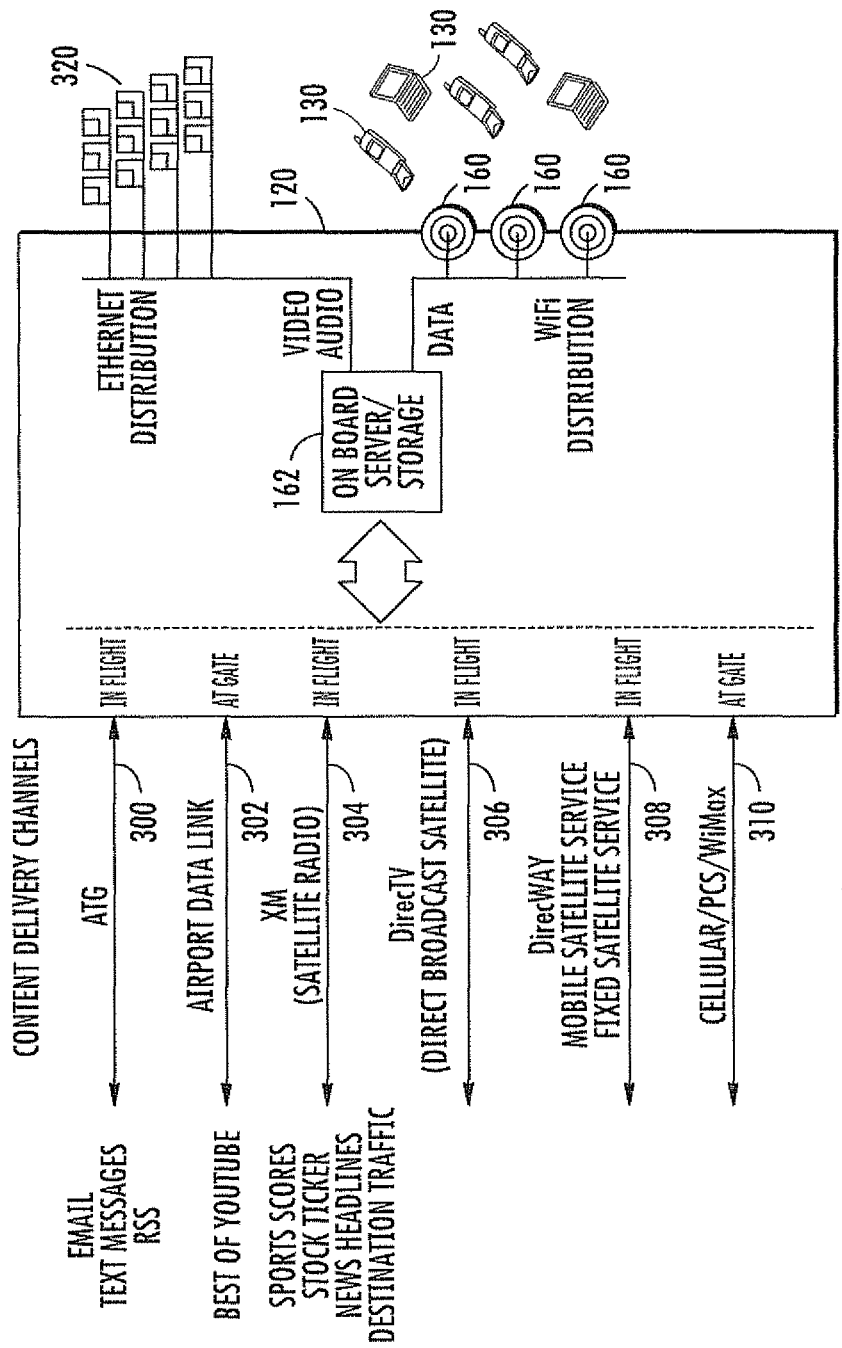
FIG. 9 is a schematic diagram of the different content delivery channels available for distribution to the aircraft passengers in accordance with the present invention.

To summarize example on-board content deliveries to the aircraft 120 from the various sources, reference is directed to FIG. 9. When in flight, the air-to-ground interface 200 provides connectivity for features that include email, text messaging, credit card transactions, multimedia messaging, web surfing and RSS as indicated by reference 300. To use RSS, the PED 130 has an RSS news reader or aggregator that allows the collection and display of RSS feeds. RSS news readers allow a passenger to view the service selected in one place and, by automatically retrieving updates, stay current with new content soon after it is published. There are many readers available and most are free.

The airport data link 172 may be used to provide the best of YouTube™ as indicated by reference 302. The XM™ satellite 220 may provide sports scores, stock ticker, news headlines and destination traffic as indicated by reference 304. DirectTV™ may also be provided by satellite 220 which can be used to provide additional information as indicated by reference 306. For future growth, two-way communications may be provided by a satellite as indicated by reference 308, such as with DirecWay or Hughesnet, for example. The airport data link 172 may also be used to provide cellular/PCS/WiMax services as indicated by reference 310.

The above content is provided to the on-board server 162 which may include or interface with the data memory cache 155. The data is provided to passenger PEDs 130 using Wi-Fi or WiMax distribution via the access points 160. Video and data is provided to an Ethernet distribution 320 for distributing throughout the aircraft as part of the in-flight entertainment system.

Figure 10:
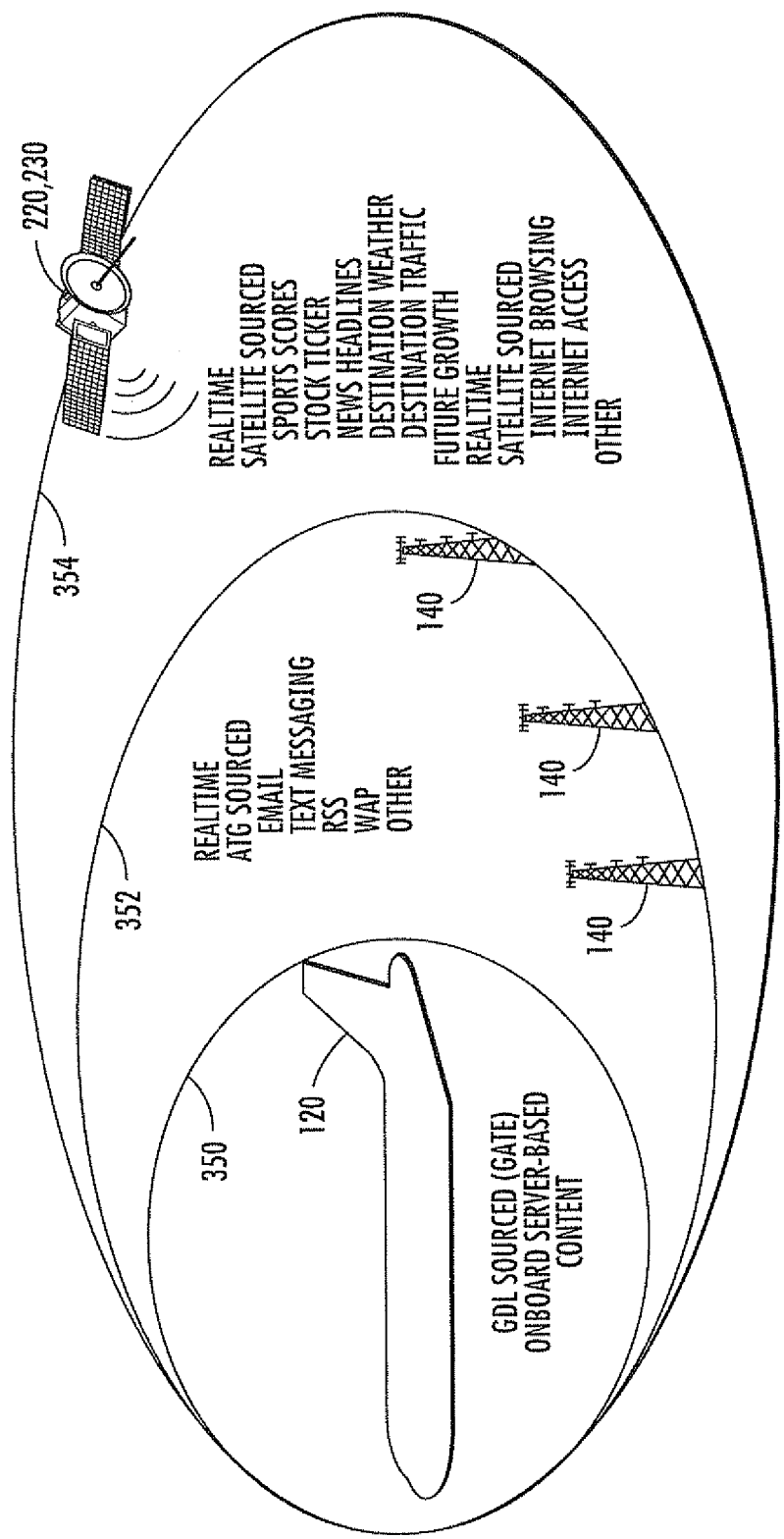
FIG. 10 is a schematic diagram of the aircraft illustrating the different ranges in which data communications is received in accordance with the present invention.

In terms of transmission distance or proximity to the aircraft 120 for the above-described on-board content deliveries, reference is directed to FIG. 10. Circle 350 represents information provided by the airport ground data link 172 when the aircraft 120 is parked at the airport 170 or moving about the airport with weight on wheels. When airborne, circle 352 represents information provided via the air-to-ground interface 200, and circle 354 represents the information provided by the satellites 220, 230. The information as discussed above is summarized in the respective circles 350, 352 and 354.

In view of the different air interface standards associated with the aircraft 120, the on-board server 162 may be configured to recognize the available air interface standards. As a result, the on-board server 162 selects the appropriate air interface standard based on proximity to a particular network. This decision may also be based on the bandwidth that is available, location of the aircraft 120 as determined by GPS, and whether the aircraft is taking off or landing. For example, when the aircraft 120 is on the ground, the ground data link interface 180 is selected. When airborne, the network selection controllers 192, 194 select either the air-to-ground interface 200 or a satellite interface 252, 254 depending on traffic demands, or both, for example.

Depending on the airline rules and regulations, the cellular mode of a dual mode cellular/Wi-Fi device may not be operated on an aircraft below a certain altitude, such as 10,000 feet. To support this requirement, the on-board server 162 and the Wi-Fi access points 160 may have enough pico-cell capability to drive the cellular radio in dual mode devices to minimum power or even to turn the cellular radios off. The connection to the wireless on-board network could be Wi-Fi or WiMax. The pico-cell function would be to drive cellular/PCS output power to a reduced/minimum or off condition. This turns the cellular/PCS transmitter "off" while on the aircraft, while allowing Wi-Fi transmission and reception.

Another metric to monitor on the aircraft 120 is related to priority of service. This is due to the fact that that aircraft 120 can receive information over a wide band link from a satellite, for example, and transmit requests for the information over a narrow band link. If someone tries to send a large attachment on their email over the narrow band link, or they are video/audio streaming, then access will be denied or throttled or charged for a premium service for large data transfers by the data traffic controllers 158, 148. It could also be possible to use pico-cells to connect cellular/PCS mobile phones (PED) 130 to the on-board systems.

Therefore, traffic is monitored in terms of metrics to make quality of service and priority of service decisions. This decision may be made on-board the aircraft 120 for any traffic leaving the aircraft 120. This decision may also be made on the ground, which monitors if someone on the ground is sending to large of an attachment, and if so, then access will also be denied or throttled or charged for a premium service for large data transfers. These criteria for decisions could by dynamic or static.

Priority of service also relates to quality of service. Various metrics and traffic conditions can be monitored to provide connectivity to a greater or maximum number of airline passengers on a flight. Operations and cabin passenger entertainment (email, text messaging, web browsing, etc.) data can be multiplexed on a variable latency link. Operational and passenger data may also be multiplexed with multiple priorities of service allowing some data to be handled at a higher priority than other data.

Yet another aspect of the aircraft air-to-ground communications network 10 is with respect to advertisements. The advertisements are used to generate revenue from the air to ground, hybrid air to ground/satellite, or satellite communications network. For example, when a passenger opens up their laptop computer 130 on the aircraft 120, a decision is made whether or not to use the 802.11 Wi-Fi or 802.16 WiMax network. If the decision is yes, then an advertisement is displayed while accessing the network.

In addition, when portal pages are viewed, advertisements will also be displayed. Since the advertisements are used to generate revenues, passengers are allowed access to the air-to-ground communications network 100 without having to pay with a credit card or touchless payment method, as was the case for the Connexion by Boeing$^{SM}$ system. While looking at different web pages, the passengers will see advertisements interspersed or sharing the same screen.

Another function of the aircraft 120 is to use the air-to-ground communications network 100 for telemetry. Telemetry involves collecting data at remote locations, and then transmitting the data to a central station. The problem arises when the data collection devices at the remote locations are separated beyond line-of-sight from the central station. Consequently, one or more towers are required to complete the telemetry link. To avoid the costly expense of providing telemetry towers, the aircraft 120 may be used to relay the collected information from the remote locations to the central station when flying overhead.

Yet another function of the aircraft 120 is to use the air-to-ground communications network 100 for ground-based RFID tracking. Similar to using the aircraft 120 for telemetry, the aircraft may also be used for tracking mobile assets on the ground, such as a fleet of trucks, for example. The trucks transmit RFID signals that are received by the aircraft 120 as it flies overhead. The information is then relayed to a central station. The RFID signals may be GPS coordinates, for example.

Another aspect of the air-to-ground communications network 100 is to provide video on demand on the aircraft 120. This feature has been partially discussed above and involves providing television signals on demand to passengers on the aircraft. The television signals may be terrestrial based or relayed via a satellite. In particular, the return to make the request is not the same as the forward link providing the video. The return link is a low data rate link, and may be provided by the aircraft passenger's PED 130 over the air-to-ground interface 200. The forward link is a high data rate link received by a terrestrial or satellite based receiver on the aircraft. The video is then routed through the aircraft in-flight entertainment system to the passenger, or to the passenger's PED 130 via Wi-Fi. Alternatively, the video or audio can be stored in the server 162 and displayed when requested by a passenger.

Figure 11:
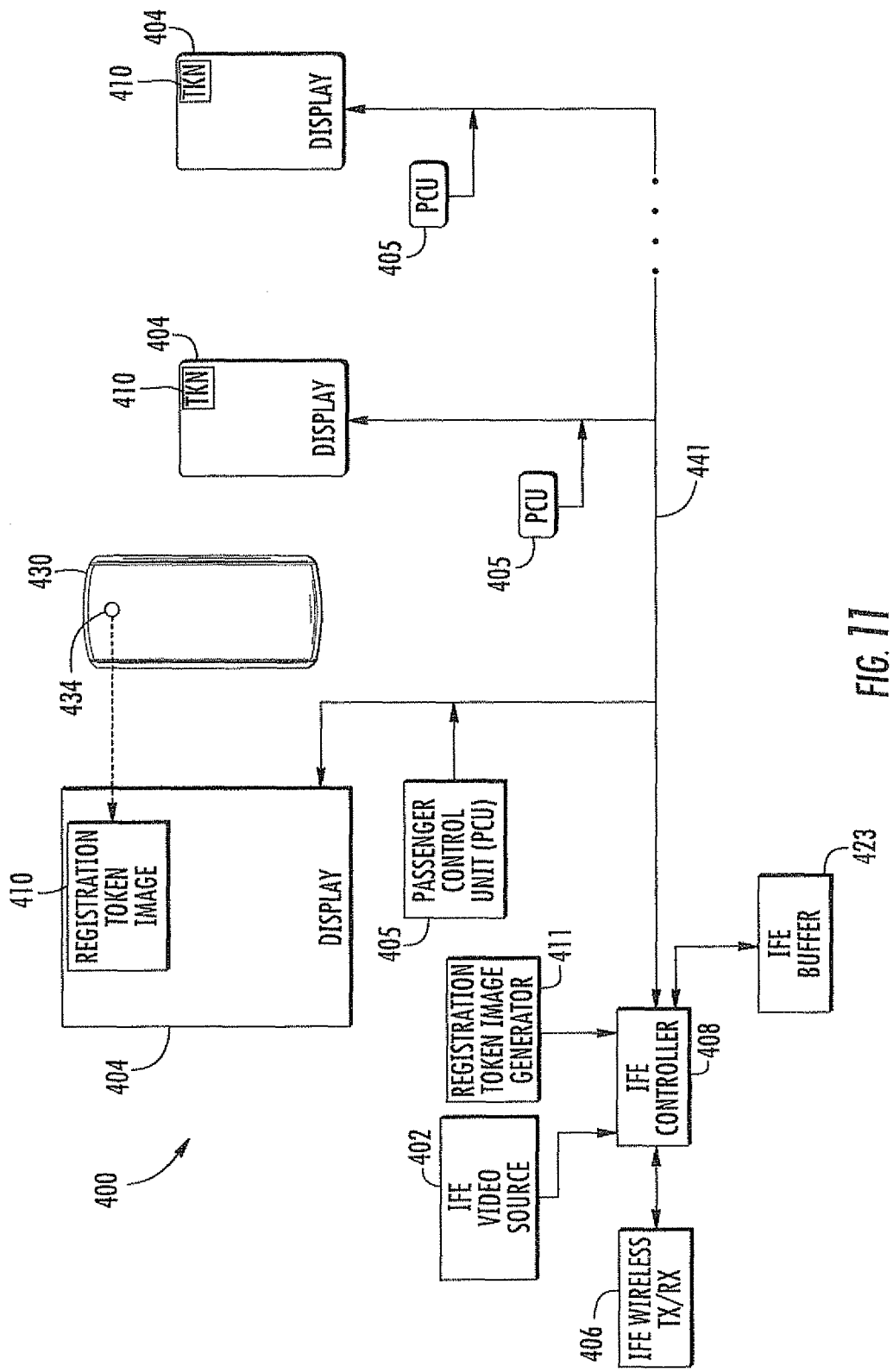
FIG. 11 is a schematic diagram of a communications system illustrating registration of a PED with an IFE system using aircraft generated registration token images in accordance with the present invention.

Referring now to FIG. 11, another aspect is directed to registration of PEDs 430 with an aircraft IFE system 400. Operation of the PEDs 430 with the aircraft IFE system 400 forms a communications system for the aircraft.

For illustration purposes, the aircraft IFE system 400 comprises an IFE video entertainment source 402, a plurality of IFE passenger seat displays 404, at least one IFE wireless transceiver 406, and at least one IFE controller 408. The IFE controller 408 is for selectively displaying video from the IFE video entertainment source 402 on the IFE passenger seat displays 404, for generating a respective registration token image 410 on each IFE passenger seat display 404, and for communicating via the IFE wireless transceiver 406. A signal distribution network 441 connects the IFE controller 408 to the passenger seat displays 404.

Figure 12:
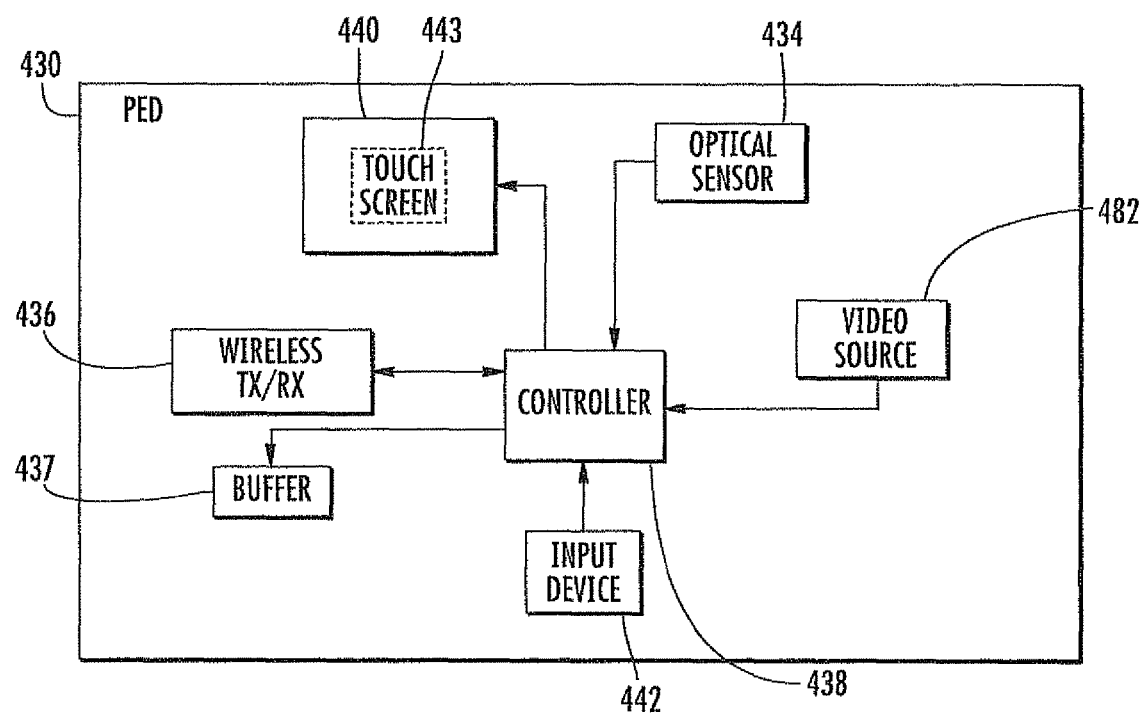
FIG. 12 is a schematic diagram of the PED as shown in FIG. 11.

Each PED 430 comprises a PED optical sensor 434, a PED wireless transceiver 436, and a PED controller 438, as illustrated in FIG. 12. The PED optical sensor 434 may be configured as a camera, for example. The PED controller 438 is for communicating with the IFE wireless transceiver 406 via the PED wireless transceiver 436 based upon the PED optical sensor 434 sensing the registration token image 410.

Each respective registration token image 410 advantageously allows the PED controller 438 to register with the IFE controller 408 upon communicating therewith. The PED 430 that sensed the registration token image is assigned to and associated with the IFE passenger seat display 404 that displayed the registration token image being sensed. Once registered, the PED 430 is integrated with the IFE system 400.

The registration token image 410 may remain displayed after registration. In this case, the registration token image 410 overlays any images being displayed on the passenger seat display 404. Alternatively, the registration token image 410 may be removed or simply fades out after a PED 430 has registered with the IFE controller 408.

Figure 13:
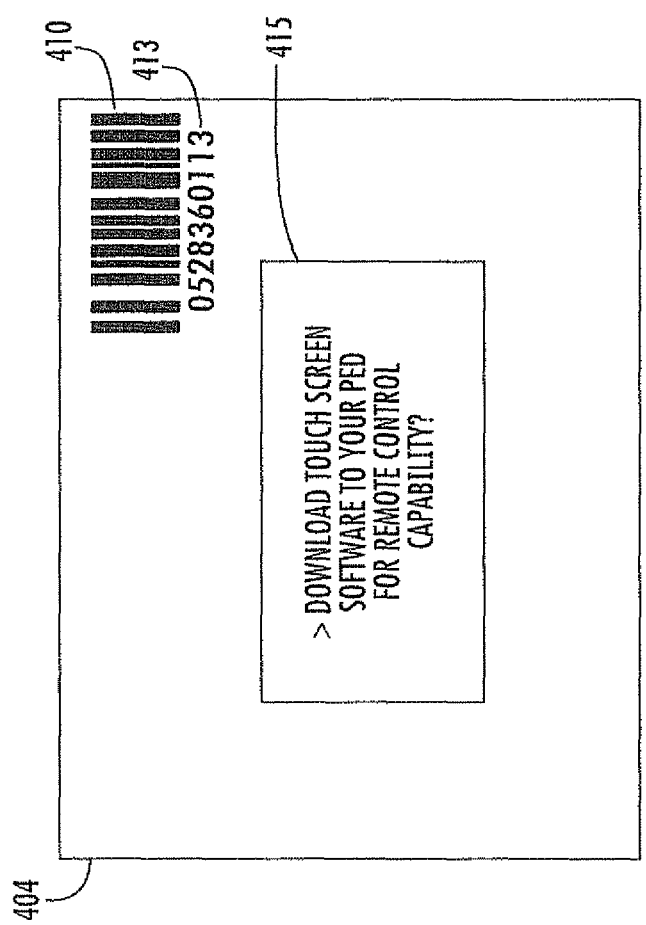
FIG. 13 is a view of a passenger seat display displaying a registration token image in accordance with the present invention.

The registration token image 410 may be configured as a bar code, for example, as illustrated in FIG. 13. Each registration token image 410 has a unique number or identification 413 associated therewith. As an alternative or as a backup, the passenger may manually enter the unique number or identification 413 into their PED 430 to bypass the need for the optical sensor 434.

As readily appreciated by those skilled in the art, the registration token image 410 is not limited to a bar code. Other configurations of the registration token image 410 may be used as long as a unique number or identification 413 is associated therewith.

As will be explained in greater detail below, an integrated PED 430 may be operated as a remote control for remotely controlling the video displayed on an IFE passenger seat display 404. Another option is for, the PED 430 to operate as an entertainment source for displaying video on the IFE passenger seat display 404. Yet another option is for the PED 430 to display video on a PED display 440 from the IFE video entertainment source 402. The video provided by the IFE video entertainment source 402 may be pre-recorded. Alternatively, the IFE entertainment source may be configured to provide audio only.

To operate as a remote control, the PED 430 includes a PED input device 442 coupled to the PED controller 438. The PED input device 442 may be separate from the PED display 444, as shown in FIG. 12. Alternatively, the PED input device 442 may be overlaid with the PED display 446 as a touch screen, as indicated by the dashed profile 443 as also shown in FIG. 12.

The PED input device 442 cooperates with the PED controller 438 to selectively control video being displayed on the IFE passenger seat display 404 that displayed the registration token image 410 used in the registration. Instead of the passenger using the passenger control unit (PCU) 405 coupled to the IFE controller 408 to selectively control the displayed video on the IFE passenger seat display 404, the passenger's PED 430 may now be used.

With the PED 430 operating as a wireless remote control, this advantageously allows the passenger to easily control operation of the IFE system 400. Another dimension of control is thus made available to the passenger. Alternatively, the PCU 405 may still operate for controlling the video displayed on the IFE passenger seat display 404.

Figure 14:
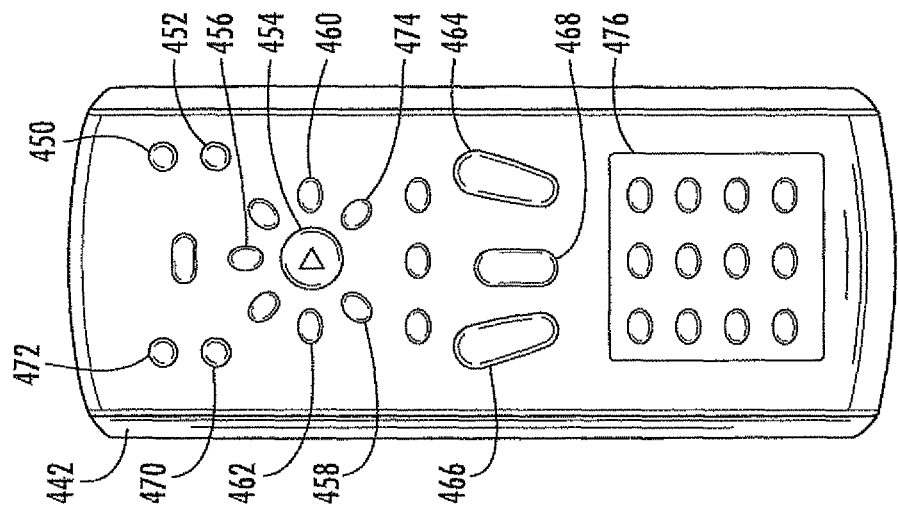
FIG. 14 is a diagram of a PED input device illustrating available remote control functions in accordance with the present invention.

The PED input device 442 may provide a full set of functions normally associated with an in seat remote control. As illustrated in FIG. 14, the PED input device 442 includes an on button 450, an off button 452, a play button 454, a stop button 456, a pause button 458, a forward button 460 and a reverse button 462. The PED input device 442 also includes an up and down channel selection button 464, an up and down volume button 466, an up and down brightness button 468, a mute button 470, a guide button 472 and a zoom button 474. The PED input device 442 may further include a numerical input pad 476 for entering specific channels.

The PED input device 442 is typically limited to the capabilities of each passenger's PED 430. Consequently, more or less functions may be provided by PED input device 442 depending on the capabilities of each passenger's PED 430. In some configurations, the PED input device 442 provides an enhanced set of functions, i.e., more than the set of functions normally associated with an in-seat remote control.

When the PED input device 442 is configured as a touch screen 443, it is software driven. Application software for the touch screen 443 may be preloaded into the PED 430 from the manufacturer, or the application software may be downloaded by the passenger prior to boarding the aircraft. Alternatively, the application software may be downloaded to the PED 430 while on-board the aircraft. To download the application software, the IFE controller 408 generates a prompt 415 that is displayed on the IFE passenger seat display 404, as illustrated in FIG. 13. The prompt 415 may state "download touch screen software to your PED for remote control capability?"

The passenger either accepts or rejects download of the application software for the touch screen 443 depending on the existing capabilities of their PED 430. If a passenger accepts the download, then the application software is wirelessly communicated to their PED 430 so that the touch screen 443 is overlaid on their PED display 440. The IFE transceiver 406 provides the application software to the PED 430.

To operate as a remote control, the PED 430 wirelessly communicates to the IFE wireless transceiver 406 via the PED wireless transceiver 436 using radio frequency (RF). Accordingly, the IFE wireless transceiver 406 is configured as an RF transceiver. Likewise, the PED wireless transceiver 436 is configured as an RF transceiver. Communications between the RF transceivers 406, 436 may be based on Wi-Fi or Bluetooth, for example.

The IFE wireless transceiver 406 may operate as an access point within the aircraft. When operating as an access point, the IFE wireless transceiver 406 provides a WLAN for data communications with the PEDs 430.

As noted above, each registration token image 410 has a unique number or identification associated therewith and to each respective seat. As a result of the registration, there is a one-to-one communications link from the PED 430 to the IFE controller 408 to control the passenger seat display 404 that provided the registration token image sensed by the PED optical sensor 434 within the just registered PED 430. The communications may be coded to include the unique number or identification associated with the registration token image 410. Each remote control function transmitted by the PED input device 442 may be preceded by the unique identification associated therewith, for example. Alternatively, a passenger may enter the unique number of the registration token image 410 into their PED 430 to establish the one-to-one communications link from the PED 430 to the IFE controller 408.

For each flight, the respective registration token images 410 may be randomly generated for each IFE passenger seat display 404. This avoids a passenger from operating their PED 430 with a registration token image obtained from a previous flight on the same aircraft so that it would interfere with another passenger's IFE passenger seat display 404.

To generate the registration token images 410, a registration token image generator 411 is coupled to the IFE controller 408. The registration token image generator 411 may randomly generate the respective registration token images 410 for each IFE passenger seat display 404. The registration token images 410 may be randomly generated once a day, such as prior to the first flight of the day, for example. Alternatively, generation of new registration token images 410 by the registration token image generator 411 may be initiated anytime by a flight crewmember.

Figure 15:
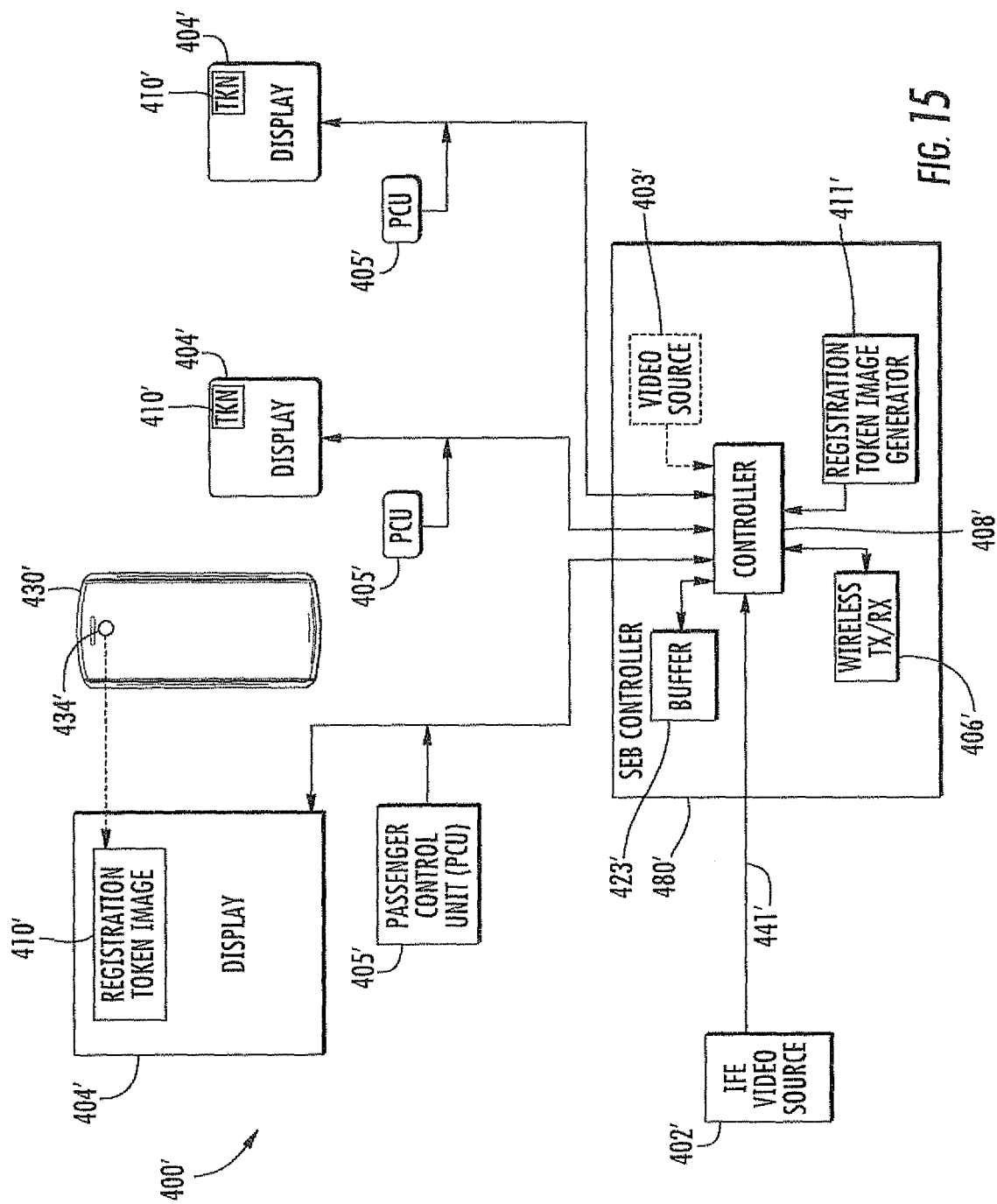
FIG. 15 is schematic diagram of another embodiment of the communications system illustrated in FIG. 11 wherein an IFE seat electronics box (SEB) controller interfaces with the IFE passenger seat displays.

As an alternative to a single IFE controller 408, there is a plurality of IFS seat electronic box (SEE) controllers arranged throughout the aircraft. As illustrated in FIG. 15, each SEB controller 480' may support one or more IFE passenger seat displays 404'. Each SEB controller 480' includes at least one IFE wireless transceiver 406' to support interface with the PED 430.

In the illustrated example, three IFE passenger seat displays 404' are supported by an IFE SEE controller 480'. Although not illustrated, each IFE passenger seat display 404' may have its own IFS wireless transceiver 406' associated therewith.

The SEB controller 480' is coupled to the video entertainment source 402' via the signal distribution network 441'. Alternatively, each SEB controller 408' may include a video entertainment source 403' coupled thereto. The illustrated SEE controller 480' may also include its own registration token image generator 411' for the IFE passenger seat displays 404' coupled thereto. Each registration token image generator 411' would operate independently of the other registration token image generators in the other SEB controllers 480'.

In addition to a PED 430 operating as a remote control, other functions/features are readily available once the PED 430 is registered with the IFE controller 408. As noted above, the PED 430 may be operated as an entertainment source for displaying video on the IFE passenger seat display 404. This advantageously allows the passenger to have a greater selection of choices for viewing video during the flight.

The PED 430 includes a PED video entertainment source 482 coupled to the PED controller 438, as shown in FIG. 12. The PED controller 438 cooperates with the PED video entertainment source 482 for selectively displaying video therefrom on the passenger seat display 404 that displayed the token image 410 used in the registration.

The PED entertainment source 482 may be a hard drive or a DVD drive, for example. Alternatively, an external entertainment source may be coupled to the PED 430 for providing the video to be displayed on the IFE passenger seat display 404.

The video from the PED 430 is wirelessly transmitted to the IFE wireless transceiver 406. An IFE video buffer 423 may be coupled to the IFE controller 408 to store at least a portion of the video from the PED 430 prior to being viewed on the IFE passenger seat display 404. By introducing a delay in the playback of the PED entertainment source 482, this reduce playback interruptions of the video should the wireless communications interface between the PED wireless transceiver 436 and the IFE wireless transceiver 406 be momentarily blocked or interrupted.

In the IFE SEB controller 480' configuration as shown in FIG. 15, a video buffer 423' may also be coupled to the SEB controller 408' to store at least a portion of the video from the PED 430' prior to being viewed on the IFE passenger seat display 404'.

In lieu of an RF transceiver 406', the transceiver may operate based on infrared. This would require the PED input device 442' to be compatible with infrared, as well as requiring an infrared sensor to be positioned within view adjacent the IFE passenger seat display 404'.

The PED input device 442' thus controls display of the video from the PED video entertainment source 403'. Since each passenger seat includes an IFE input device 405', the IFE input device 405' may also be used to control the displayed video from the PED 430'.

Yet another function/feature readily available once the PED 430 is registered with the IFE controller 408 is for the PED 430 to display video from the IFE video entertainment source 402. This advantageously allows the passenger to comfortably view the video from the IFE video entertainment source 402 on their PED 430.

The video from the IFE entertainment source 402 is wirelessly transmitted to the PED wireless transceiver 436 via the IFE wireless transceiver 406. A PED video buffer 437 may be coupled to the PED controller 438 to store at least a portion of the video from the IFE entertainment source 406 prior to being viewed on the PED display 440. As explained above, the video buffer 437 helps to reduce playback interruptions of the video should the wireless communications interface between the PED wireless transceiver 436 and the IFS wireless transceiver 406 be momentarily blocked or interrupted or fades.

The PED input device 442 controls display of the video from the IFE entertainment source 402. Since each passenger seat may also include an IFS input device 405, this input device may alternatively be used to control the displayed video from the IFS entertainment source 402.

Figure 16:
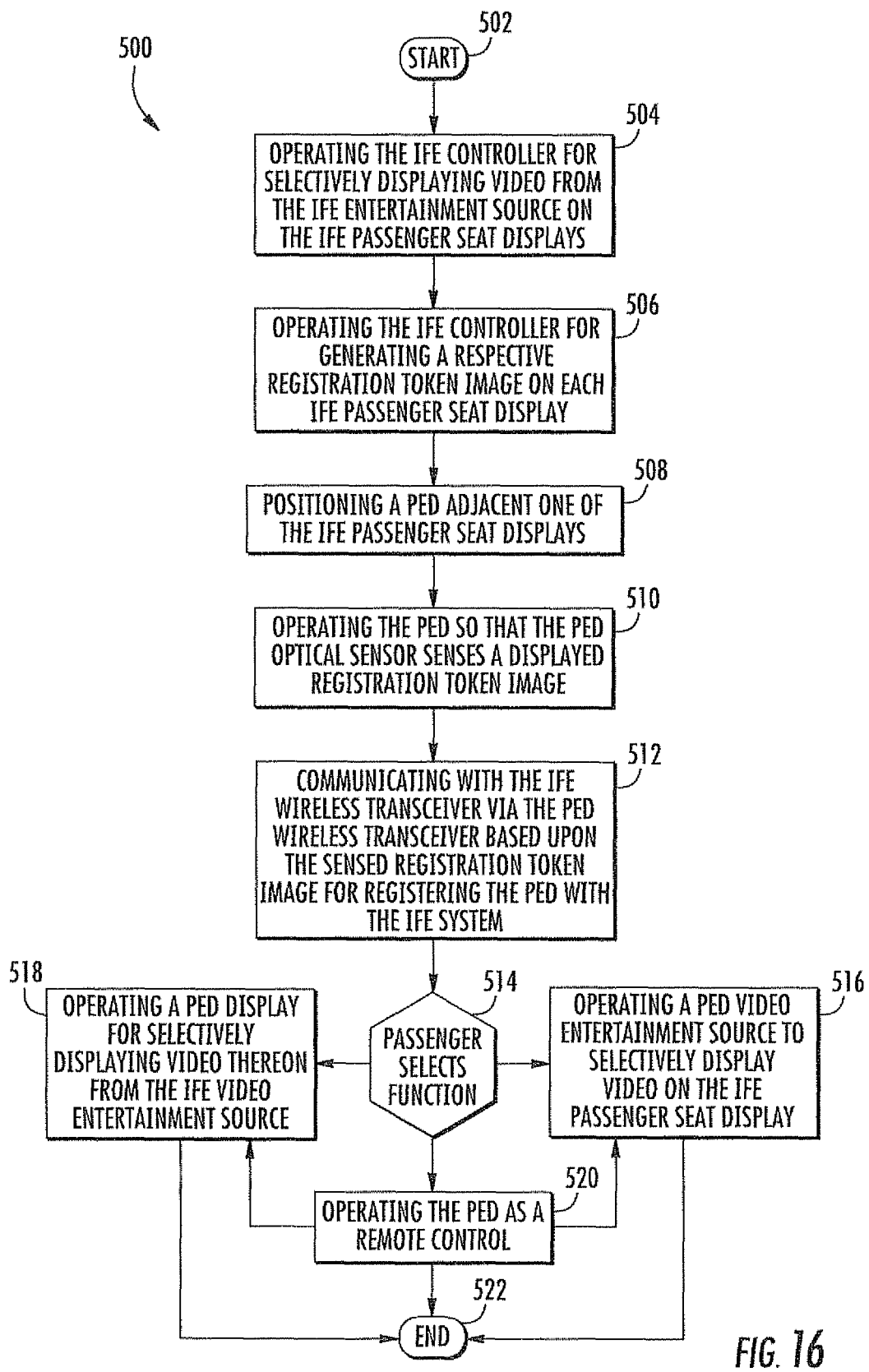
FIG. 16 is a flowchart illustrating registration of a PED with an IFS system using aircraft generated registration token images in accordance with the present invention.
Figure 17:
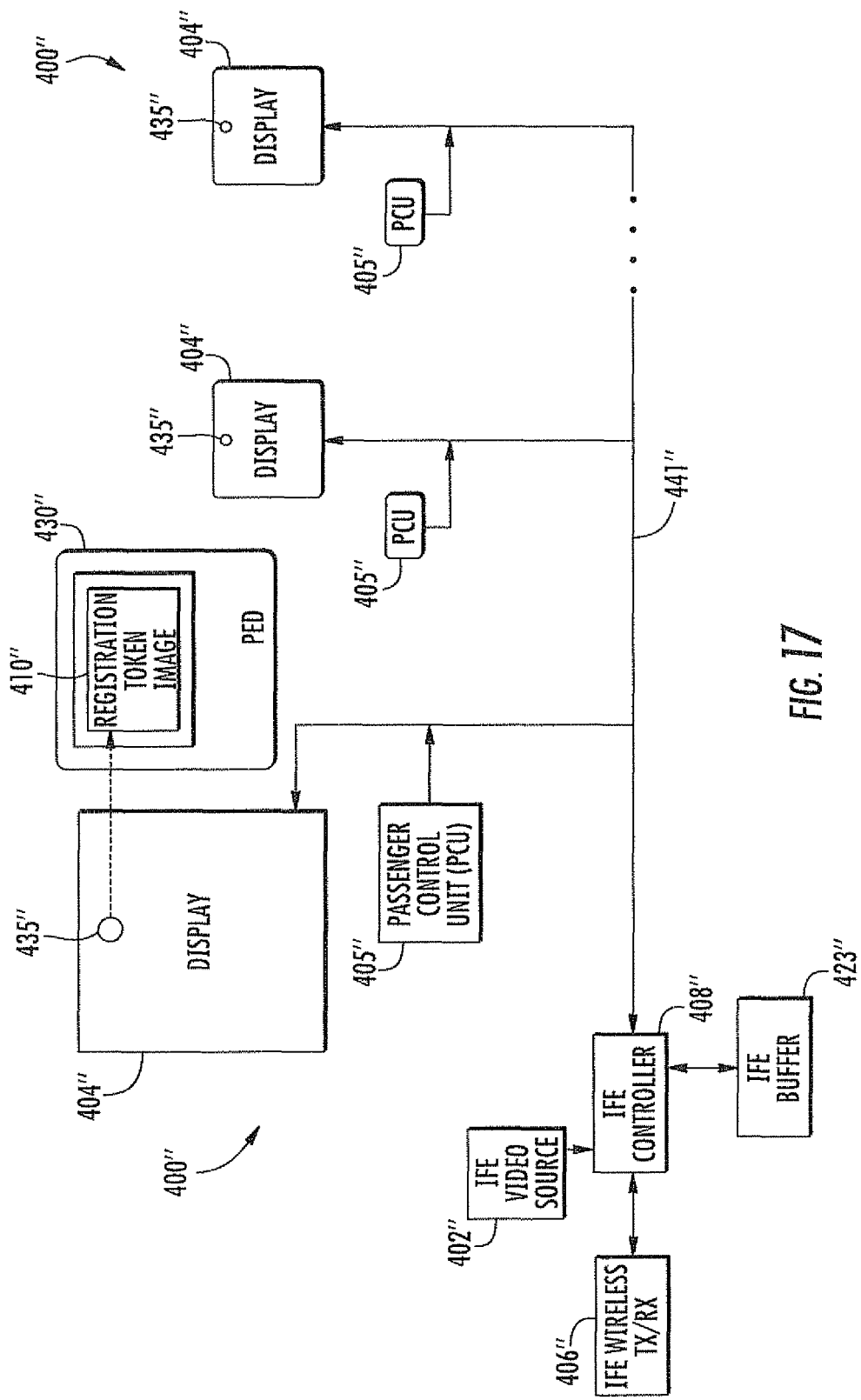
FIG. 17 is a schematic diagram of a communications system illustrating registration of a PED with an IFE system using PED generated registration token images in accordance with the present invention.
Figure 18:
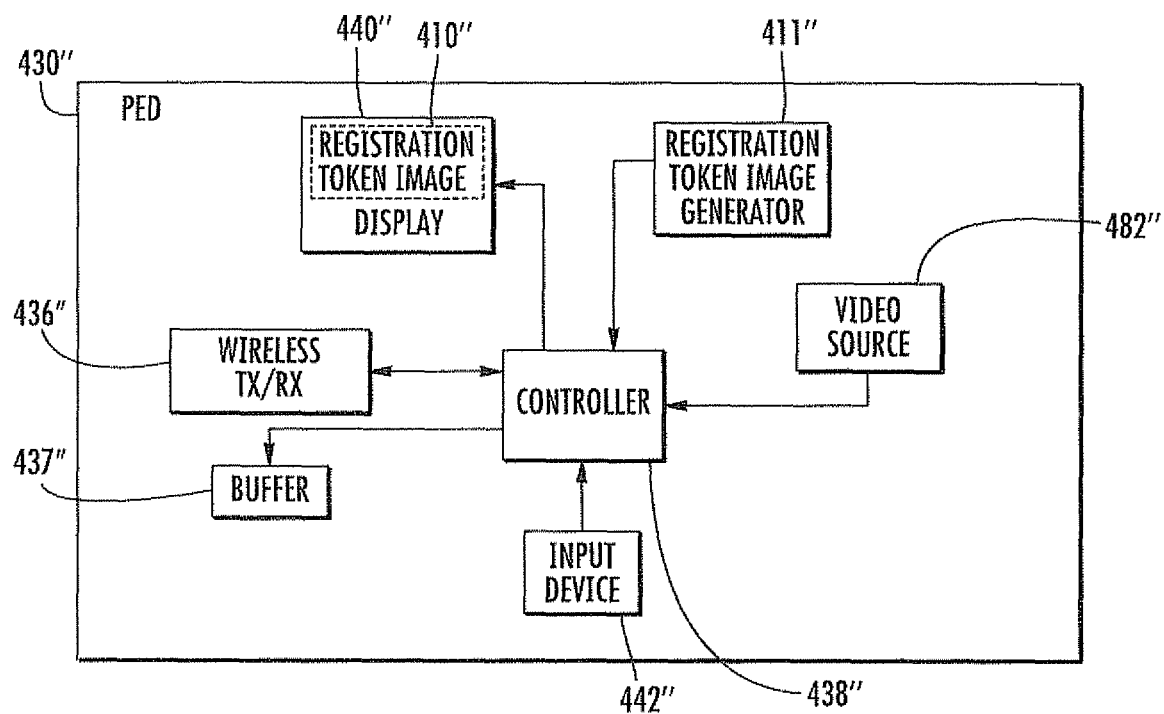
FIG. 18 is a schematic diagram of the PED as shown in FIG. 17.

Referring now to the flowchart 500 illustrated in FIG. 16, a method for operating the aircraft communications system comprising the aircraft IFS system 400 and at least one PED 430 carried by an aircraft passenger as described above will now be discussed. From the start (Block 502), the method comprises operating the IFE controller 408 for selectively displaying video from the IFS entertainment source 402 on the IFS passenger seat displays 404 at Block 504. The IFE controller 408 also generates a respective registration token image 410 on each IFE passenger seat display 404 at Block 506.

The PED 430 is positioned by the passenger adjacent their assigned IFE passenger seat display 404 at Block 508. The method further comprises operating the PED 430 so that the PED optical sensor 434 senses a displayed registration token image at Block 510. At Block 512, the IFS wireless transceiver 406 communicates via the PED wireless transceiver 436 based upon the PED optical sensor 434 sensing the displayed registration token image 410.

At decision Block 514, the passenger can select one of multiple options. One option is to operate the PED 430 as a remote control for selectively controlling displayed video on the IFE passenger seat display 404 that displayed the registration token image 410 used in the registration (Block 520). A second option is to operate a PED video entertainment source 482 to selectively display video on the IFE passenger seat display 404 at Block 516. A third option is to operate a PED display 440 for selectively displaying video thereon from the IFE video entertainment source 402 at Block 518. At Blocks 516 and 518, the passenger also has the option of operating their PED 430 as a remote control (via Block 520) for selectively controlling the displayed video. The method ends at Block 522.

Referring now to FIGS. 17-20, another embodiment of the above-described communications system is based on the aircraft IFS system 400" sensing a registration token image 410" provided by a PED 430". The aircraft IFE system 400" now includes an IFS optical sensor 435", and the PED 430" now provides the registration token image 410" to be sensed by the IFS optical sensor.

The illustrated PED 430" includes a PED display 440", a PED wireless transceiver 436", and a PED controller 438". The PED controller 438" generates a respective registration token image 410" on the PED display 440", and communicates via the PED wireless transceiver 436".

The illustrated aircraft IFE system 400" includes an IFE video entertainment source 402", IFS passenger seat displays 404", a respective IFS optical sensor 435" associated with each IFS passenger seat display, an IFS wireless transceiver 406", and an IFS controller 408". The IFE controller 408" selectively displays video from the IFE entertainment source 402" on the IFE passenger seat displays 404", and communicates with the PED wireless transceiver 436" via the IFE wireless transceiver 406" based upon a respective IFE optical sensor 435" sensing the registration token image 410" on the PED display 440".

Each respective registration token image 410" advantageously allows the IFE controller 408" to register with the PED controller 438" in a straightforward manner upon communicating therewith. The PED 430" that provided the registration token image 410'" is assigned to and associated with the IFE passenger seat display 404" associated with the IFE optical sensor 435" that sensed the PED's registration token image 410'". Once registered, the PED 430" is integrated with the aircraft IFE system 400".

In addition to the PED 430" providing the registration token image 410'", other information may be provided to the aircraft IFE system 400". For example, a user profile may be provided in the form of a bar code displayed on the PED display 440" that is read by the IFE optical sensor 435". The user profile may include e-mail and contact information on the passenger. The airline may contact the passenger with special offers and incentives on future travels, for example. The user profile advantageously allows unique services to be provided to the passenger.

As noted above, the IFE optical sensor 435" may comprise a camera, and the registration token image 410" may be configured as a bar code, for example. Each registration token image 410" may have a unique number or identification 413" associated therewith.

As discussed in greater detail above, the integrated PED 430" may be operated as a remote control for remotely controlling the video displayed on an IFE passenger seat display 404". The PED 430" includes a PED input device 442" coupled to the PED controller 438". The PED 430" wirelessly communicates to the IFE wireless transceiver 406" via the PED wireless transceiver 436".

As discussed in greater detail above, the PED 430" may be operated as an entertainment source for displaying video on the IFE passenger seat display 404". This advantageously allows the passenger to have a greater selection of choices for viewing video during the flight.

As also discussed in greater detail above, the PED 430" may display video from the IFE video entertainment source 402" once the PED 430" is registered with the IFS controller 408". This advantageously allows the passenger to comfortably view the video from the IFS video entertainment source on their PED 430". The video from the IFE entertainment source 402" is wirelessly transmitted to the PED wireless transceiver 436".

Figure 19:
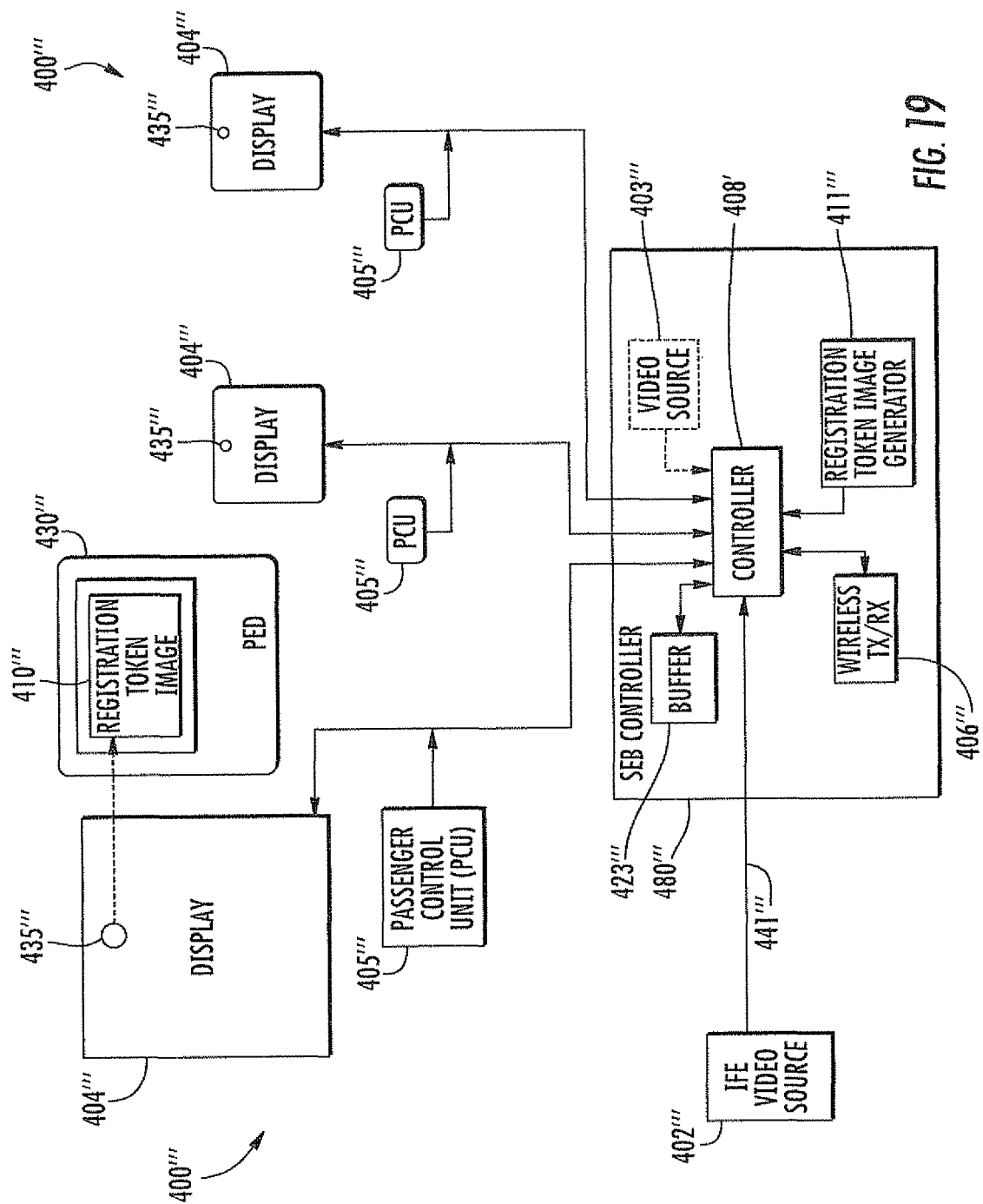
FIG. 19 is schematic diagram of another embodiment of the communications system illustrated in FIG. 17 wherein an IFS seat electronics box (SEB) controller interfaces with the IFE passenger seat displays.

As an alternative to a single IFE controller 408'", there is a plurality of IFE seat electronic box (SEB) controllers arranged throughout the aircraft. As illustrated in FIG. 19, each SEB controller 480'" supports more than one IFE passenger seat display 404'". Each SEB controller 480'" includes at least one IFS wireless transceiver 406'" to support the IFS passenger seat display 404'" coupled thereto.

In the illustrated example, three IFE passenger seat displays 404'" are supported by an IFE SEB controller 480'". Although not illustrated, each IFE passenger seat display 404" may have its own IFE wireless transceiver 406" associated therewith.

The SEB controller 480'" is coupled to the IFE video entertainment source 402'" via the signal distribution network 441'". Alternatively, the SEB controller 408'" may include a video entertainment source 403'" coupled thereto. The illustrated SEB controller 480'" may even include its own registration token image generator 411'" for the IFE passenger seat displays 404'" coupled thereto. Each registration token image generator 411'" would operate independently of the other registration token image generators in the other SEB controllers 480'".

Figure 20:
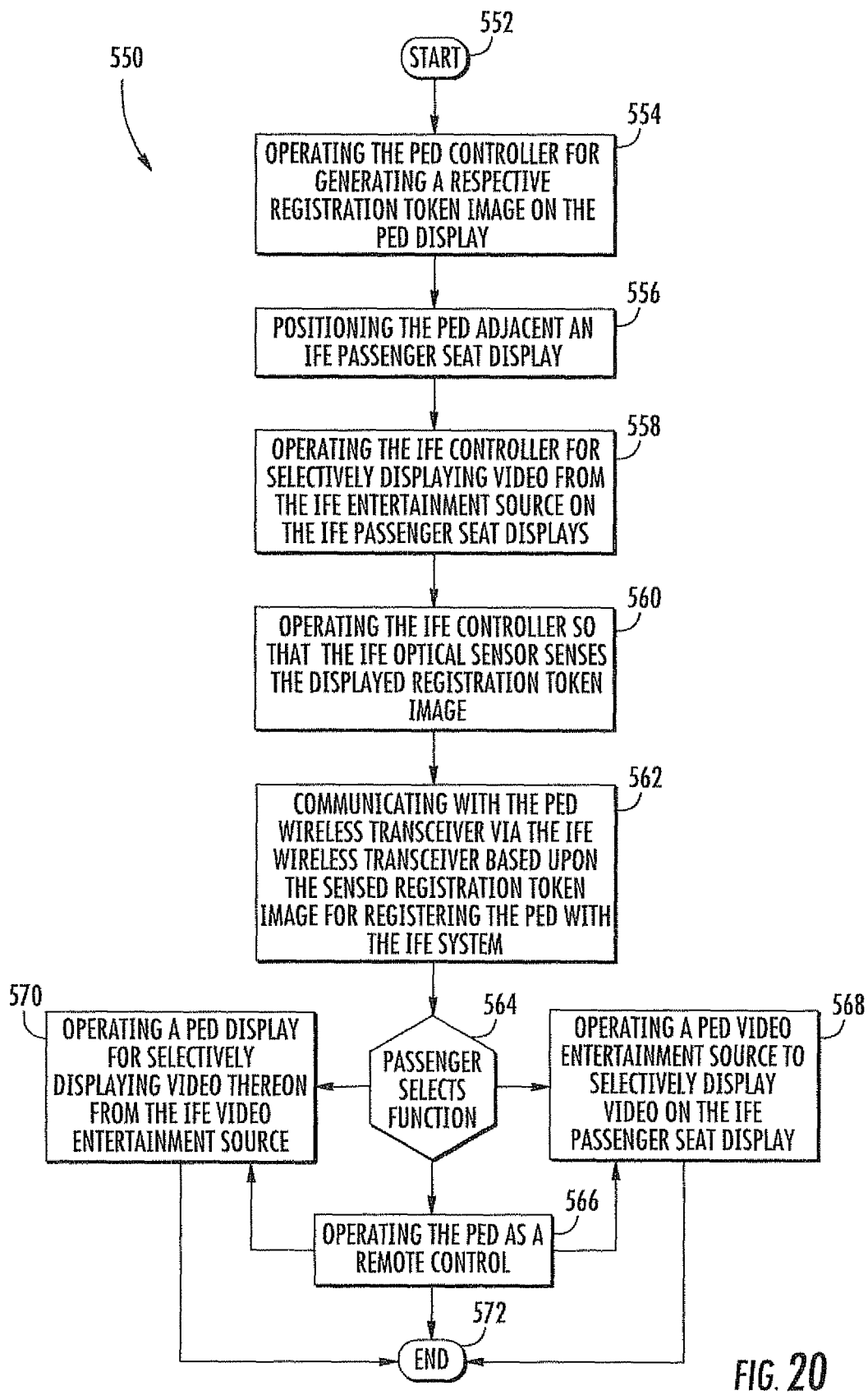
FIG. 20 is a flowchart illustrating communications system illustrating registration of a PED with an IFE system using PED generated registration token images in accordance with the present invention.
Figure 21:
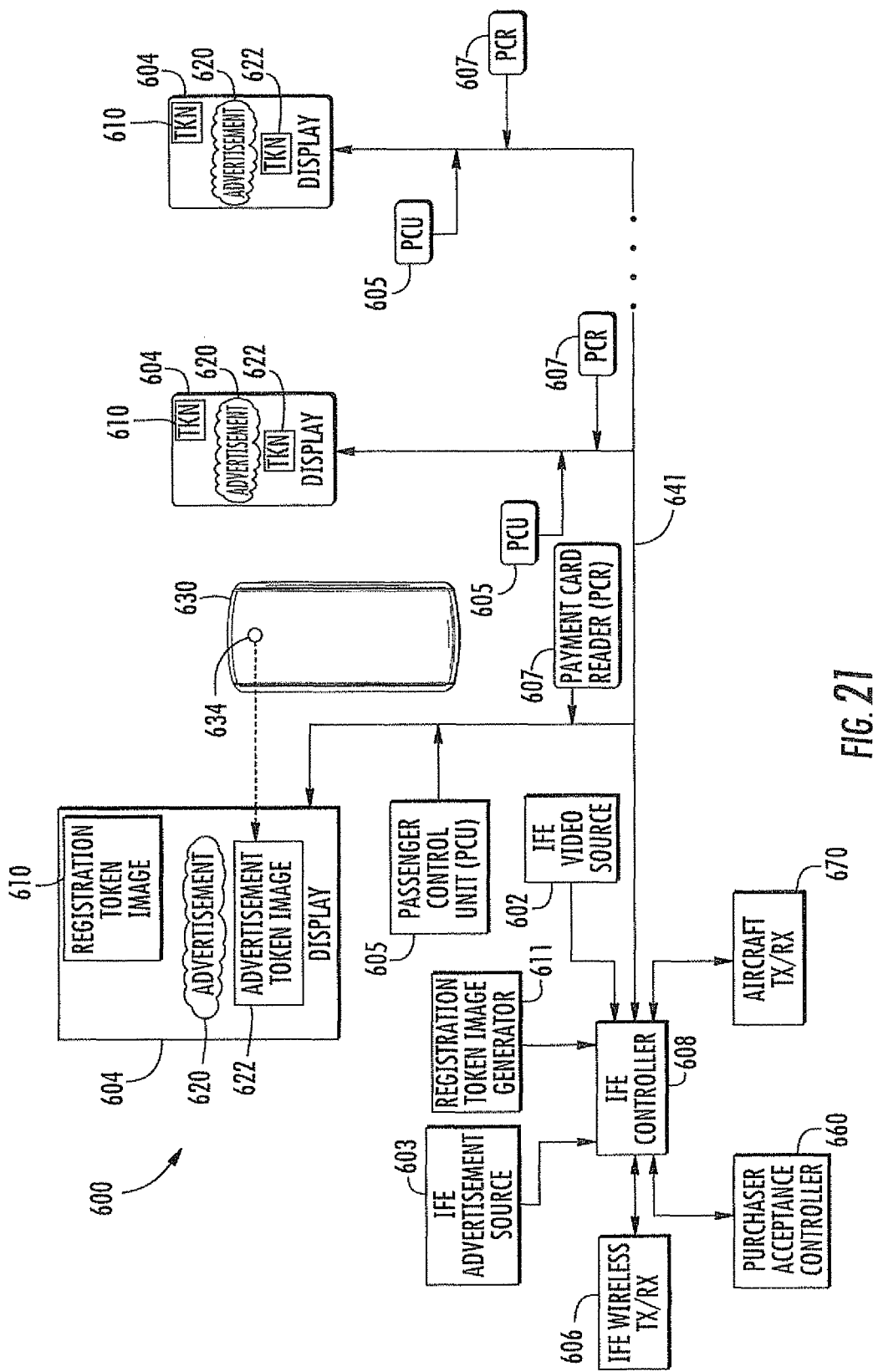
FIG. 21 is a schematic diagram of a communications system illustrating a PED operating as a commerce device in accordance with the present invention.

Referring now to the flowchart 550 illustrated in FIG. 20, a method for operating the aircraft communications system comprising the aircraft IFS system 400" and at least one PED 430" carried by an aircraft passenger as described above will now be discussed. From the start (Block 552), the method comprises operating the PED controller 438" for generating a respective registration token image 410" on the PED display 440" at Block 554. The PED 430" is then positioned by the passenger adjacent their assigned IFE passenger seat display 404" at Block 556.

The method further comprises operating the IFE controller 408" for selectively displaying video from the IFS entertainment source 402" on the IFE passenger seat displays 404" at Block 558. The IFE controller 408" is also operated at Block 560 so that the IFE optical sensor 504" senses the displayed registration token image 410". The PED wireless transceiver 436" communicates at Block 562 via the IFE wireless transceiver 406" based upon the sensed registration token image 410" for registering the PED 430" with the IFS system 400".

At decision Block 564, the passenger can select an available option. One option is to operate the PED 430" as a remote control for selectively controlling displayed video on the IFE passenger seat display 404" that displayed the registration token image 410" used in the registration (Block 566). A second option is to operate a PED video entertainment source 560" to selectively display video on the IFE passenger seat display 404" at Block 568". A third option is to operate a PED display 440" for selectively displaying video thereon from the IFE video entertainment source 402" at Block 570". At Blocks 568" and 570", the passenger also has the option of operating the PED 430" as a remote control (via Block 566) for selectively controlling the displayed video. The method ends at Block 572".

Referring now to FIGS. 21-25, another aspect is directed to operation of PEDs 630 as commerce devices. Operation of the PEDs 630 with the aircraft IFE system 600 forms a communications system for the aircraft 122.

For illustration purposes, the aircraft IFE system 600 comprises at least one IFE advertisement source 603, a plurality of IFE passenger seat displays 604, at least one IFS wireless transceiver 606, and at least one IFE controller 608. A signal distribution network 641 connects the IFE controller 608 to the passenger seat displays 604. The IFE controller 608 is for selectively displaying advertisements 620 from the IFE advertisement source 603 on the IFE passenger seat displays 604. The IFE system 600 may further include an IFS entertainment source 602.

Figure 22:
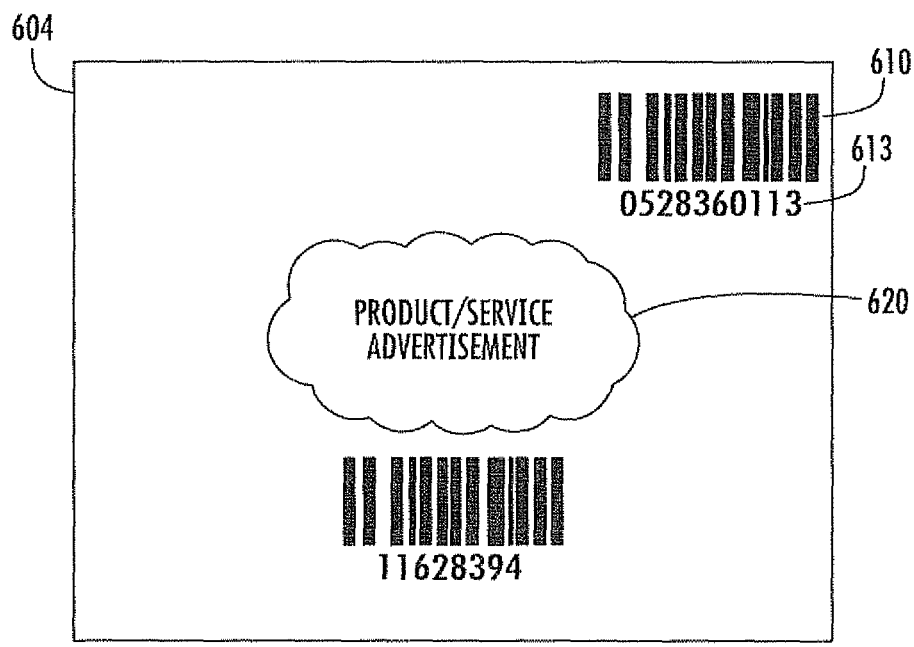
FIG. 22 is a view of a passenger seat display displaying an advertisement and an advertisement token image associated therewith, and a registration token image in accordance in accordance with the present invention.

Each advertisement 620 being displayed has a respective advertisement token image 622 associated therewith, as shown in FIG. 22. The advertisement token image 622 is similar to the registration token image 410 as discussed in detail above. The advertisement token image 622 may also be configured as a bar code with a unique number or identification 625 associated therewith. As readily appreciated by those skilled in the art, the advertisement token image 622 is not limited to a bar code. Other configurations may be used as long as a unique number or identification 625 is associated therewith.

In addition to the advertisement source 603, an advertisement card/catalog may be used. For instance, an advertisement card or catalog is included with each seat, and includes advertisement token images thereon corresponding to the different items for sale. The advertisements may be directed to liquor or books for sale, or example.

The IFE controller 608 also communicates via the IFE wireless transceiver 606. The IFE advertisement source 603 advantageously provides advertisements 620 on various products and services that can be selected for purchase by a passenger using their PED 630. As discussed above, on-board shopping by a passenger is a form of air-commerce.

Figure 23:
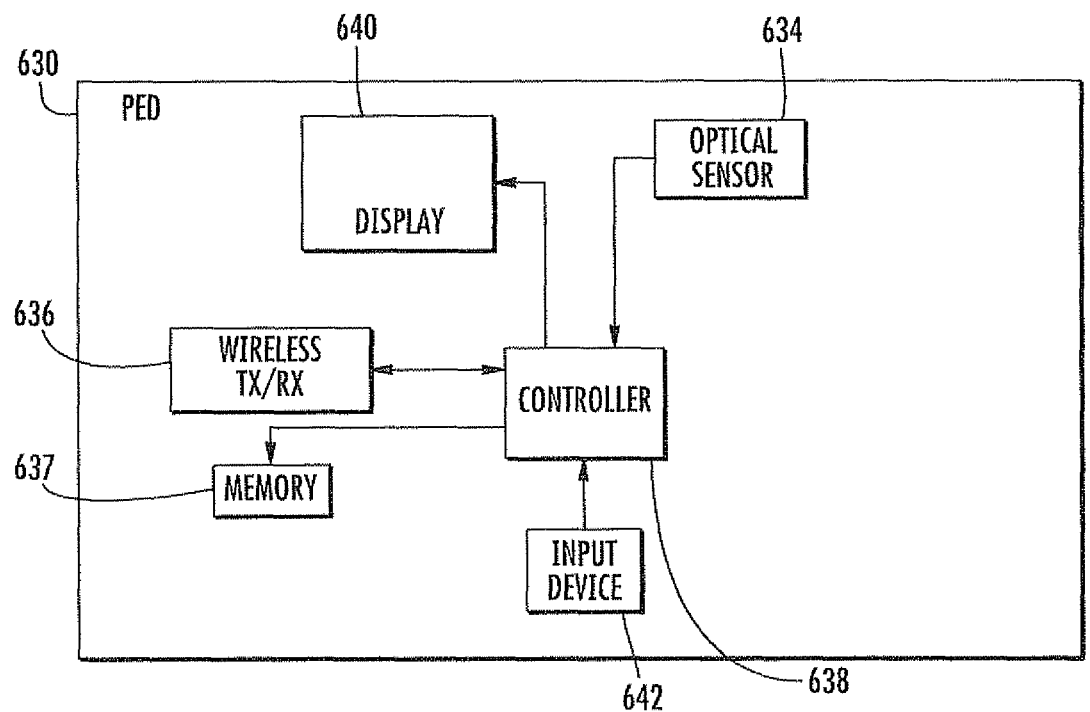
FIG. 23 is a schematic diagram of a PED in accordance with the present invention.

The PED 630 comprises a PED optical sensor 634, a PED wireless transceiver 636, and a PED controller 638, as illustrated in FIG. 23. The PED controller 638 communicates with the IFE wireless transceiver 606 via the PED wireless transceiver 636 based upon the PED optical sensor 634 sensing a selected advertisement token image 622 on an IFE passenger seat display 604 or on an advertisement card/catalog. In addition, the PED 630 includes a display 640, an input device 642 and a memory 637 coupled to the PED controller 638. As an alternative to using the PED optical sensor 634 to sense a selected advertisement 620 for purchase, the passenger may manually enter the unique number or identification into their PED 630 via the PED input device 642.

A purchase acceptance controller 660 cooperates with the IFE controller 608 to accept purchase of the selected advertisement token image 622. Once the purchase is accepted by the purchase acceptance controller 660, the transaction can then be completed by communicating external the aircraft 122 to an Internet service provider, for example. The purchase acceptance controller 660 will be discussed in greater detail below.

To use the PED 630 as a commerce device, the PED needs to be registered with the aircraft IFE system 600. Consequently, the aircraft IFE system 600 includes a registration token image generator 611 for generating registration token images 610. As discussed above, the PED controller 638 initially communicates with the IFE wireless transceiver 606 via the PED wireless transceiver 636 based upon the PED optical sensor 634 sensing the registration token image. Once registered, then the advertisement token images 620 selected by the PED optical sensor 634 can be communicated to the IFE controller 608.

Alternatively, the registration token image and the advertisement token image are combined into one combined image. That is, when a passenger selects an item for purchase, registration is performed at the same time. For additional purchases, the registration portion of the combined image is simply ignored. Even though the same advertisement token images can be viewed by all of the passengers, the registration token images are specific to each seat.

The advertisements 620 provided by the IFE advertisement source 603 may be in the form of web pages in which passengers can browse via their PED 630. The IFE advertisement source 603 may be configured as a data memory cache for caching predetermined web pages to be browsed. The web pages are received while the aircraft 122 is on the ground. Alternatively or additionally, the web pages may be updated or refreshed while in flight.

For the purchase acceptance controller 660 to accept purchase of the selected advertisement token image 622, additional information is needed. For example, the additional information may be credit card information and/or frequent flyer information. This information may be provided directly by the passenger to the purchase acceptance controller 660 based on the PED controller 638 communicating with the IFE wireless transceiver 606 via the PED wireless transceiver 636. Alternatively, some or all of this information may be stored in a database separate from the PED 630, wherein the database is accessible by the purchase acceptance controller 660.

In addition, each seat may have a user payment card reader 607 associated therewith. The payment card reader 607 may be a credit card reader, for example, of the type that reads magnetically encoded information from a stripe carried by the card as the user swipes the card through a slot in the reader.

The payment card reader 607 may also be configured to read a frequent flyer card having magnetically encoded information stored thereon.

In other embodiments, the PED 630 includes an application for providing the credit card and/or frequent flyer information directly to the aircraft IFE system 600 without having to enter the information. The application may be for a specific airline's frequent flyer program, wherein the frequent flyer mileage is treated as cash.

Once the purchase is accepted by the purchase acceptance controller 660, the transaction can then be completed by communicating external the aircraft 122 via an aircraft transceiver 670. After connection is made to an Internet service provider (ISP) 672, for example, then the credit card information can be verified by the authorizing credit card company. If frequent flyer information is used, then the authorizing airline administering the account would be asked to verify the information. Confirmation that the transaction is completed may then be provided back to the passenger's PED 640. To complete the transaction, the illustrated embodiment is not limited to an Internet service provider 672. Other sources for verifying the information may be used, as readily appreciated by those skilled in the art.

At least one aircraft transceiver 670, for example, may be used to communicate external the aircraft, such as to the Internet service provider 672. The at least one aircraft transceiver 670 may be configured as one or more airborne data links for communicating external the aircraft 122 for when the aircraft is airborne.

Figure 24:
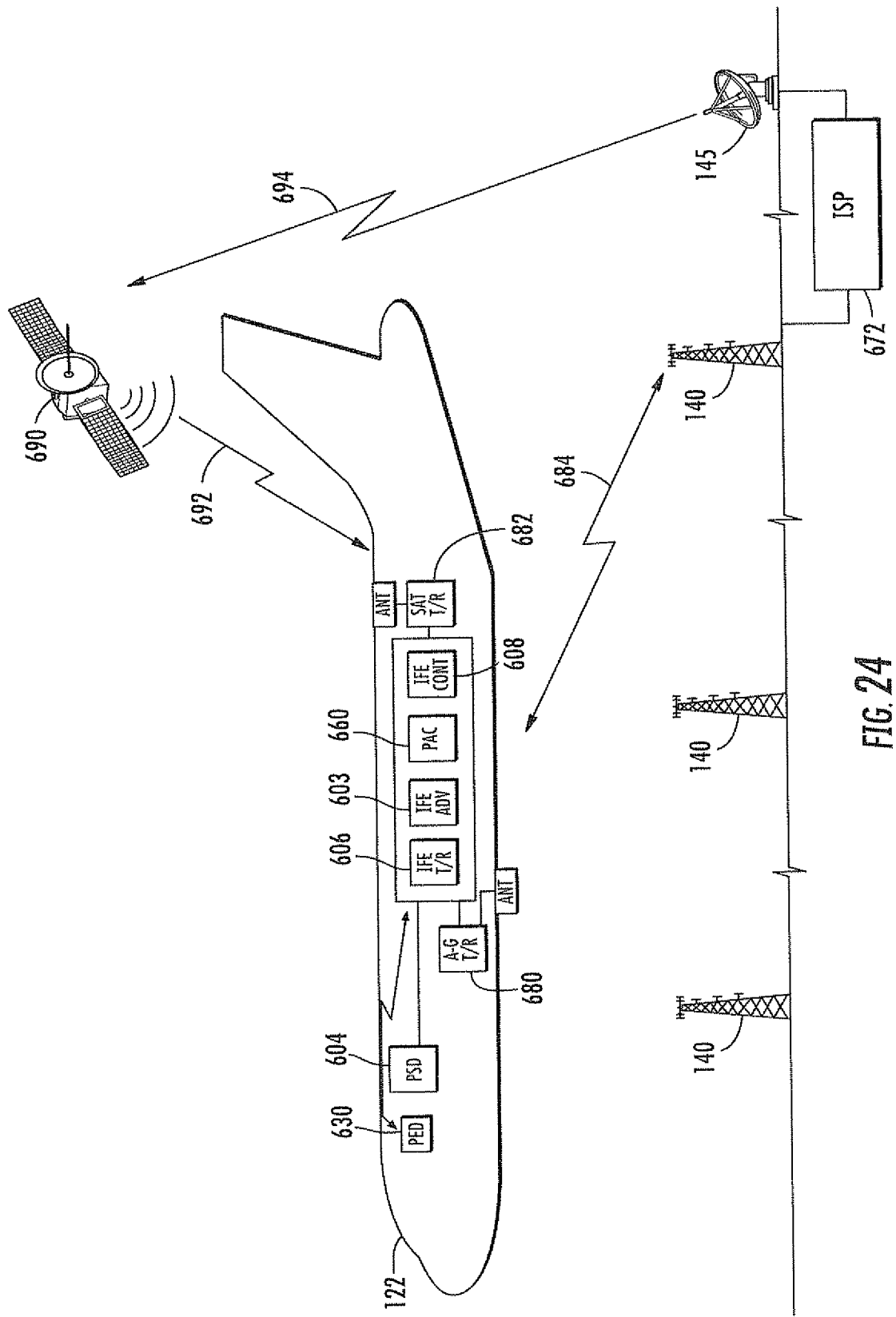
FIG. 24 is a schematic diagram of the communications system shown in FIG. 21 completing transaction of an on-board purchase while the aircraft is airborne.

The airborne data links may include an air-to-ground transceiver 680 communicating to a ground-based base station 140, and a satellite transceiver 682 communicating to a ground-based satellite transmitter 145, as illustrated in FIG. 24. The ground-based base station 140 and the ground-based satellite transmitter 145 both connect to the Internet service provider 672, as also illustrated in FIG. 24.

Figure 25:
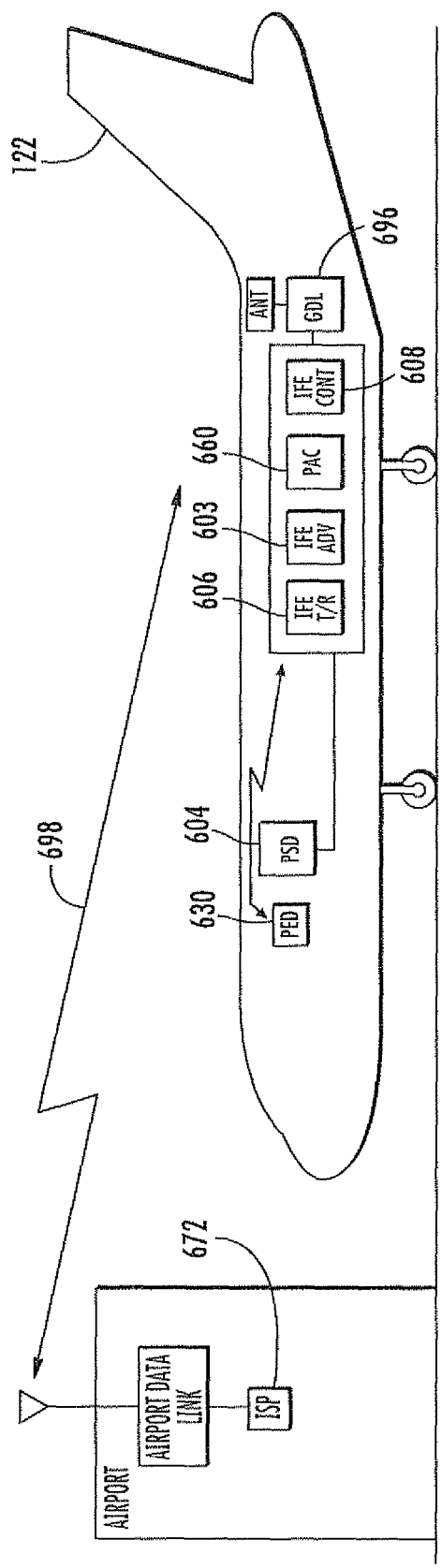
FIG. 25 is a schematic diagram of the communications system shown in FIG. 21 completing transaction of an on-board purchase while the aircraft is on the ground.

Similarly, the at least one aircraft transceiver 670 may include a ground data link 696 for communicating external the aircraft 122 when the aircraft 122 is on the ground, as illustrated in FIG. 25. In this embodiment, the purchase acceptance controller 660 completes transaction of the purchase based upon communicating external the aircraft 122 via a ground link 698 to the Internet service provider 672 as discussed above.

Figure 26:
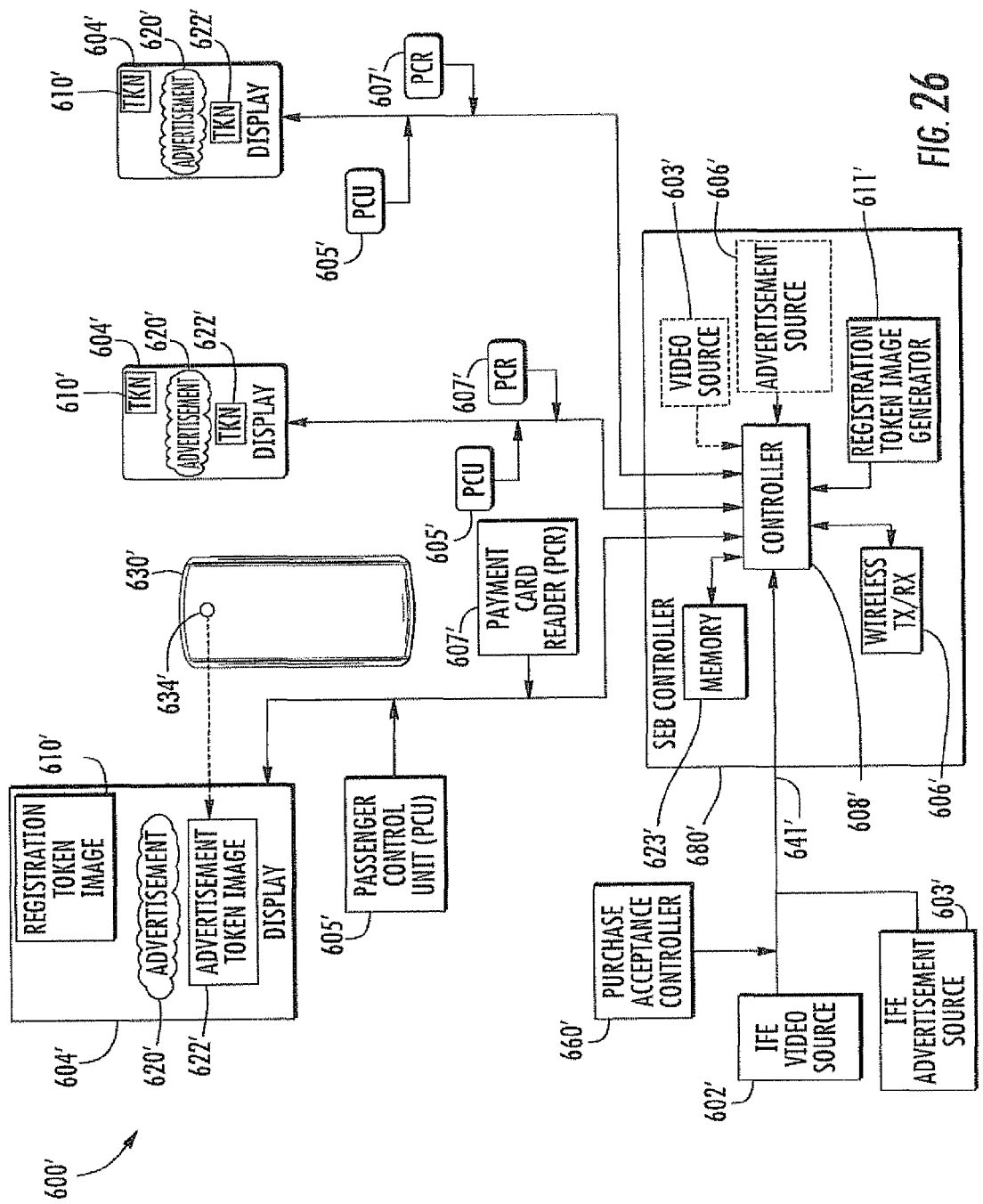
FIG. 26 is schematic diagram of another embodiment of the communications system illustrated in FIG. 21 wherein an IFE seat electronics box (SEB) controller interfaces with the IFS passenger seat displays.

As an alternative to a single IFE controller 608, there is a plurality of IFE seat electronic box (SEB) controllers 680' arranged throughout the aircraft. As illustrated in FIG. 26, each SEB controller 608' supports more than one IFE passenger seat display 604'. Each SEB controller 680' includes at least one IFE wireless transceiver 606''' to support the IFS passenger seat display 604' coupled thereto.

In the illustrated example, three IFE passenger seat displays 604''' are supported by each IFS SEB controller 680'. Although not illustrated, each IFS passenger seat display 604' may have its own IFE wireless transceiver 606' associated therewith.

Each SEB controller 680' is coupled to the IFS advertisement source 603' and to the IFE video entertainment source 602' via the signal distribution network 641'. Alternatively, each SEB controller 608' may include its own IFS advertisement source 603' and IFE video entertainment source 603' coupled thereto. The illustrated SEB controller 680' may even include its own registration token image generator 611' for the IFE passenger seat displays 604' coupled thereto. Each registration token image generator 611''' would operate independently of the other registration token image generators in the other SEB controllers 680'.

Figure 27:
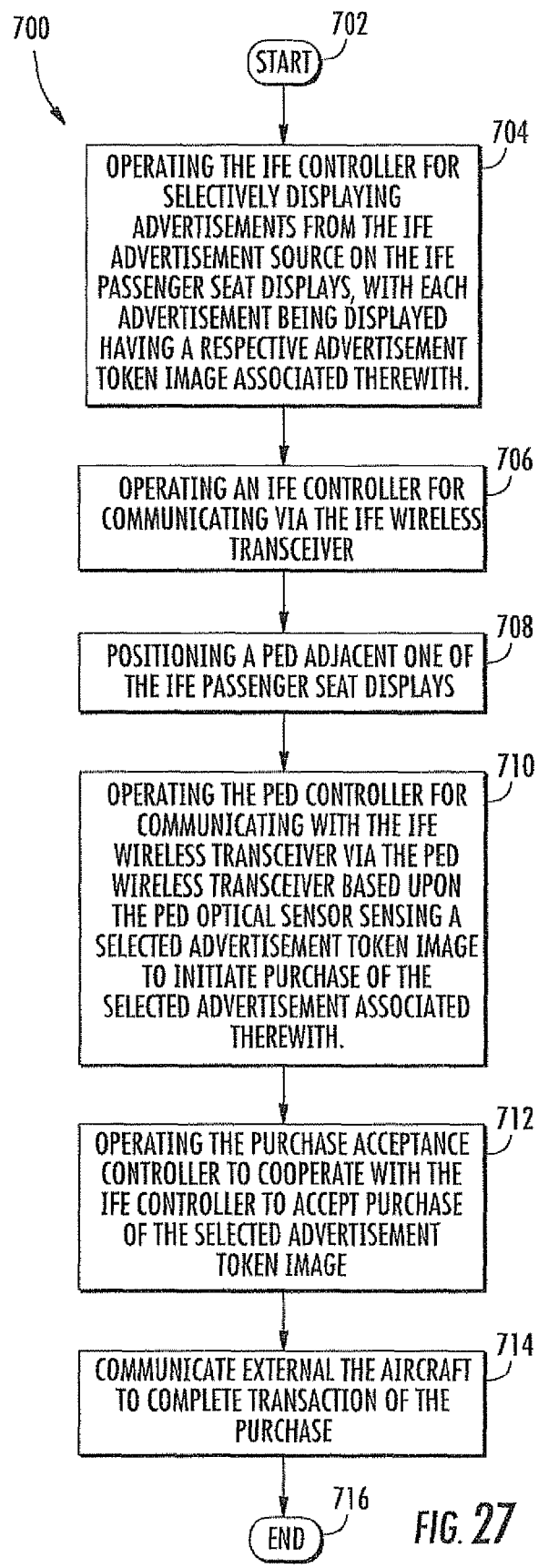
FIG. 27 is a flowchart illustrating operation of a PED as a commerce device and cooperates with the aircraft IFE system to complete transaction of an on-board purchase in accordance with the present invention.

Referring now to the flowchart 700 illustrated in FIG. 27, a method for operating the aircraft communications system comprising the aircraft IFE system 600 and at least one PED 630 carried by an aircraft passenger as described above will now be discussed. From the start (Block 702), the method comprises operating the IFE controller 608 at Block 704 for selectively displaying advertisements 620 from the IFE advertisement source 603 on the IFE passenger seat displays 604, with each advertisement being displayed having a respective advertisement token image 622 associated therewith.

The IFE controller 608 also communicates via the IFE wireless transceiver 606 at Block 706. The PED 630 is then positioned adjacent one of the IFE passenger seat displays 604 at Block 708. The PED controller 638 is operated at Block 710 for communicating with the IFE wireless transceiver 606 via the PED wireless transceiver 636 based upon the PED optical sensor 634 sensing a selected advertisement token image 622. The purchase acceptance controller 660 is operated at Block 712 to cooperate with the IFE controller 608 to accept purchase of the selected advertisement token image 622. The purchase acceptance controller 660 then communicates external the aircraft 122 at Block 714 to complete the purchase. The method ends at Block 716.

Figure 28:
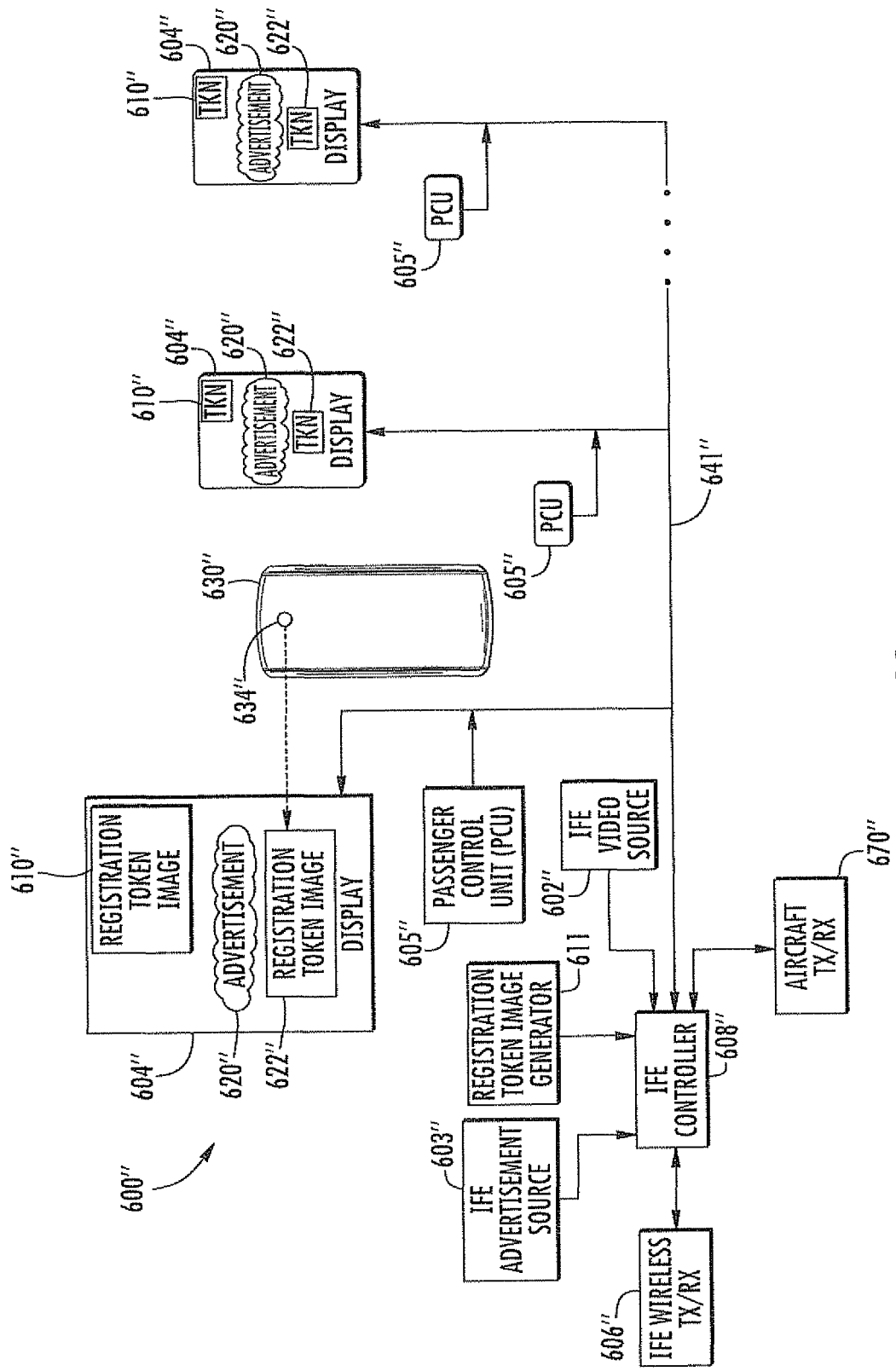
FIG. 28 is a schematic diagram of a communications system illustrating another embodiment of the PED operating as a commerce device in accordance with the present invention.
Figure 29:
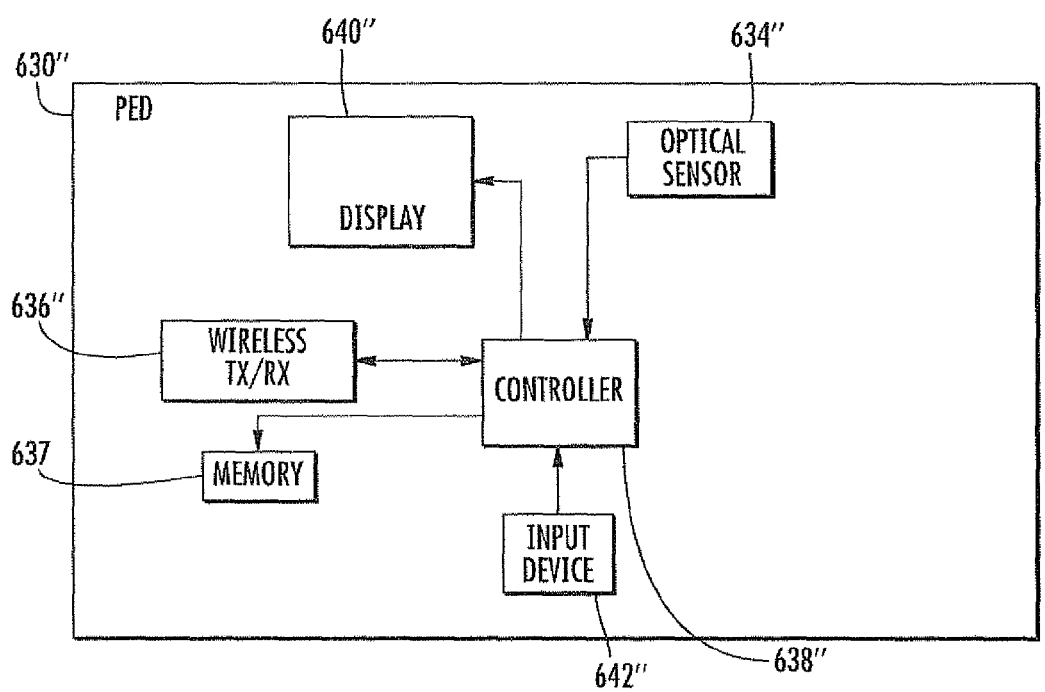
FIG. 29 is a schematic diagram of a PED in accordance with the present invention.

Referring now to FIGS. 28 and 29, another embodiment of the communications system involves the PED 630" being more involved with initiating and completing purchase of the advertisement associated with the selected advertisement token image. In other words, this embodiment does not require the use of the purchase acceptance controller 660, as in the above-described embodiment. Nonetheless, the purchase may be completed by the PED 630" while the passenger is still on-board the aircraft 122" by the PED interfacing with an aircraft transceiver 670" for communicating external the aircraft, such as to an Internet service provider. In addition, the purchase may be completed after the passenger has deboarded the aircraft 122" by also connecting to an Internet service provider.

Since the IFE controller 608" does not have to communicate to the PED controller 638" with respect to the purchase, the IFE wireless transceiver 606 is also not required. However, if the PED 630" were to be used as a remote control as discussed above, then the IFE wireless transceiver 606 would be required, as readily appreciated by those skilled in the art.

For illustration purposes, the IFE system 600' includes at least one IFE advertisement source 603", a plurality of IFE passenger seat displays 604", and at least one IFE controller 608". The IFS controller 608" is for selectively displaying advertisements 620" from the IFE advertisement source 603" on the IFE passenger seat displays 604". As in the above-described embodiment, each advertisement 620" being displayed has a respective advertisement token image 622" associated therewith.

The PED 630" comprises a PED optical sensor 634" for sensing a selected advertisement token image 620", a PED wireless transceiver 636", and a PED controller 638". In addition, the PED 630" includes a display 640", an input device 642" and a memory 637" coupled to the PED controller 638". The memory 637" may stored the selected advertisement token image, at least until confirmation of the purchase has been received.

The PED controller 638' communicates via the PED wireless transceiver 636' to initiate and complete purchase of the advertisement associated with the selected advertisement token image. Communications may be directed to an Internet service provider 672", for example. To complete the purchase, the PED controller 638" provides credit card information and/or frequent flyer account information.

Figure 30:
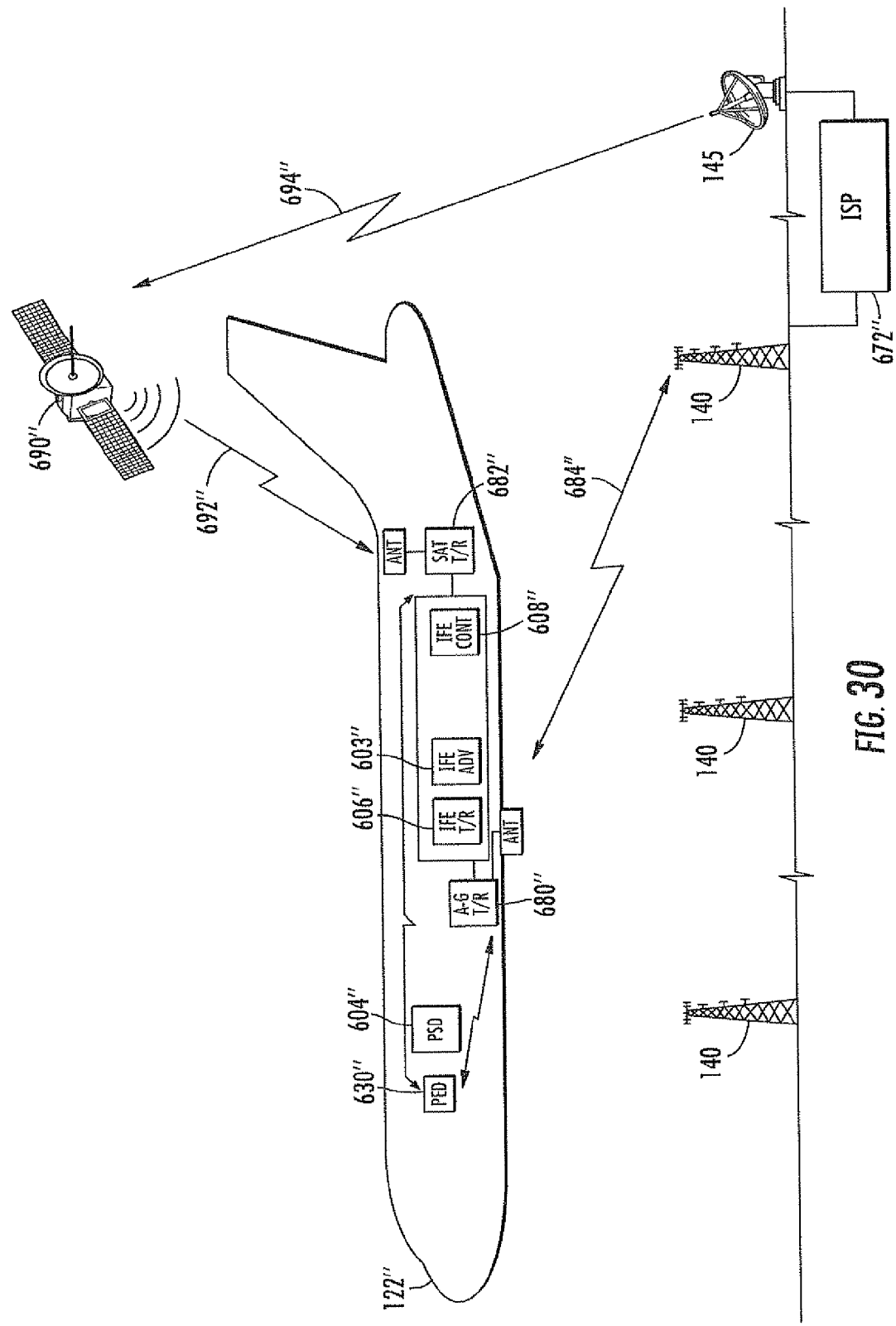
FIG. 30 is a schematic diagram of the communications system shown in FIG. 28 completing transaction of an on-board purchase while the aircraft is airborne.

When on-board the aircraft 122", at least one aircraft transceiver 670" is used to interface with the Internet service provider 672". The at least one aircraft transceiver 670" may be configured as one or more airborne data links for communicating external the aircraft 122" for when the aircraft is airborne, as illustrated in FIG. 30. The air-to-ground transceiver 680" communicates to a ground-based base station 140, and a satellite transceiver 682" communicates to a ground-based satellite transmitter 145. The ground-based base station 140 and the ground-based satellite transmitter 145 both connect to the Internet service provider 672".

Figure 31:
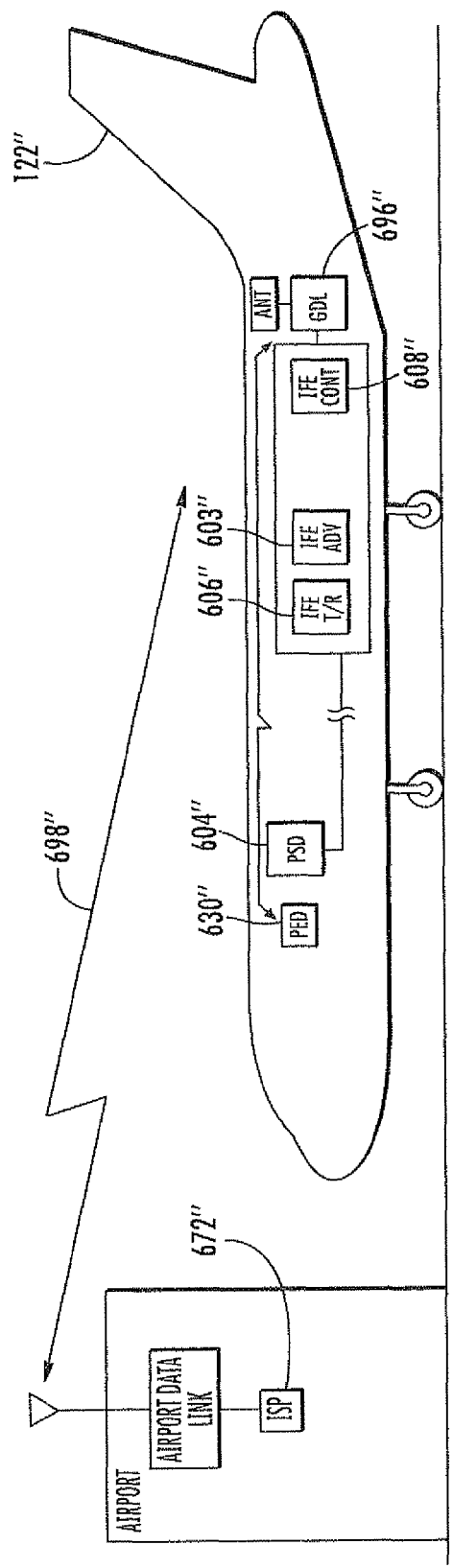
FIG. 31 is a schematic diagram of the communications system shown in FIG. 28 completing transaction of an on-board purchase while the aircraft is on the ground.
Figure 32:
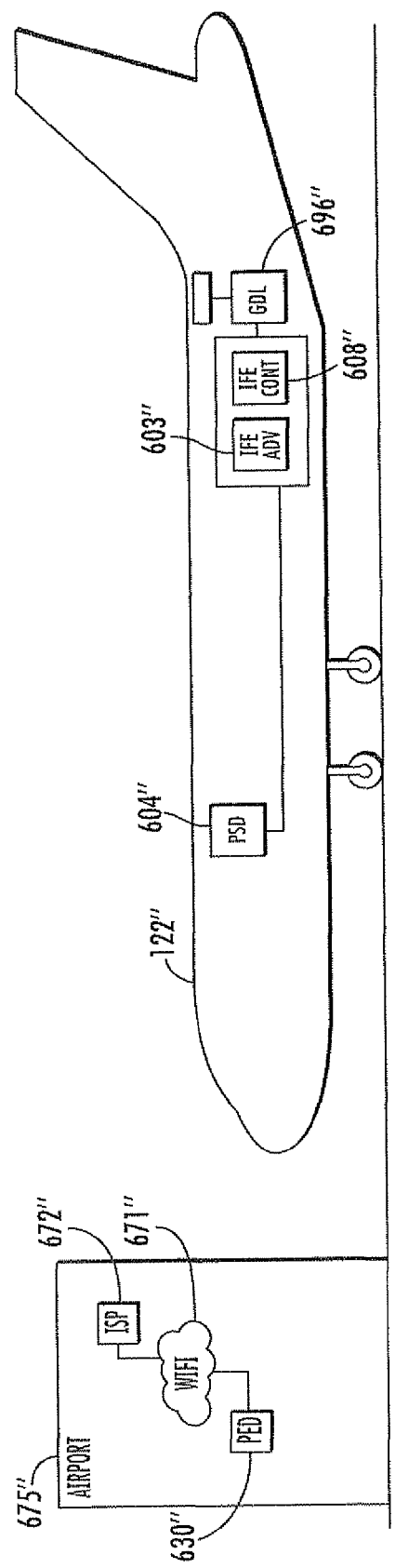
FIG. 32 is a schematic diagram of the PED shown in FIG. 28 away from the aircraft and in a Wi-Fi area completing transaction of a purchase initiated on-board the aircraft.
Figure 33:
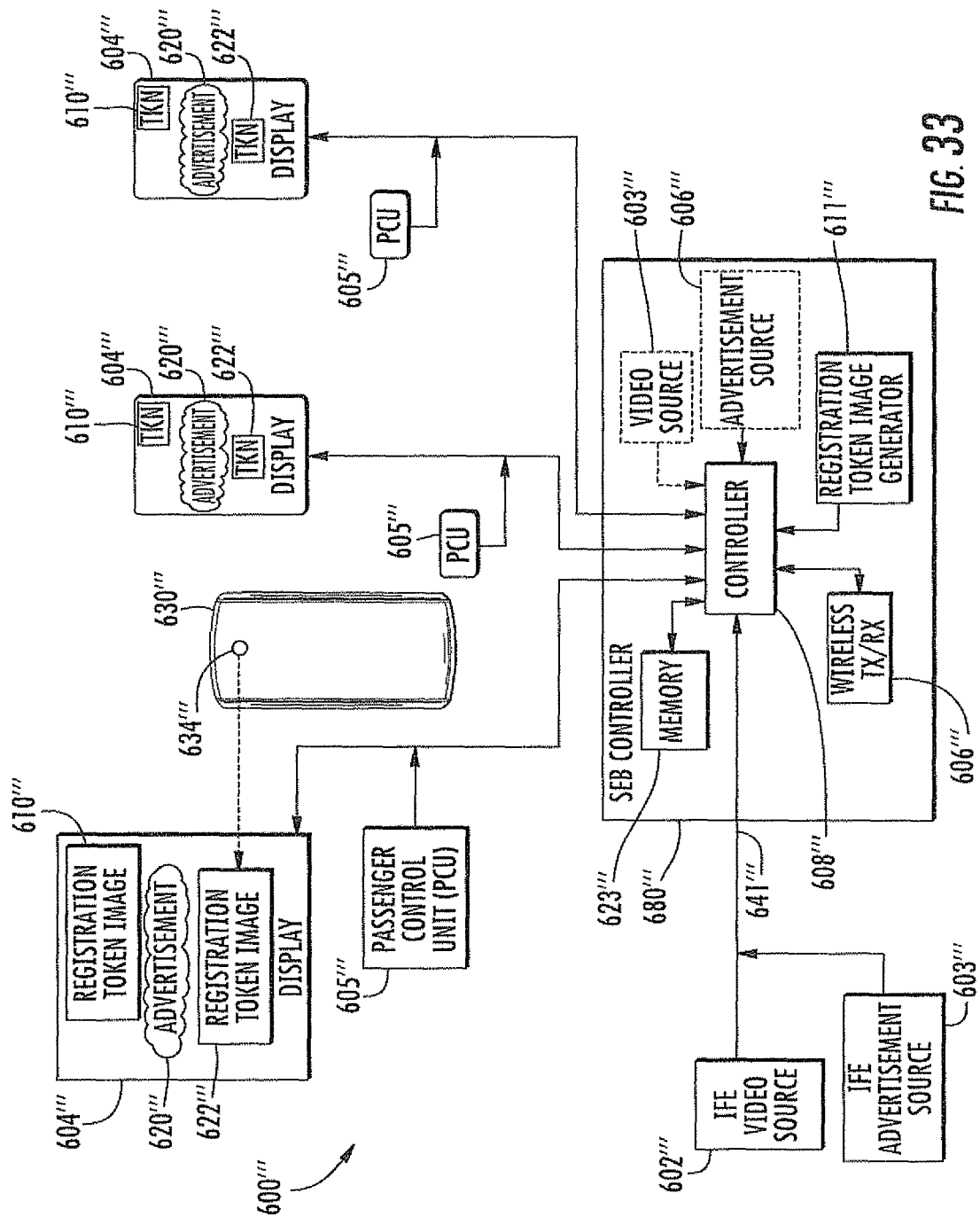
FIG. 33 is schematic diagram of another embodiment of the communications system illustrated in FIG. 24 wherein an IFE seat electronics box (SEB) controller interfaces with the IFE passenger seat displays.

Similarly, the at least one aircraft transceiver 670" may include a ground data link 696" for communicating external the aircraft 122" when the aircraft is on the ground, as illustrated in FIG. 31. Alternatively, the PED 630" completes transaction of the purchase away from the aircraft 122" by communicating with a ground-based network. As illustrated in FIG. 32, the PED 630" communicates to an Internet service provider 672" via a Wi-Fi hot spot 673" at the airport 675". Of course, the PED 630" may communicate to the Internet service provider 672" away from the airport.

After connection is made to an Internet service provider (ISP) 672", for example, then the credit card information can be verified by the authorizing credit card company. If frequent flyer information is used, then the authorizing airline administering the account would be asked to verify the information. Confirmation that the transaction is completed may then be provided back to the passenger's PED 640. To complete the transaction, the illustrated embodiment is not limited to an Internet service provider 672. Other sources for verifying the information may be used, as readily appreciated by those skilled in the art.

As an alternative to a single IFE controller 608, there is a plurality of IFE seat electronic box (SEB) controllers 680' arranged throughout the aircraft. As illustrated in FIG. 29, each SEB controller 608' supports more than one IFE passenger seat display 604'. Each SEB controller 680' includes at least one IFE wireless transceiver 606''' to support the IFE passenger seat display 604' coupled thereto.

In the illustrated example, three IFE passenger seat displays 604''' are supported by each IFE SEB controller 680'. Although not illustrated, each IFE passenger seat display 604' may have its own IFE wireless transceiver 606' associated therewith.

Each SEB controller 680' is coupled to the IFE advertisement source 603' and to the IFS video entertainment source 602' via the signal distribution network 641'. Alternatively, each SEB controller 608' may include its own IFE advertisement source 603' and IFS video entertainment source 603' coupled thereto. The illustrated SEB controller 680' may even include its own registration token image generator 611' for the IFS passenger seat displays 604' coupled thereto. Each registration token image generator 611''' would operate independently of the other registration token image generators in the other SEB controllers 680'.

Figure 34:
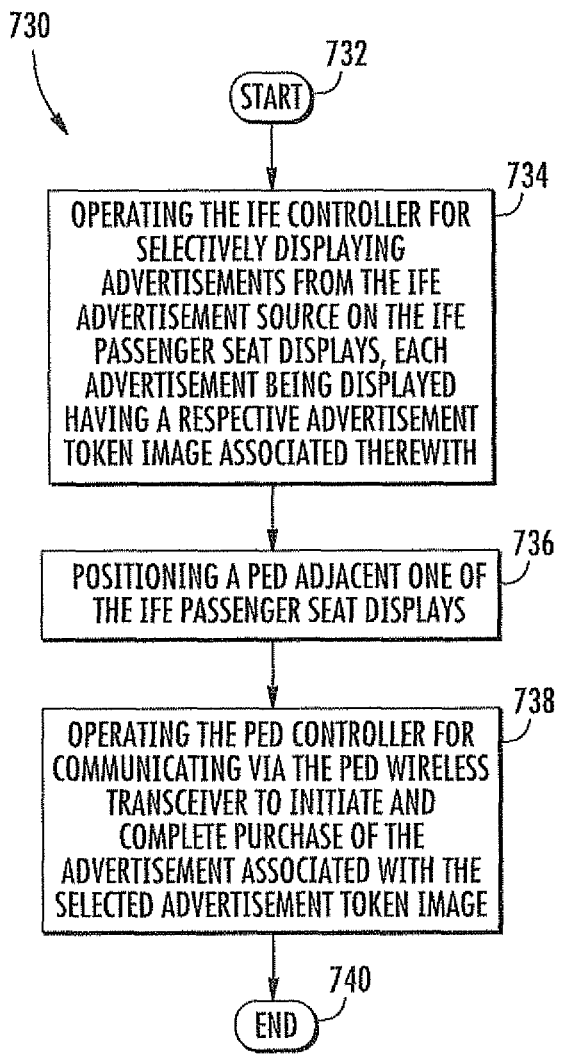
FIG. 34 is a flowchart illustrating operation of a PED as a commerce device and wherein the PED completes transaction of an on-board purchase in accordance with the present invention.
Figure 35:
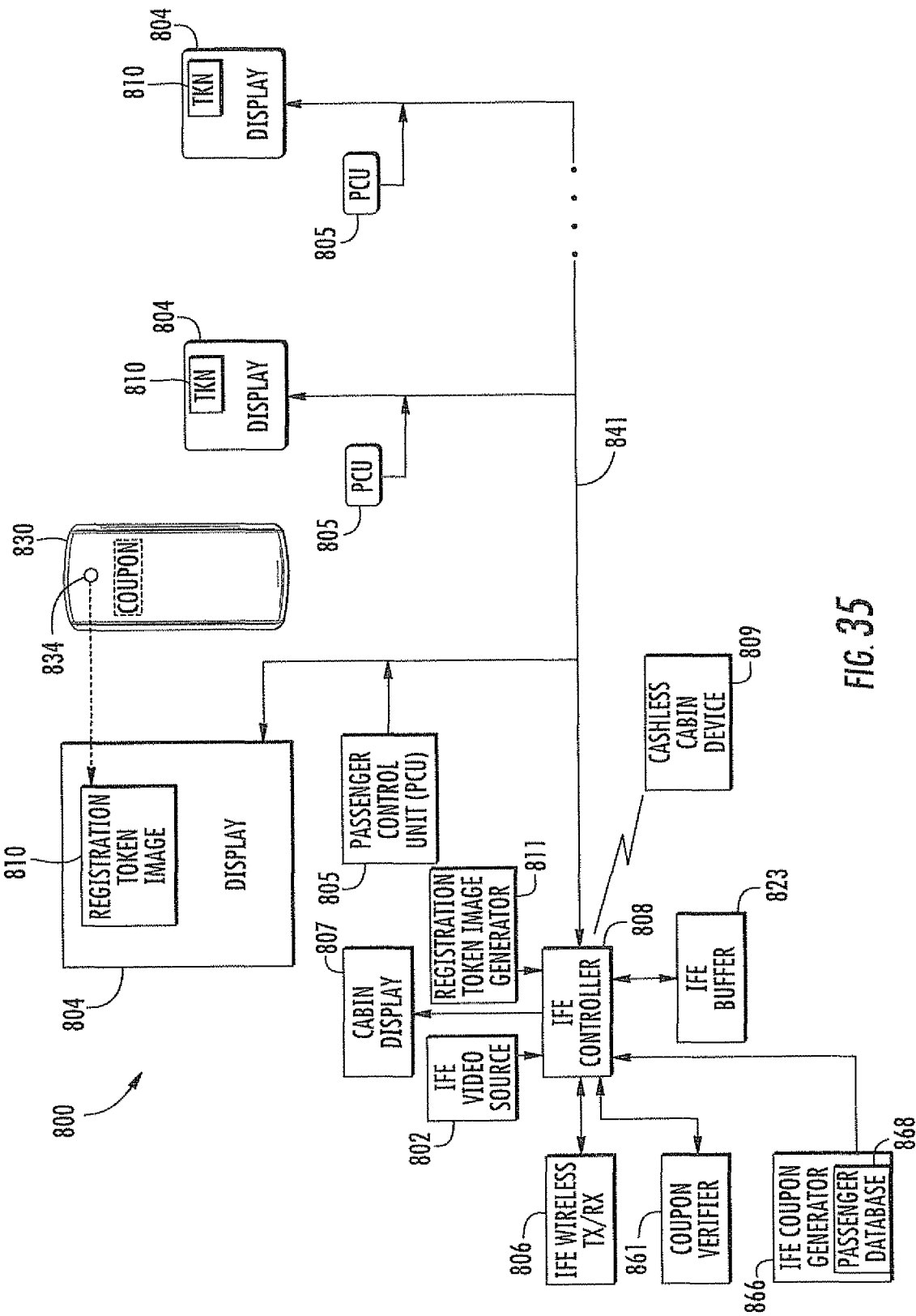
FIG. 35 is a schematic diagram of a PED cooperating with an aircraft IFE system for redeeming an in-flight coupon in accordance with the present invention.
Figure 36:
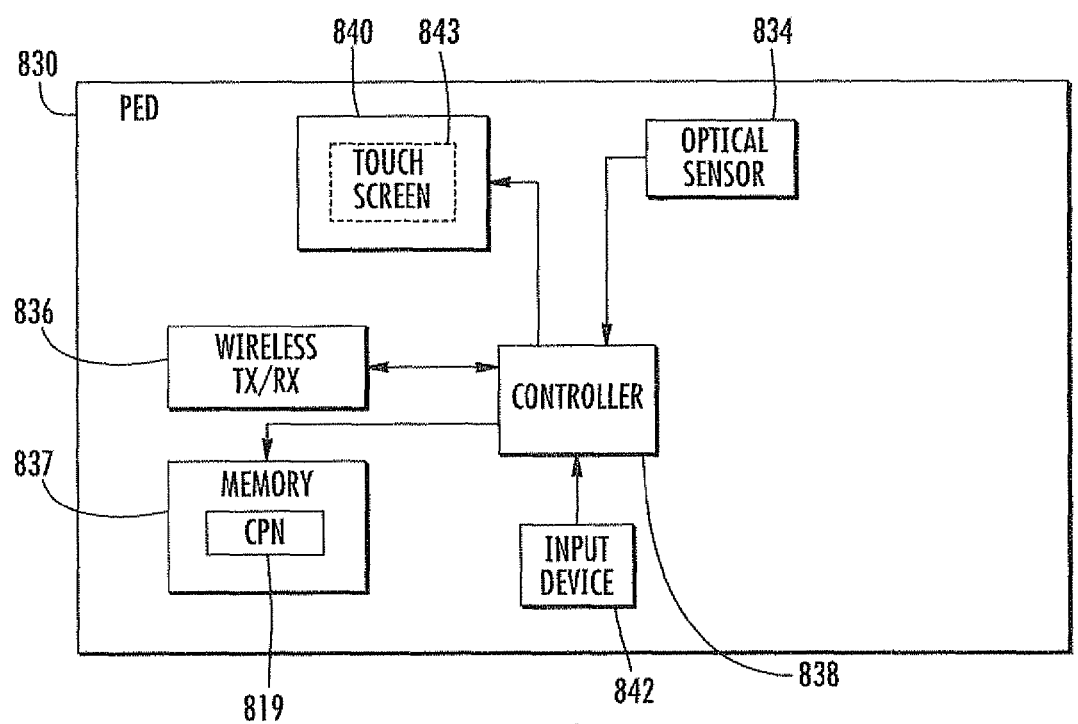
FIG. 36 is a schematic diagram of the PED as shown in FIG. 35.

Referring now to the flowchart 730 illustrated in FIG. 34, a method for operating the aircraft communications system comprising the aircraft IFE system 600" and at least one PED 630" carried by an aircraft passenger as described above will now be discussed. From the start (Block 702), the method operating the IFE controller 608" for selectively displaying advertisements 620" from the IFS advertisement source 603" on the IFE passenger seat displays 604" at Block 734. Each advertisement 620" being displayed has a respective advertisement token image 625 associated therewith.

The PED adjacent 630" is positioned adjacent one of the IFE passenger seat displays 604" at Block 736. The method further comprises at Block 738 operating the PED controller 638" for communicating via the PED wireless transceiver 636" to initiate and complete purchase of the advertisement 620" associated with the selected advertisement token image 622". The method ends at Block 740.

Referring now to FIGS. 35-38, another aspect is directed to PEDs 830 cooperating with an aircraft IFS system 800 for redeeming in-flight coupons 819. Operation of the PEDs 830 with the aircraft IFE system 800 forms a communications system for the aircraft.

For illustration purposes, the aircraft IFS system 800 comprises at least one IFE video entertainment source 802, a plurality of IFS passenger seat displays 804, at least one IFE wireless transceiver 806, and at least one IFS controller 808. The IFS controller 808 is for selectively displaying video from the IFE entertainment source 802 on the IFE passenger seat displays 804, for generating a respective registration token image 810 on each IFE passenger seat display, and for communicating via the IFE wireless transceiver 806.

The PED 830 comprises a PED optical sensor 834, a PED memory 837 for storing an in-flight coupon 819 to be redeemed by the passenger while in-flight, a PED wireless transceiver 836, and a PED controller 838. The PED optical sensor 834 may be configured as a camera, for example.

The PED controller 838 is for communicating with the IFE wireless transceiver 806 via the PED wireless transceiver 836 based upon the PED optical sensor 834 sensing the registration token image 810 so that the PED controller 838 is registered with the IFE controller 808. After registration, the PED controller 838 provides the stored in-flight coupon 819 to the IFE controller for redemption.

Each respective registration token image 810, as described above, advantageously allows the PED controller 838 to register with the IFE controller 808 upon communicating therewith. The PED 830 that sensed the registration token image is assigned to and associated with the IFE passenger seat display 804 that displayed the registration token image being sensed. Once registered, the PED 830 is integrated with the IFE system 800.

A registered PED 830 then advantageously allows the passenger to receive and present an in-flight coupon 819. This avoids the use of a paper coupon that may become lost or misplaced. The in-flight coupon 819 may be applied toward a number of different items. For example, the IFE video entertainment source 802 may provide a premium video package, and the in-flight coupon 819 permits the passenger to complimentary access the premium movie package. Another example is for the in-flight coupon 819 to permit the passenger to receive a complimentary set of headphones or a complimentary food and/or an alcoholic beverage.

Figure 37:
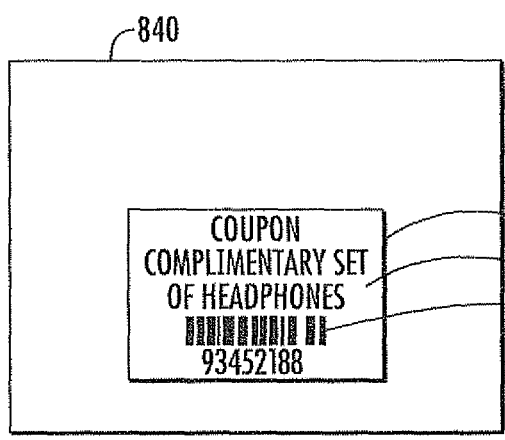
FIG. 37 is a view of a PED display displaying a coupon to be redeemed in accordance with the present invention.
Figure 38:
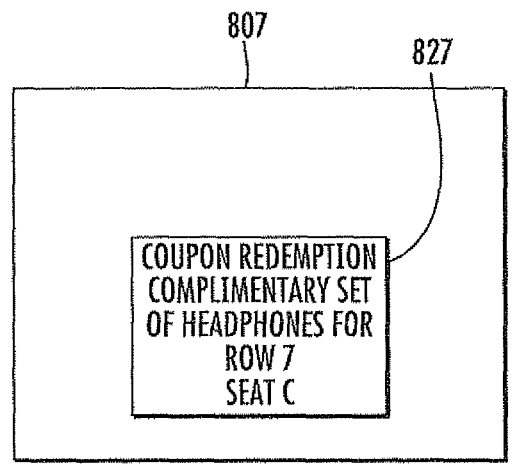
FIG. 38 is a view of a cabin display displaying a coupon that is being redeemed in accordance with the present invention.

For illustration purposes, an in-flight coupon 819 to be redeemed by a passenger includes text 821 describing the coupon and a coupon token image 823 associated therewith, as illustrated in FIG. 37. The coupon token image 823 is similar to the registration token image 810 as discussed in detail above. The coupon token image 823 may also be configured as a bar code with a unique number or identification 825 associated therewith. As readily appreciated by those skilled in the art, the coupon token image 825 is not limited to a bar code. Other configurations may be used as long as a unique number or identification 825 is associated therewith.

At least one cabin display 807 is coupled to the IFE controller 808 for displaying confirmation of a passenger's in-flight coupon that is to be redeemed. In addition to or in lieu of the cabin display 807, a flight attendant carries a cabin device 809 that wirelessly communicates with the IFE controller 808 so that conformation is received of a passenger's in-flight coupon that is to be redeemed. The cabin device 809 may also be used to facilitate transaction if a purchase is being made. The cabin device 809 may communicate with the purchase acceptance controller 660 to complete a purchase. The cabin device 809 advantageously allows the cabin area of the aircraft to be a cashless cabin.

If a passenger is redeeming an in-flight coupon 819 directed to a complimentary set of headphones, for example, a flight attendant is notified and delivers a set of headphones to the passenger. The in-flight coupon being redeemed is displayed on in cabin display 807, along with information 827 on the passenger redeeming the coupon, such as row and seat number, for example.

Alternatively, if the in-flight coupon 819 is directed to a complimentary premium movie package offered by the IFE video entertainment source 802, for example, then the in-flight coupon may be directly applied by the IFE controller 808 without having to display the coupon on the cabin display 807. To verify the authenticity of the coupon 819, an IFE coupon verifier 861 is coupled to the IFE controller 808 to receive and verify the in-flight coupon 819. The IFE coupon verifier 861 may include a coupon database to which the in-flight coupon 819 being redeemed is compared. The IFE coupon verifier 861 will instruct the IFE controller 808 to accept or reject the in-flight coupon 819.

The PED 830 may receive the in-flight coupon 819 prior to the passenger boarding the aircraft, and prior to registration. For example, the PED wireless transceiver 836 receives the in-flight coupon 819 via e-mail and then stores the in-flight coupon in the PED memory 837.

Alternatively, the PED 830 receives the in-flight coupon 819 after the passenger boards the aircraft, i.e., after registration. For example, the IFE controller 808 provides the in-flight coupon to the PED memory 837 by communicating with the PED wireless transceiver 836 via the IFE wireless transceiver 806.

The aircraft IFS system 800 further comprises an in-flight coupon generator 866 coupled to the IFS controller 808 for providing the in-flight coupon 819 thereto. The in-flight coupon generator 866 provides the in-flight coupon 819 based on information in a passenger database 868.

Figure 39:
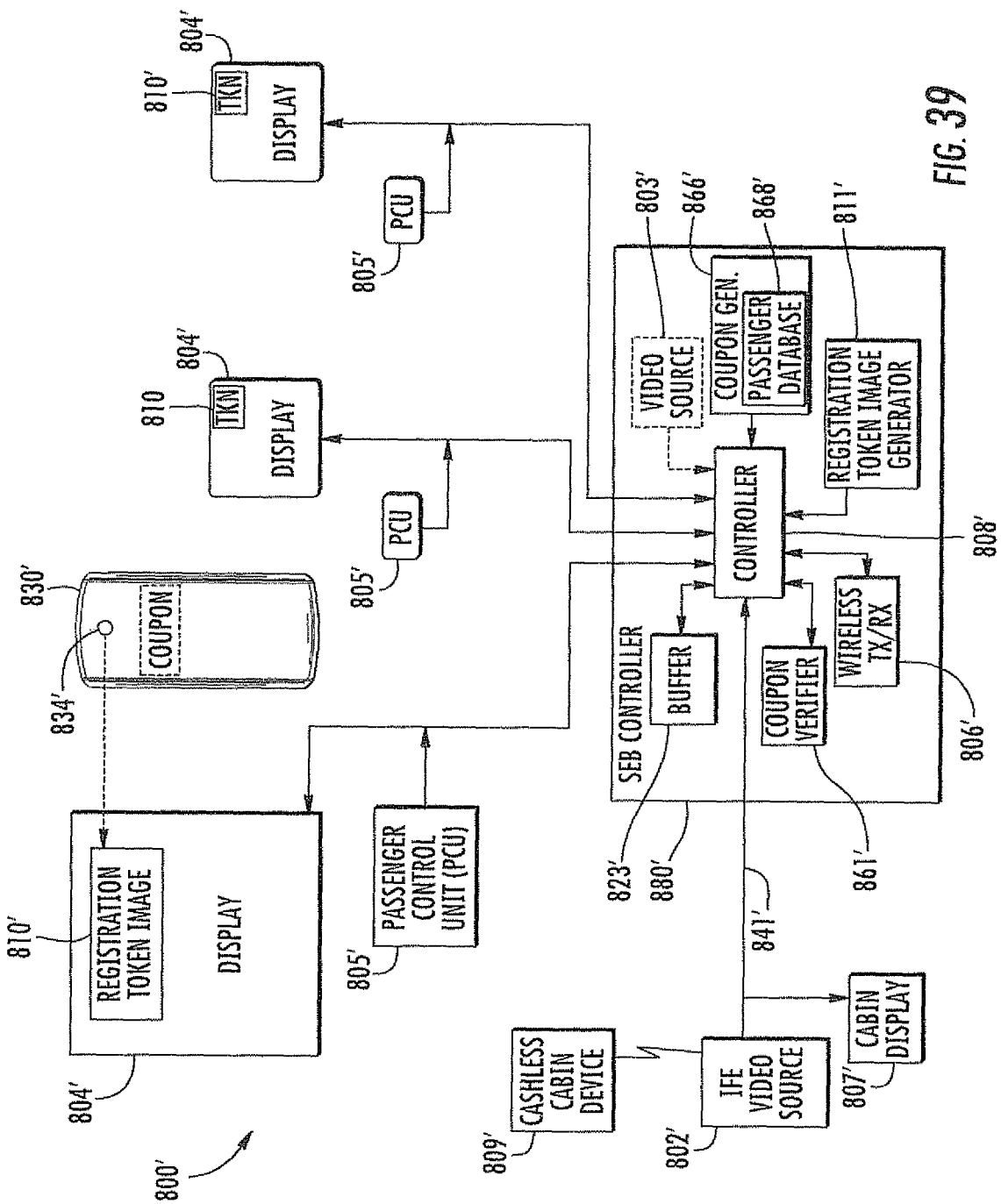
FIG. 39 is schematic diagram of another embodiment of the communications system illustrated in FIG. 35 wherein an IFE seat electronics box (SEB) controller interfaces with the IFE passenger seat displays.

As an alternative to a single IFE controller 808, there is a plurality of IFS seat electronic box (SEB) controllers arranged throughout the aircraft. As illustrated in FIG. 39, each SEB controller 880' supports more than one IFE passenger seat display 804'. Each SEB controller 880' includes at least one IFS wireless transceiver 806' to support the IFS passenger seat display 804' coupled thereto.

In the illustrated example, three IFE passenger seat displays 804' are supported by an IFE SEB controller 880'. Although not illustrated, each IFS passenger seat display 804' may have its own IFE wireless transceiver 806' associated therewith. The SEB controller 880' is coupled to the video entertainment source 802', the IFE coupon verifier 861 and the IFE coupon generator 866 via the signal distribution network 841'. Alternatively, each SEB controller 808' may include a video entertainment source 803' coupled thereto. The illustrated SEB controller 880' may also include its own registration token image generator 811' for the IFS passenger seat displays 804' coupled thereto. In addition, each SEB controller 880' may include its own the IFS coupon verifier 861' and IFS coupon generator 866'.

Figure 40:
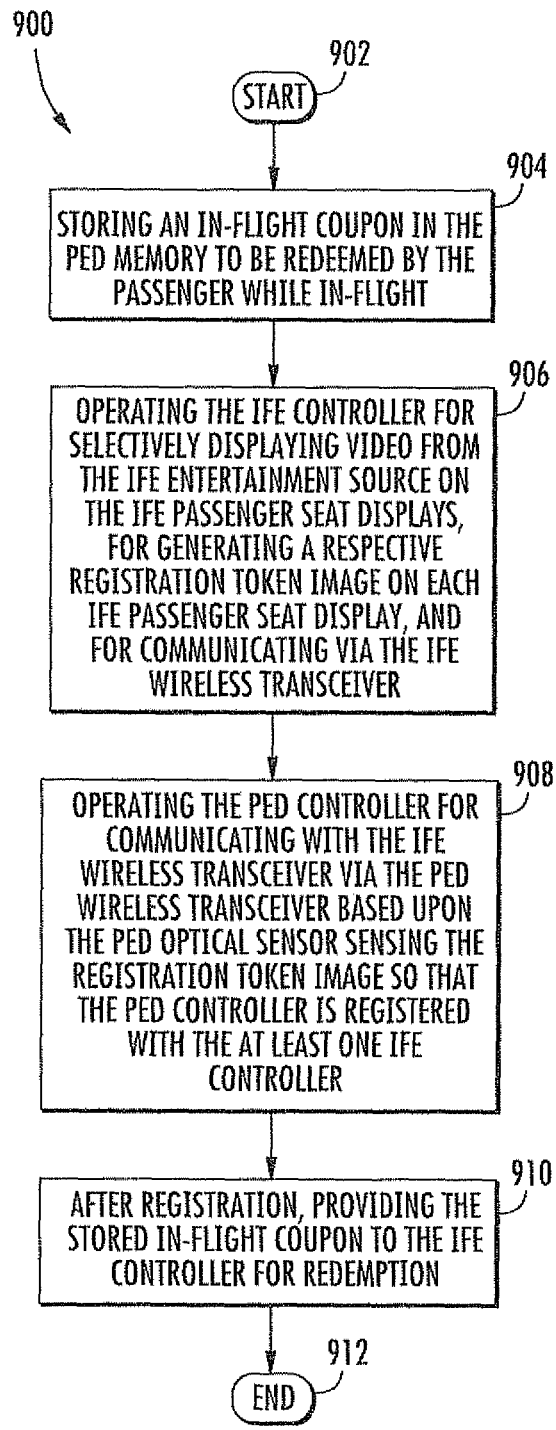
FIG. 40 is a flowchart illustrating operation of a PED cooperating with an aircraft IFE system for redeeming an in-flight coupon in accordance with the present invention.

Referring now to the flowchart 900 illustrated in FIG. 40, a method for operating the aircraft communications system comprising the aircraft IFS system 800 and at least one PED 830 carried by an aircraft passenger as described above will now be discussed. From the start (Block 902), the method comprises storing an in-flight coupon 819 in the PED memory 823 to be redeemed by the passenger while in-flight at Block 904. The IFE controller 808 is operated at Block 906 for selectively displaying video from the IFE entertainment source 802 on the IFE passenger seat displays 804, for generating a respective registration token image on each IFE passenger seat display 804, and for communicating via the IFE wireless transceiver 806. The method further comprises operating the PED controller 830 for communicating with the IFE wireless transceiver 806 via the PED wireless transceiver 836 based upon the PED optical sensor 834 sensing the registration token image 810 so that the PED controller 838 is registered with the IFE controller 808 at Block 908. After registration, the stored in-flight coupon 819 is provided to the at IFE controller 808 for redemption at Block 910. The method ends at Block 912.

Figure 41:
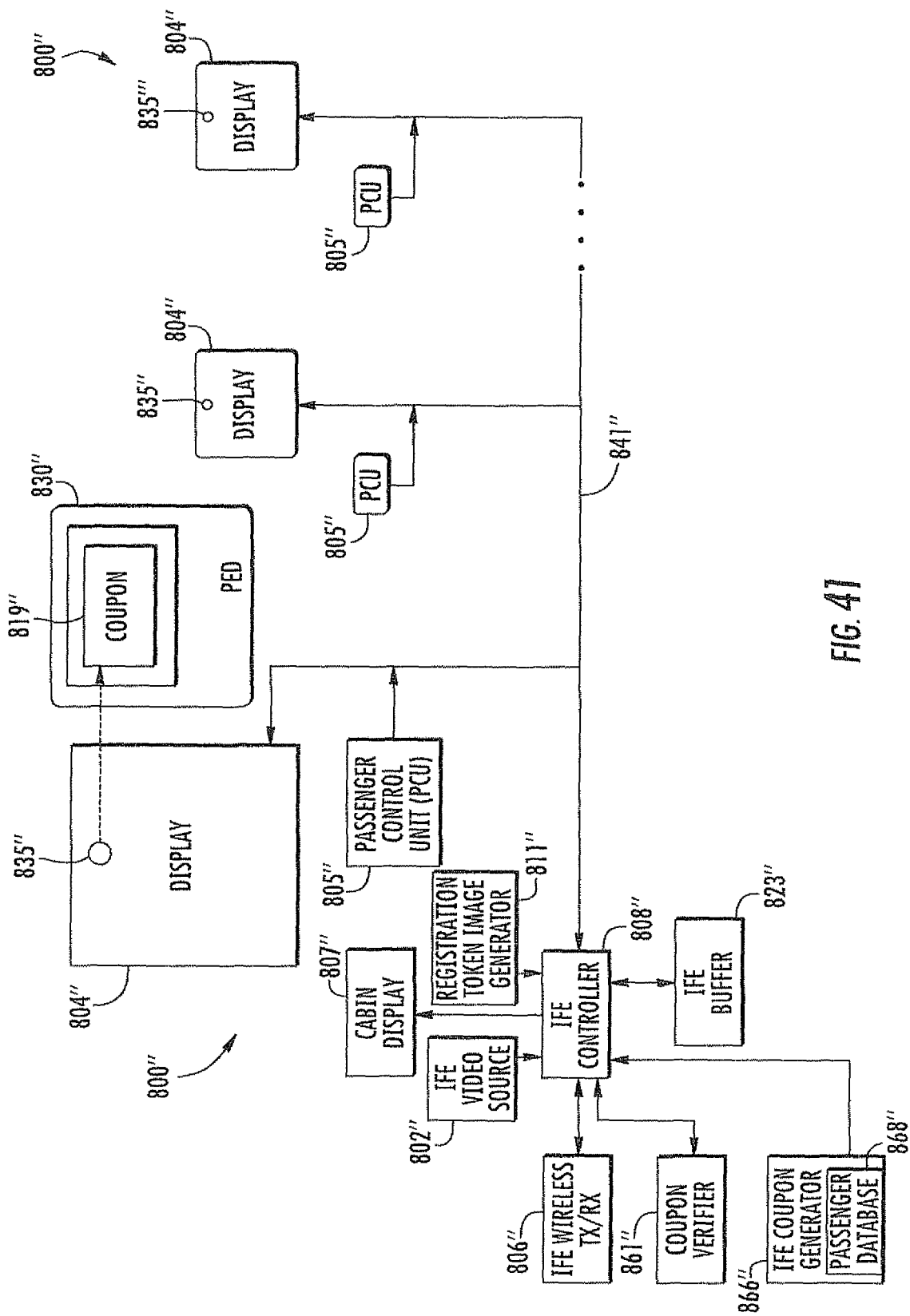
FIG. 41 is a schematic diagram of an aircraft IFE system interfacing with a PED for redeeming an in-flight coupon in accordance with the present invention.
Figure 42:
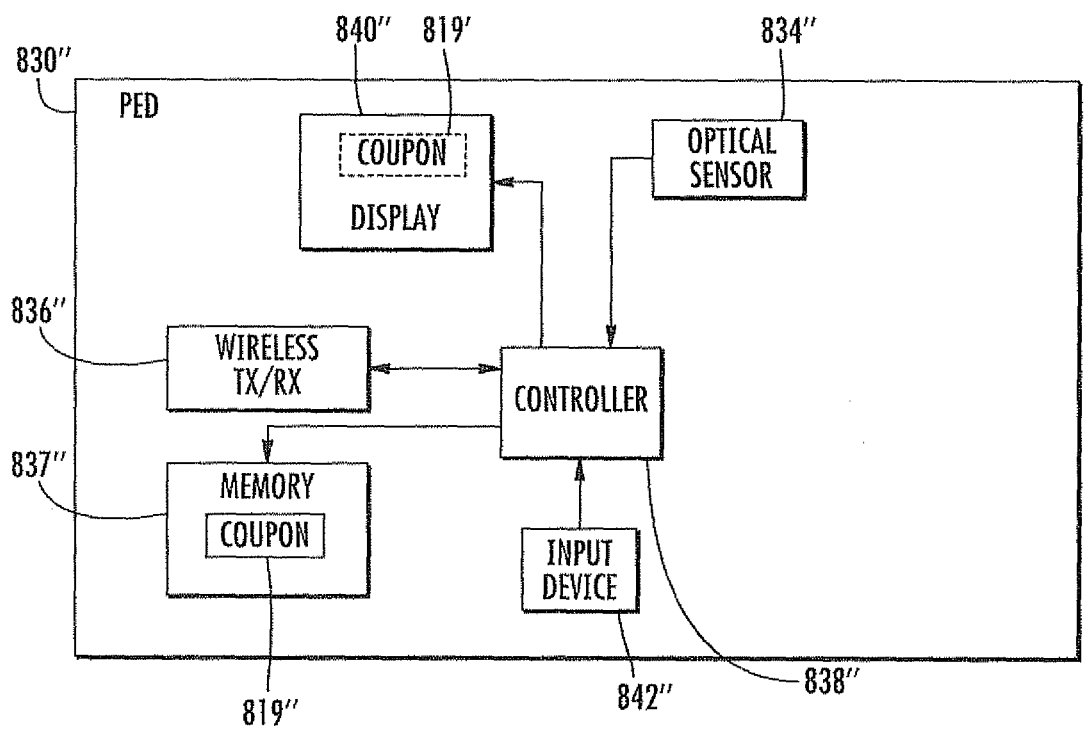
FIG. 42 is a schematic diagram of the PED as shown in FIG. 35.

Referring now to FIGS. 41 and 42, another embodiment of the communications system involves the aircraft IFE system 800" including an IFE optical sensor 839" for sensing the in-flight coupon 819" from the PED display 840".

For illustration purposes, the aircraft IFE system 800" includes at least one PED 830" carried by an aircraft passenger and comprising a PED display 840", a PED memory 837" for storing an in-flight coupon 819" to be redeemed by the passenger while in-flight, and a PED controller 838". The PED controller 838" is for displaying the stored in-flight coupon 819" on the PED display 840".

The aircraft IFE system includes at least one IFE video entertainment source 802", a plurality of IFE passenger seat displays 804", a respective IFE optical sensor 839" associated with each of the IFE passenger seat displays 804", and at least one IFE controller 808". The IFE controller 808" is for selectively displaying video from the IFE entertainment source 802" on the IFE passenger seat displays 804", and for receiving the stored coupon 819" for redemption based upon a respective IFE optical sensor 839" sensing the displayed coupon 819" on the PED display 840".

The PED 830" may present the in-flight coupon 819" without being registered with the aircraft IFE system 800". Registration is not necessary since the IFE controller 808" knows the location of the IFE sensor 839" sensing the in-flight coupon 819". For instance, the cabin display 807" coupled to the IFE controller 808" is still able to display a passenger's in-flight coupon that is to be redeemed, along with information 827" on the passenger redeeming the coupon based on location of the IFE optical sensor 839" sensing the coupon 819".

Alternatively, if the in-flight coupon 819" is directed to a complimentary premium movie package offered by the IFE video entertainment source 802", for example, then the in-flight coupon may be directly applied by the IFE controller 808" based on location of the IFE optical sensor 839" sensing the coupon 819.

The coupon token image 823 is similar to the registration token image 810 as discussed in detail above. The coupon token image 823 may also be configured as a bar code with a unique number or identification 825 associated therewith. As readily appreciated by those skilled in the art, the coupon token image 823 is not limited to a bar code. Other configurations may be used as long as a unique number or identification 825 is associated therewith.

To verify the authenticity of the coupon 819", an IFE coupon verifier 861" is coupled to the IFE controller 808" to receive and verify the in-flight coupon 819". The IFE coupon verifier 861" may include a coupon database to which the in-flight coupon 819" being redeemed is compared. The IFE coupon verifier 861" will instruct the IFE controller 808" to accept or reject the in-flight coupon 819".

The PED 830" may receive the in-flight coupon 819" prior to the passenger boarding the aircraft. For example, the PED wireless transceiver 836" receives the in-flight coupon 819" via e-mail and then stores the in-flight coupon in the PED memory 837".

Although registration of the PED 830" with the aircraft IFE system 800" is not required, registration would allow the PED 830" to receive in-flight coupon 819" after the passenger boards the aircraft. For example, the IFE controller 808" provides the in-flight coupon to the PED memory 837" by communicating with the PED wireless transceiver 836" via the IFE wireless transceiver 806".

The aircraft IFE system 800" may further comprise an in-flight coupon generator 866" coupled to the IFE controller 808" for providing the in-flight coupon 819" thereto. The in-flight coupon generator 866" provides the in-flight coupon 819" based on information in a passenger database 868".

Figure 43:
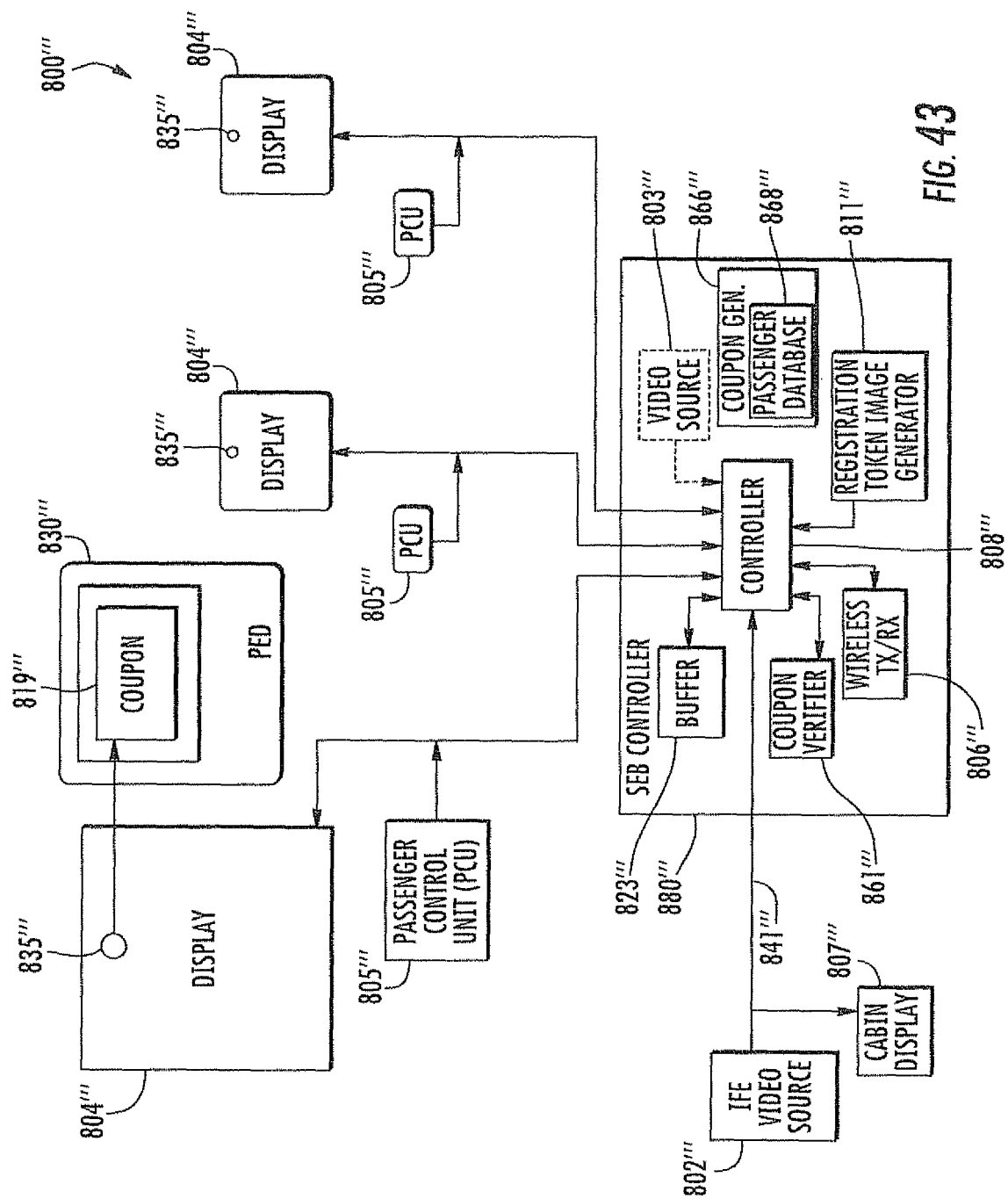
FIG. 43 is schematic diagram of another embodiment of the communications system illustrated in FIG. 41 wherein an IFE seat electronics box (SEB) controller interfaces with the IFS passenger seat displays.

As an alternative to a single IFE controller 808", there is a plurality of IFE seat electronic box (SEB) controllers arranged throughout the aircraft. As illustrated in FIG. 43, each SEB controller 880''' supports more than one IFE passenger seat display 804'''. Each SEB controller 880''' includes at least one IFE wireless transceiver 806''' to support the IFE passenger seat display 804''' coupled thereto.

In the illustrated example, three IFE passenger seat displays 804''' are supported by an IFE SEB controller 880'''. Although not illustrated, each IFE passenger seat display 804''' may have its own IFE wireless transceiver 806" associated therewith. The SEB controller 880''' is coupled to the video entertainment source 802", the IFE coupon verifier 861" and the IFE coupon generator 866" via the signal distribution network 841". Alternatively, each SEB controller 808''' may include a video entertainment source 803' coupled thereto. The illustrated SEB controller 880''' may also include its own registration token image generator 811''' for the IFE passenger seat displays 804''' coupled thereto. In addition, each SEB controller 880' may include its own the IFE coupon verifier 861" and IFE coupon generator 866".

Figure 44:
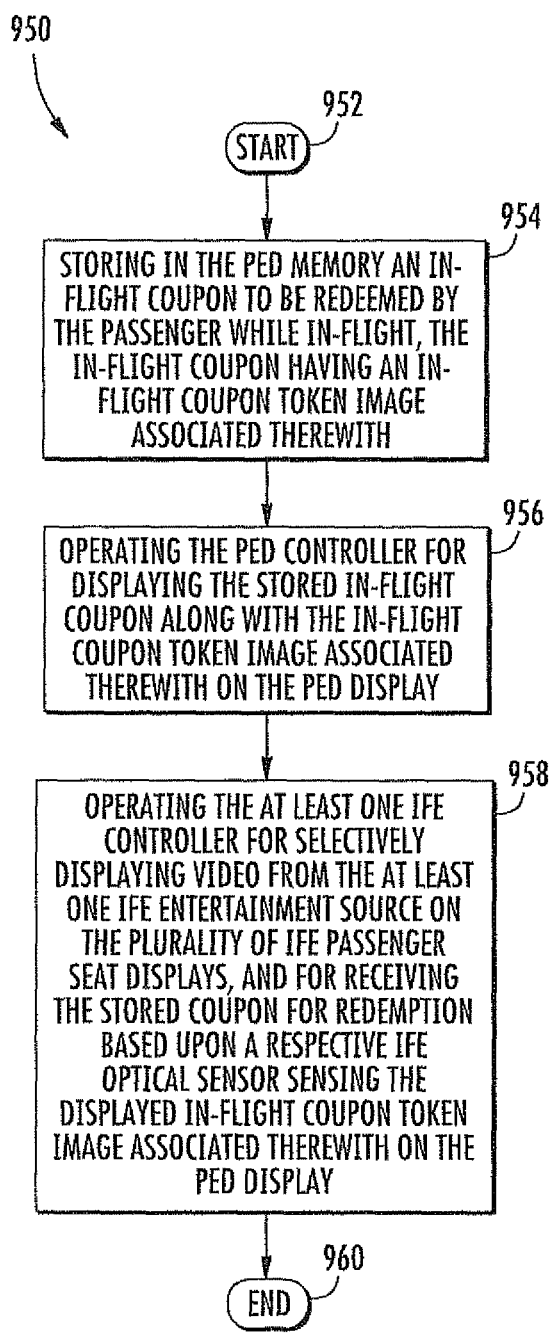
FIG. 44 is a flowchart illustrating operation of aircraft IFS system interfacing with a PED for redemption of an in-flight coupon.

Referring now to the flowchart 950 illustrated in FIG. 44, a method for operating the aircraft communications system comprising at least one PED 830" carried by an aircraft passenger, and an aircraft IFE system 800" as described above. From the start (Block 952), the method comprises storing in the PED memory 837" an in-flight coupon 819" to be redeemed by the passenger while in-flight at Block 954. The method further comprises operating the PED controller 838" at Block 956 for displaying the stored in-flight coupon 819" on the PED display 844". The IFE controller 808" may be operated at Block 958 for selectively displaying video from the IFE entertainment source 802" on the IFE passenger seat displays 804", and for receiving the stored coupon 819" for redemption based upon a respective IFE optical sensor 839" sensing the displayed coupon on the PED display 840". The method ends at Block 960.

Many modifications and other embodiments of the invention will come to the mind of one skilled in the art having the benefit of the teachings presented in the foregoing descriptions and the associated drawings. In addition, other features relating to the aircraft communications system are disclosed in copending patent applications filed concurrently herewith and assigned to the assignee of the present invention and are entitled REGISTRATION OF A PERSONAL ELECTRONIC DEVICE (PED) WITH AN AIRCRAFT IFE SYSTEM USING AIRCRAFT GENERATED REGISTRATION TOKEN IMAGES AND ASSOCIATED METHODS, U.S. patent application Ser. No. 12/820,510 filed Jun. 22, 2010; AIRCRAFT IFE SYSTEM COOPERATING WITH A PERSONAL ELECTRONIC DEVICE (PED) OPERATING AS A COMMERCE DEVICE, U.S. patent application Ser. No. 12/820,399 filed Jun. 22, 2010; PERSONAL ELECTRONIC DEVICE (PED) COOPERATING WITH AN AIRCRAFT IFE SYSTEM FOR REDEEMING AN IN-FLIGHT COUPON AND ASSOCIATED METHODS, U.S. patent application Ser. No. 12/820,348 filed Jun. 22, 2010; PERSONAL ELECTRONIC DEVICE (PED) OPERATING AS A COMMERCE DEVICE ONBOARD AN AIRCRAFT, U.S. patent application Ser. No. 12/820,383 filed Jun 22, 2010; AIRCRAFT IFE SYSTEM INTERFACING WITH A PERSONAL ELECTRONIC DEVICE (PED) FOR REDEEMING AN IN-FLIGHT COUPON AND ASSOCIATED METHODS, U.S. patent application Ser. No. 12/820,368 filed Jun. 22, 2010, the entire disclosures of which are incorporated herein in their entirety by reference. Therefore, it is understood that the invention is not to be limited to the specific embodiments disclosed, and that modifications and embodiments are intended to be included as readily appreciated by those skilled in the art.

That which is claimed is:

1. A communications system for an aircraft comprising:
   at least one personal electronic device (PED) carried by an aircraft passenger within an aircraft, the at least PED comprising a PED display, a PED wireless transceiver, and a PED controller for generating a respective registration token image on said PED display, and for communicating via said PED wireless transceiver;
   an aircraft in-flight entertainment (IFE) system comprising at least one IFE video entertainment source, a plurality of IFE passenger seat displays, a respective fixed IFE optical sensor associated with each of said plurality of IFE passenger seat displays for sensing the respective registration token image being displayed on said PED display, at least one IFE wireless transceiver to wirelessly communicate within the aircraft, and at least one IFE controller for selectively displaying video from said at least one IFE entertainment source on said plurality of IFE passenger seat displays, and for directly communicating within the aircraft with said PED wireless transceiver via said at least one IFE wireless transceiver based upon the respective fixed IFE optical sensor sensing the respective registration token image being displayed on said PED display; said at least one PED being registered with said aircraft IFE system and assigned to the IFE passenger seat display having the respective fixed IFE optical sensor associated therewith that sensed the displayed respective registration token image, said PED wireless transceiver communicating directly with said at least one IFE wireless transceiver upon registration.

2. The communications system according to claim 1 further comprising a PED input device coupled to said PED controller and cooperating therewith for remotely controlling said at least one IFE controller upon registration therewith.

3. The communications system according to claim 2 wherein said PED input device is for selectively controlling displayed video on said IFE passenger seat display that is assigned to the at least one PED that displayed the respective registration token image used in the registration.

4. The communications system according to claim 3 wherein selectively controlling displayed video is at least one of start, stop, pause, channel selection, volume, brightness, mute, forward, reverse, guide and zoom.

5. The communications system according to claim 1 further comprising a PED video entertainment source coupled to said PED controller and cooperating therewith, said PED controller for selectively displaying video from said PED video entertainment source on said passenger seat display that is assigned to the at least one PED that displayed the respective registration token image used in the registration.

6. The communications system according to claim 5 further comprising a PED input device coupled to said PED controller and cooperating therewith for selectively controlling the displayed video from said PED video entertainment source.

7. The communications system according to claim 6 wherein said PED input device is for at least one of start, stop, pause, channel selection, volume, brightness, mute, forward and reverse.

8. The communications system according to claim 1 wherein the PED display is coupled to said PED controller and cooperates therewith for selectively displaying video from said at least one IFE video entertainment source.

9. The communications system according to claim 8 further comprising a PED input device coupled to said PED controller and cooperating therewith for remotely controlling the displayed video by said at least one IFE controller.

10. The communications system according to claim 9 wherein said PED input device is for at least one of start, stop, pause, channel selection, volume, brightness, mute, forward and reverse.

11. The communications system according to claim 1 wherein said respective fixed optical sensor comprises a camera.

12. The communications system according to claim 1 wherein the respective registration token image is a bar code.

13. The communications system according to claim 1 wherein said PED wireless transceiver comprises a PED radio frequency (RF) transceiver, and said at least one IFE wireless transceiver comprises at least one IFE RF transceiver.

14. The communications system according to claim 1 wherein said at least one IFE controller comprises a plurality of IFE seat electronic box (SEB) controllers arranged throughout the aircraft; and wherein said at least one IFE wireless transceiver comprises at least one IFE SEB wireless transceiver in each IFE SEB controller.

15. An aircraft in-flight entertainment (IFE) system for use with at least one personal electronic device (PED) carried by an aircraft passenger within an aircraft, the at least one PED comprising a PED display, a PED wireless transceiver, and a PED controller for generating a respective registration token image on the PED display, and for communicating via the PED wireless transceiver, the aircraft IFE system comprising:
  at least one IFE video entertainment source;
  a plurality of IFE passenger seat displays;
  a respective fixed IFE optical sensor associated with each of said plurality of IFE passenger seat displays for sensing the respective registration token image being displayed on said PED display;
  at least one IFE wireless transceiver to wirelessly communicate within the aircraft; and at least one IFE controller for selectively displaying video from said at least one IFE entertainment source on said plurality of IFE passenger seat displays, and for directly communicating within the aircraft with the PED wireless transceiver via said at least one IFE wireless transceiver based upon the respective fixed IFE optical sensor sensing the respective registration token image being displayed on the at least one PED;
  the at least one PED being registered with the aircraft IFE system and assigned to the IFE passenger seat display having the respective fixed IFE optical sensor associated therewith that sensed the displayed respective registration token image, the PED wireless transceiver communicating directly with said at least one IFE wireless transceiver upon registration.

16. The aircraft IFE system according to claim 15 wherein the at least one PED further comprises a PED input device coupled to the PED controller; and wherein said at least one IFE controller is remotely controlled based on receiving inputs from the PED input device upon registration.

17. The aircraft IFE system according to claim 16 wherein the PED input device is for selectively controlling displayed video on the IFE passenger seat display that is assigned to the at least one PED that displayed the respective registration token image used in the registration.

18. The aircraft IFE system according to claim 15 wherein the at least one PED further comprises a PED video entertainment source coupled to said PED controller; and wherein said at least one IFE wireless transceiver receives video from the PED video entertainment source via the PED wireless transceiver for display on the IFE passenger seat display that is assigned to the at least one PED that displayed the registration token image used in the registration.

19. The aircraft IFE system according to claim 15 wherein the PED display is coupled to the PED controller; and wherein said at least one IFE wireless transceiver provides video from said IFE video entertainment source to the PED wireless transceiver for display on the PED display via the PED controller.

20. A personal electronic device (PED) to be carried by an aircraft passenger within an aircraft for use with an aircraft IFE system comprising at least one IFE video entertainment source, a plurality of IFE passenger seat displays, a respective fixed IFE optical sensor associated with each of the plurality of IFE passenger seat displays, at least one IFE wireless transceiver to wirelessly communicate within the aircraft, and least one IFE controller for selectively displaying video from the at least one IFE entertainment source on the plurality of IFE passenger seat displays, and for directly communicating within the aircraft via the at least one IFE wireless transceiver, the PED comprising:
  a PED display;
  a PED wireless transceiver; and
  a PED controller for generating a respective registration token image on said PED display, and for communicating with the at least one IFE wireless transceiver via said PED wireless transceiver based upon a the respective fixed IFE optical sensor sensing the respective registration token image being displayed on said PED display; the PED being registered with the aircraft IFE system and assigned to the IFE passenger seat display having the respective fixed IFE optical sensor associated therewith that sensed the displayed respective registration token image, said PED wireless transceiver communicating directly with the at least one IFE wireless transceiver upon registration.

21. The PED according to claim 20 further comprising a PED input device coupled to said PED controller and cooperating therewith for remotely controlling the at least one IFE controller upon registration therewith.

22. The PED according to claim 21 wherein said PED input device is for selectively controlling displayed video on the IFE passenger seat display that is assigned to the PED that displayed the registration token image used in the registration.

23. The PED according to claim 20 further comprising a PED video entertainment source coupled to said PED controller and cooperating therewith, said PED controller for selectively displaying video from said PED video entertainment source on said passenger seat display that is assigned to the PED that displayed the registration token image used in the registration.

24. The PED according to claim 20 wherein the PED display is coupled to said PED controller and cooperates therewith for selectively displaying video from the at least one IFE video entertainment source.

25. A method for operating an aircraft in-flight entertainment (IFE) system for use with at least one personal electronic device (PED) carried by an aircraft passenger within an aircraft, the at least one PED comprising a PED display, a PED wireless transceiver, and a PED controller for generating a respective registration token image on the PED display, and for communicating via the PED wireless transceiver; the aircraft IFE system comprising at least one IFE video entertainment source, a plurality of IFE passenger seat displays, a respective fixed IFE optical sensor associated with each of the plurality of IFE passenger seat displays for sensing the respective registration token image being displayed on the PED display, at least one IFE wireless transceiver to wirelessly communicate within the aircraft, and at least one IFE controller coupled to the at least one IFE video entertainment source, the plurality of IFE passenger seat displays, the respective fixed IFE optical sensors, and the at least one IFE wireless transceiver, the method comprising:
  operating the least one IFE controller for selectively displaying video from the at least one IFE entertainment source on the plurality of IFE passenger seat displays, and
  for directly communicating within the aircraft with the PED wireless transceiver via the at least one IFE wireless transceiver based upon the respective fixed IFE optical sensor sensing the respective registration token image being displayed on the PED display; the at least one PED being registered with the aircraft IFE system and assigned to the IFE passenger seat display having the respective fixed IFE optical sensor associated therewith that sensed the displayed respective registration token image, the PED wireless transceiver communicating directly with the at least one IFE wireless transceiver upon registration.

26. The method according to claim 25 wherein the at least one PED further comprises a PED input device coupled to the PED controller; and wherein the at least one IFE controller is remotely controlled based on receiving inputs from the PED input device upon registration.

27. The method according to claim 26 wherein the PED input device is for selectively controlling displayed video on the IFE passenger seat display that is assigned to the at least one PED that displayed the registration token image used in the registration.

28. The method according to claim 25 wherein the at least one PED further comprises a PED video entertainment source coupled to the PED controller; and further comprising operating the at least one IFE wireless transceiver to receive video from the PED video entertainment source via the PED wireless transceiver for display on the IFE passenger seat display that is assigned to the at least one PED that displayed the registration token image used in the registration.

29. The method according to claim 25 wherein the PED display is coupled to the PED controller; and wherein the at least one IFE wireless transceiver provides video from the IFE video entertainment source to the PED wireless transceiver for display on the PED display via the PED controller.

30. A method for operating a personal electronic device (PED) to be carried by an aircraft passenger within an aircraft for use with an aircraft IFE system, the aircraft IFE system comprising at least one IFE video entertainment source, a plurality of IFE passenger seat displays, a respective fixed IFE optical sensor associated with each of the plurality of IFE passenger seat displays, at least one IFE wireless transceiver to wirelessly communicate within the aircraft, and least one IFE controller for selectively displaying video from the at least one IFE entertainment source on the plurality of IFE passenger seat displays, and for directly communicating within the aircraft via the at least one IFE wireless transceiver; the PED comprising a PED display, a PED wireless transceiver, and a PED controller coupled to the PED display and the PED wireless transceiver, the method comprising:
  operating the PED controller for generating a respective registration token image on the PED display, and for communicating with the at least one IFE wireless transceiver via the PED wireless transceiver based upon the respective fixed IFE optical sensor sensing the respective registration token image being displayed on the PED display; the PED being registered with the aircraft IFE system and assigned to the IFE passenger seat display having the respective fixed IFE optical sensor associated therewith that sensed the displayed respective registration token image, the PED wireless transceiver communicating directly with the at least one IFE wireless transceiver upon registration.

31. The method according to claim 30 wherein the PED further comprises a PED input device coupled to the PED controller and cooperating therewith for remotely controlling the at least one IFE controller upon registration therewith.

32. The method according to claim 31 wherein the PED input device is for selectively controlling displayed video on the IFE passenger seat display that is assigned to the PED that displayed the registration token image used in the registration.

33. The method according to claim 30 wherein the PED further comprises a PED video entertainment source coupled to the PED controller and cooperating therewith, the PED controller for selectively displaying video from the PED video entertainment source on the passenger seat display that is assigned to the PED that displayed the registration token image used in the registration.

34. The method according to claim 30 wherein the PED display is coupled to the PED controller and cooperates therewith for selectively displaying video from the at least one IFE video entertainment source.

\* \* \* \* \*

UNITED STATES PATENT AND TRADEMARK OFFICE
CERTIFICATE OF CORRECTION

PATENT NO. : 9,143,807 B2  
APPLICATION NO. : 12/820467  
DATED : September 22, 2015  
INVENTOR(S) : Keen et al.

Page 1 of 1

It is certified that error appears in the above-identified patent and that said Letters Patent is hereby corrected as shown below:

In the claims

| | |
|---|---|
| Column 34, Line 36, claim 20 | Insert: --at-- before "least". |
| Column 34, Line 46, claim 20 | Delete: "a". |
| Column 35, Line 27, claim 25 | Insert: --at-- between "the" and "least". |
| Column 36, Line 16, claim 30 | Insert: --at-- between "and" and "least". |

Signed and Sealed this  
Thirty-first Day of May, 2016

Michelle K. Lee  
*Director of the United States Patent and Trademark Office*